US012376200B2

(12) United States Patent
Pralong et al.

(10) Patent No.: US 12,376,200 B2
(45) Date of Patent: Jul. 29, 2025

(54) ROTATING MAGNET HEAT INDUCTION

(71) Applicant: Novelis Inc., Atlanta, GA (US)

(72) Inventors: Antoine Jean Willy Pralong, Granges (CH); Peter Knelsen, Pittston, ME (US); David Anthony Gaensbauer, Burlington, VT (US); Rodger Brown, Atlanta, GA (US); Michael Kosmicki, Spokane, WA (US); David Michael Custers, Amherstview (CA); Natasha Iyer, Marietta, GA (US); Robert Bruce Wagstaff, Greenacres, WA (US); Alp Manavbasi, Dallas, GA (US); ChangOok Son, Atlanta, GA (US); Duane E. Bendzinski, Woodstock, GA (US); Rajeev G. Kamat, Marietta, GA (US); David Skingley Wright, Rosdorf-Dramfeld (DE); Andrew James Hobbis, Bath (CA); Christophe Besson, Bonvillars (CH)

(73) Assignee: Novelis Inc., Atlanta, GA (US)

( * ) Notice: Subject to any disclaimer, the term of this patent is extended or adjusted under 35 U.S.C. 154(b) by 0 days.

(21) Appl. No.: 18/459,340

(22) Filed: Aug. 31, 2023

(65) Prior Publication Data
US 2023/0413395 A1 Dec. 21, 2023

Related U.S. Application Data

(62) Division of application No. 15/716,887, filed on Sep. 27, 2017, now Pat. No. 11,785,678.
(Continued)

(51) Int. Cl.
*H05B 6/10* (2006.01)
*C21D 9/60* (2006.01)
(Continued)

(52) U.S. Cl.
CPC ............... *H05B 6/109* (2013.01); *C21D 9/60* (2013.01); *F26B 3/347* (2013.01); *F26B 15/18* (2013.01);
(Continued)

(58) Field of Classification Search
CPC ........ H05B 6/104; H05B 6/365; H05B 6/109; H05B 6/102; H05B 6/06; H05B 6/108;
(Continued)

(56) References Cited

U.S. PATENT DOCUMENTS 1,872,045 A   8/1932   Smitmans
2,001,637 A   5/1935   Talbot
(Continued)

FOREIGN PATENT DOCUMENTS

CN   1891363 A   1/2007
CN   101611316 A   12/2009
(Continued)

OTHER PUBLICATIONS

"English Translation of JPH0527041 U", mailed on Apr. 6, 1993, 10 pages.
(Continued)

*Primary Examiner* — Chris Q Liu
(74) *Attorney, Agent, or Firm* — Kilpatrick Townsend & Stockton LLP

(57) ABSTRACT

A rotating magnet heater for metal products, such as aluminum strip, can include permanent magnet rotors arranged above and below a moving metal strip to induce moving or time varying magnetic fields through the metal strip. The changing magnetic fields can create currents (e.g., eddy currents) within the metal strip, thus heating the metal strip. A magnetic rotor set can include a pair of matched magnetic rotors on opposite sides of a metal strip that rotate at the same speed. Each magnetic rotor of a set can be positioned
(Continued)

equidistance from the metal strip to avoid pulling the metal strip away from the passline. A downstream magnetic rotor set can be used in close proximity to an upstream magnetic rotor set to offset tension induced by the upstream magnetic rotor set.

10 Claims, 34 Drawing Sheets

Related U.S. Application Data

(60) Provisional application No. 62/400,426, filed on Sep. 27, 2016, provisional application No. 62/505,948, filed on May 14, 2017, provisional application No. 62/529,053, filed on Jul. 6, 2017.

(51) Int. Cl.
  *F26B 3/347* (2006.01)
  *F26B 15/18* (2006.01)
  *H05B 6/06* (2006.01)

(52) U.S. Cl.
  CPC .............. *H05B 6/06* (2013.01); *H05B 6/102* (2013.01); *H05B 6/104* (2013.01); *H05B 6/107* (2013.01); *Y02P 10/25* (2015.11)

(58) Field of Classification Search
  CPC . H05B 6/36; H05B 6/362; H05B 6/40; H05B 6/105; H05B 6/107; H05B 6/1209; H05B 6/145; H05B 6/32; H05B 6/44; H05B 3/0009; H05B 6/02; H05B 6/04; H05B 6/10; H05B 6/101; H05B 6/103
  USPC ....... 219/645, 670, 672, 673, 676, 671, 656, 219/646, 631, 660, 653, 612, 622, 624, 219/628, 635, 648, 667, 675, 600, 608, 219/619, 629, 630, 634, 650, 652, 655, 219/665, 669
  See application file for complete search history.

(56) References Cited

U.S. PATENT DOCUMENTS

| | | |
|---|---|---|
| 2,041,235 A | 5/1936 | Darbaker |
| 2,058,447 A | 10/1936 | Hazelett |
| 2,058,448 A | 10/1936 | Hazelett |
| 2,092,480 A | 9/1937 | Talbot |
| RE21,260 E | 11/1939 | Hazelett |
| 2,334,109 A | 11/1943 | McBain et al. |
| 2,448,009 A | 8/1948 | Baker |
| 2,448,012 A | 8/1948 | Baker |
| 2,481,172 A | 9/1949 | Staggs |
| 2,494,399 A | 1/1950 | McCleary |
| 2,527,237 A | 10/1950 | Wilcox, Jr. |
| 2,529,884 A | 11/1950 | Reynolds |
| 2,566,274 A | 8/1951 | White et al. |
| 2,722,589 A | 11/1955 | Marquardt |
| 2,731,212 A | 1/1956 | Baker |
| 2,753,474 A | 7/1956 | Walworth et al. |
| 2,769,932 A | 11/1956 | Zozulin et al. |
| 2,895,034 A | 7/1959 | Baffrey et al. |
| 2,912,552 A | 11/1959 | Baermann |
| 3,008,026 A | 11/1961 | Kennedy |
| 3,184,938 A | 5/1965 | Terwilliger |
| 3,218,001 A | 11/1965 | Gombos |
| 3,272,956 A | 9/1966 | Baermann |
| 3,376,120 A | 4/1968 | Hiegel |
| 3,431,971 A | 3/1969 | Gyongyos |
| 3,438,231 A | 4/1969 | Petzschke |
| 3,444,346 A | 5/1969 | Russell et al. |
| 3,453,847 A | 7/1969 | Romanauskas |
| 3,535,902 A | 10/1970 | Sevenich et al. |
| 3,562,470 A | 2/1971 | Bobart et al. |
| 3,604,696 A | 9/1971 | Coleman et al. |
| 3,635,417 A | 1/1972 | Kajiwara et al. |
| 3,746,229 A | 7/1973 | Feller et al. |
| 3,793,867 A | 2/1974 | Safford |
| 3,837,391 A | 9/1974 | Rossi |
| 3,879,814 A | 4/1975 | Mojelski |
| 4,019,359 A | 4/1977 | Smith |
| 4,054,770 A | 10/1977 | Jackson et al. |
| 4,138,074 A | 2/1979 | Ross et al. |
| 4,185,183 A | 1/1980 | Kamimoto |
| 4,214,467 A | 7/1980 | Sankaran |
| 4,296,919 A | 10/1981 | Sakurai et al. |
| 4,321,444 A | 3/1982 | Davies |
| 4,379,396 A | 4/1983 | Hope et al. |
| 4,448,614 A | 5/1984 | Morimoto et al. |
| 4,485,651 A | 12/1984 | Tippins et al. |
| 4,520,645 A | 6/1985 | Ross et al. |
| 4,708,325 A | 11/1987 | Georges |
| 4,730,781 A | 3/1988 | Richter et al. |
| 4,743,196 A | 5/1988 | Imose et al. |
| 4,761,527 A | 8/1988 | Mohr |
| 4,795,872 A | 1/1989 | Hagisawa et al. |
| 4,828,227 A | 5/1989 | Georges et al. |
| 4,891,484 A | 1/1990 | Waggott et al. |
| 4,923,396 A | 5/1990 | Harada et al. |
| 5,356,495 A | 10/1994 | Wyatt-Mair et al. |
| 5,397,877 A | 3/1995 | Couffet et al. |
| 5,401,941 A | 3/1995 | Mauve et al. |
| 5,701,775 A | 12/1997 | Sivilotti et al. |
| 5,727,412 A | 3/1998 | Tippins et al. |
| 5,739,506 A | 4/1998 | Hanton et al. |
| 5,845,699 A | 12/1998 | Baharis |
| 5,914,056 A | 6/1999 | Yamaguchi |
| 5,914,065 A | 6/1999 | Alavi |
| 6,011,245 A | 1/2000 | Bell |
| 6,019,200 A | 2/2000 | Janzen et al. |
| 6,129,136 A | 10/2000 | Tibbs et al. |
| 6,264,765 B1 | 7/2001 | Bryant et al. |
| 6,285,015 B1 | 9/2001 | Doizaki et al. |
| 6,327,883 B1 | 12/2001 | Noe et al. |
| 6,570,141 B2 | 5/2003 | Ross |
| 6,576,878 B2 | 6/2003 | Thorpe et al. |
| 6,776,857 B2 | 8/2004 | Lee |
| 7,257,977 B2 | 8/2007 | Arvedi |
| 7,525,073 B2 | 4/2009 | Lovens et al. |
| 7,671,307 B2 | 3/2010 | Nikanorov et al. |
| 7,786,693 B2 | 8/2010 | Schmitz et al. |
| 7,819,356 B2 | 10/2010 | Takatsuka et al. |
| 7,926,316 B2 | 4/2011 | Tachibana |
| 7,942,191 B2 | 5/2011 | Zhang et al. |
| 8,502,122 B2 | 8/2013 | Hirota |
| 8,592,735 B2 | 11/2013 | Hirota |
| 9,089,887 B2 | 7/2015 | Snyder et al. |
| 9,248,482 B2 | 2/2016 | Passoni et al. |
| 9,462,641 B2 | 10/2016 | Akers |
| 10,370,749 B2 | 8/2019 | Hobbis et al. |
| 10,508,328 B2 | 12/2019 | Malpica et al. |
| 10,837,090 B2 | 11/2020 | Gaensbauer et al. |
| 10,844,467 B2 | 11/2020 | Gaensbauer et al. |
| 11,072,843 B2 | 7/2021 | Pralong et al. |
| 11,242,586 B2 | 2/2022 | Hobbis et al. |
| 11,377,721 B2 | 7/2022 | Hobbis et al. |
| 11,479,837 B2 | 10/2022 | Custers |
| 11,499,213 B2 | 11/2022 | Hobbis et al. |
| 11,785,678 B2 | 10/2023 | Pralong et al. |
| 11,821,066 B2 | 11/2023 | Pralong et al. |
| 2003/0198734 A1 | 10/2003 | Mann |
| 2006/0037989 A1 | 2/2006 | Zilkenat et al. |
| 2006/0070689 A1 | 4/2006 | Kropfl |
| 2006/0086726 A1 | 4/2006 | Yamamoto et al. |
| 2006/0123866 A1 | 6/2006 | Ho |
| 2007/0193322 A1 | 8/2007 | Beck et al. |
| 2009/0026303 A1 | 1/2009 | Schmitz et al. |
| 2009/0101636 A1 | 4/2009 | Lovens et al. |
| 2010/0050730 A1 | 3/2010 | Buschsieweke et al. |
| 2010/0237548 A1 | 9/2010 | Okada et al. |
| 2011/0091230 A1 | 4/2011 | Yamamoto |
| 2011/0095125 A1 | 4/2011 | Tazoe et al. |

(56) References Cited

U.S. PATENT DOCUMENTS

| | | |
|---|---|---|
| 2012/0037264 A1 | 2/2012 | Sakabe et al. |
| 2012/0074132 A1 | 3/2012 | Chen et al. |
| 2012/0305547 A1 | 12/2012 | Fukutani et al. |
| 2013/0139929 A1 | 6/2013 | Francoeur et al. |
| 2014/0147697 A1 | 5/2014 | Berkhout et al. |
| 2016/0016215 A1 | 1/2016 | Brown et al. |
| 2016/0348225 A1 | 12/2016 | Bryant et al. |
| 2016/0363164 A1 | 12/2016 | Kosmicki et al. |
| 2017/0253953 A1 | 9/2017 | Meyer et al. |
| 2018/0085803 A1 | 3/2018 | Hobbis et al. |
| 2018/0085805 A1 | 3/2018 | Pralong et al. |
| 2018/0085810 A1 | 3/2018 | Malpica et al. |
| 2018/0087122 A1 | 3/2018 | Custers |
| 2018/0087138 A1 | 3/2018 | Gaensbauer et al. |
| 2018/0092163 A1 | 3/2018 | Pralong et al. |
| 2018/0092164 A1 | 3/2018 | Gaensbauer et al. |

FOREIGN PATENT DOCUMENTS

| | | | |
|---|---|---|---|
| CN | 101795785 | A | 8/2010 |
| CN | 201596682 | U | 10/2010 |
| CN | 102159745 | A | 8/2011 |
| CN | 102423751 | A | 4/2012 |
| CN | 102921727 | A | 2/2013 |
| CN | 104537253 | A | 4/2015 |
| CN | 104588430 | A | 5/2015 |
| DE | 857787 | C | 12/1952 |
| DE | 1163760 | B | 2/1964 |
| DE | 4213686 | A1 | 10/1993 |
| DE | 19650582 | A1 | 6/1998 |
| DE | 102006054383 | A1 | 5/2008 |
| DE | 102008061356 | A1 | 6/2010 |
| DE | 102006054383 | B4 | 10/2014 |
| EA | 012474 | B1 | 10/2009 |
| EP | 0742680 | A2 | 11/1996 |
| EP | 1221826 | B1 | 2/2006 |
| EP | 2112863 | A1 | 10/2009 |
| EP | 2157193 | A1 | 2/2010 |
| EP | 2233593 | A2 | 9/2010 |
| EP | 2434836 | A2 | 3/2012 |
| EP | 2012084638 | A1 | 6/2012 |
| EP | 2478974 | A1 | 7/2012 |
| EP | 2233593 | B1 | 2/2013 |
| EP | 2800452 | B1 | 7/2016 |
| FR | 1347484 | A | 12/1963 |
| FR | 1387653 | A | 1/1965 |
| FR | 2780846 | B1 | 9/2000 |
| GB | 167545 | A | 8/1921 |
| GB | 600673 | A | 4/1948 |
| GB | 609718 | A | 10/1948 |
| GB | 988334 | A | 4/1965 |
| GB | 2114101 | A | 8/1983 |
| GB | 2121260 | A | 12/1983 |
| JP | 4934459 | A | 3/1974 |
| JP | 5168460 | A | 6/1976 |
| JP | S5469557 | A | 6/1979 |
| JP | S56102567 | A | 8/1981 |
| JP | 58127558 | A | 7/1983 |
| JP | S58193351 | A | 11/1983 |
| JP | S58221609 | A | 12/1983 |
| JP | S6486474 | A | 3/1989 |
| JP | 026008 | A | 1/1990 |
| JP | H02-209457 | A | 8/1990 |
| JP | H0375344 | A | 3/1991 |
| JP | H0375345 | A | 3/1991 |
| JP | 04112485 | A | 4/1992 |
| JP | 576932 | A | 3/1993 |
| JP | 0527041 | U | 4/1993 |
| JP | 0527042 | U | 4/1993 |
| JP | 0582248 | A | 4/1993 |
| JP | 0549117 | U | 6/1993 |
| JP | H05138305 | A | 6/1993 |
| JP | H05293605 | A | 11/1993 |
| JP | H0711402 | A | 1/1995 |
| JP | H07-328719 | A | 12/1995 |
| JP | 09122752 | A | 5/1997 |
| JP | 2002529245 | A | 9/2002 |
| JP | 2011200889 | A | 10/2011 |
| JP | 2012152824 | A | 8/2012 |
| JP | 2016141843 | A | 8/2016 |
| KR | 20120116988 | A | 10/2012 |
| RU | 2353452 | C2 | 4/2009 |
| RU | 97889 | U1 | 9/2010 |
| RU | 2504574 | C2 | 1/2014 |
| RU | 2539962 | C2 | 1/2015 |
| SU | 988404 | A1 | 1/1983 |
| SU | 1005958 | A | 3/1983 |
| SU | 1316725 | A1 | 6/1987 |
| SU | 1784319 | C | 12/1992 |
| WO | 2007138152 | A1 | 12/2007 |
| WO | 2008149218 | A2 | 12/2008 |
| WO | 2010091865 | A1 | 8/2010 |
| WO | 2011102454 | A1 | 8/2011 |
| WO | 2012050552 | A1 | 4/2012 |
| WO | 2015094482 | A1 | 6/2015 |
| WO | 2016035867 | A1 | 3/2016 |
| WO | 2016035893 | A1 | 3/2016 |

OTHER PUBLICATIONS

U.S. Appl. No. 17/820,322, "Non-Final Office Action", mailed on Nov. 9, 2023, 15 pages.
CA Application No. 3,037,750, "Notice of Allowance", mailed on Sep. 11, 2023, 1 page.
CN Application No. 202111583292.2, "Office Action", mailed on Nov. 17, 2023, 17 pages.
JP Application No. 2023-011789, "Notice of Decision to Grant", Mar. 19, 2024, 6 pages.
U.S. Appl. No. 17/820,322, "Advisory Action", Aug. 20, 2024, 5 pages.
U.S. Appl. No. 17/820,322, "Final Office Action", May 22, 2024, 22 pages.
CA Application No. 3,128,719, "Office Action", Jul. 26, 2024, 7 pages.
CN Application No. 202111583292.2, "Office Action", Jun. 12, 2024, 8 pages.
"International Alloy Designations and Chemical Composition Limits for Wrought Aluminum and Wrought Aluminum Alloys", The Aluminum Association, Incorporated, Registration Record Series, Teal Sheets, Feb. 1, 2009, 35 pages.
U.S. Appl. No. 15/716,887, "Advisory Action", Mailed on Apr. 8, 2021, 5 pages.
U.S. Appl. No. 15/716,887, "Corrected Notice of Allowability", Mailed on Jun. 26, 2023, 2 pages.
U.S. Appl. No. 15/716,887, "Final Office Action", Mailed on Jan. 27, 2021, 21 pages.
U.S. Appl. No. 15/716,887, "Final Office Action", Mailed on Nov. 15, 2021, 24 pages.
U.S. Appl. No. 15/716,887, "Non-Final Office Action", Mailed on Aug. 21, 2020, 20 pages.
U.S. Appl. No. 15/716,887, "Non-Final Office Action", Mailed on Aug. 5, 2021, 23 pages.
U.S. Appl. No. 15/716,887, "Non-Final Office Action", Mailed on Jul. 25, 2022, 25 pages.
U.S. Appl. No. 15/716,887, "Non-Final Office Action", Mailed on Apr. 6, 2023, 7 pages.
U.S. Appl. No. 15/716,887, "Notice of Allowance", Mailed on Jun. 1, 2023, 10 pages.
Australian Application No. 2017335764, "First Examination Report", Mailed on Sep. 20, 2019, 4 pages.
Brazilian Application No. BR112019005681-5, "Office Action", Mailed on Jul. 19, 2022, 5 pages.
Brazilian Application No. BR112019005681-5, "Office Action", Apr. 4, 2023, 7 pages.
Canadian Application No. CA 3,038,298, "Notice of Allowance", Mailed on May 8, 2023, 1 page.
Canadian Application No. 3,038,298, "Office Action", Mailed on Jun. 3, 2022, 4 pages.

(56) References Cited

OTHER PUBLICATIONS

Canadian Application No. 3,038,298, "Office Action", Mailed on Feb. 17, 2020, 5 pages.
Canadian Application No. 3,038,298, "Office Action", Nov. 27, 2020, 5 pages.
Canadian Application No. 3,038,298, "Office Action", Mailed on Sep. 27, 2021, 5 pages.
Chinese Application No. 201780059427.0, "Office Action", Mailed on Aug. 4, 2021, 22 pages.
Indian Application No. 201917011139, "First Examination Report", dated Mar. 17, 2021, 6 pages.
Indian Application No. 202118028933, "First Examination Report", Mailed on Jun. 15, 2022, 5 pages.
Japanese Application No. 2019-516123, "Notice of Decision to Grant", Mailed on Jun. 29, 2021, 3 pages.
Japanese Application No. 2019-516123, "Office Action", Mailed on Jan. 26, 2021, 6 pages.
Japanese Application No. 2019-516123, "Office Action", Mailed on May 26, 2020, 8 pages.
Japanese Application No. 2021-123464, "Notice of Decision to Grant", May 9, 2023, 6 pages.
Japanese Application No. 2021-123464, "Office Action", Mailed on Sep. 13, 2022, 5 pages.
Japanese Application No. 2021-123464, "Office Action", Mailed on Feb. 21, 2023, 6 pages.
Korean Application No. 10-2019-7011832, "Office Action", Feb. 19, 2020, 21 pages.
Mexican Application No. MX/A/2019/003430, "Notice of Allowance", Mailed on Aug. 16, 2022, 3 pages.
Mexican Application No. MX/A/2019/003430, "Office Action", Mailed on Jun. 1, 2022, 5 pages.
International Application No. PCT/US2017/053819, "International Search Report and Written Opinion", Feb. 13, 2018, 21 pages.
International Application No. PCT/US2017/053819, "Invitation to Pay Additional Fees and, Where Applicable, Protest Fee", Dec. 21, 2017, 14 pages.
Russian Application No. 2019108096, "Office Action", Mailed on Mar. 11, 2020, 10 pages.
Russian Application No. 2019108096, "Office Action", Nov. 6, 2019, 10 pages.
Zerbetto, "Optimal Design of a Permanent Magnet Heater for Aluminum Billets", Marcello Zerbetto Inovalab s.r.l., Oct. 15, 2014, 23 pages.
U.S. Appl. No. 17/820,322, "Non-Final Office Action", Sep. 29, 2024, 19 pages.
CN Application No. 202111583292.2, "Notice of Decision to Grant", Sep. 9, 2024, 2 pages.
JP Application No. 2023-113488, "Office Action", Jul. 30, 2024, 8 pages.
CA Application No. 3,211,464, "Office Action", Nov. 19, 2024, 4 pages.
U.S. Appl. No. 17/820,322, "Notice of Allowance", Mar. 5, 2025, 9 pages.
CA Application No. 3,211,436, "Office Action", Dec. 19, 2024, 4 pages.
CA Application No. 3,211,488, "Office Action", Dec. 17, 2024, 5 pages.
CA Application No. 3,211,514, "Office Action", Dec. 19, 2024, 4 pages.
JP Application No. 2023-113488, "Office Action", Jan. 7, 2025, 4 pages.

ROTATING MAGNET HEAT INDUCTION

CROSS REFERENCE TO RELATED APPLICATIONS

The present application is a divisional of U.S. application Ser. No. 15/716,887, filed on Sep. 27, 2017, which claims the benefit of U.S. Provisional Patent Application No. 62/400,426 entitled "ROTATING MAGNET HEAT INDUCTION" and filed on Sep. 27, 2016; U.S. Provisional Patent Application No. 62/505,948 entitled "ROTATING MAGNET HEAT INDUCTION" and filed on May 14, 2017; and U.S. Provisional Patent Application No. 62/529,053 entitled "SYSTEMS AND METHODS FOR CURING A COATED METAL STRIP" and filed on Jul. 6, 2017, the disclosures of which are hereby incorporated by reference in their entireties.

Additionally, the present application is related to U.S. Non-provisional patent application Ser. No. 15/716,559 to Antoine Jean Willy Pralong, et al. entitled "SYSTEMS AND METHODS FOR NON-CONTACT TENSIONING OF A METAL STRIP" filed Sep. 27, 2017 (now U.S. Pat. No. 11,072,843); U.S. Non-provisional patent application Ser. No. 15/716,577 to David Michael Custers entitled "PRE-AGEING SYSTEMS AND METHODS USING MAGNETIC HEATING" filed Sep. 27, 2017 (now U.S. Pat. No. 11,479,837); U.S. Non-provisional patent application Ser. No. 15/716,608 to David Anthony Gaensbauer, et al. entitled "COMPACT CONTINUOUS ANNEALING SOLUTION HEAT TREATMENT" filed Sep. 27, 2017 (now U.S. Pat. No. 10,844,467); U.S. Non-provisional patent application Ser. No. 15/716,962 to David Anthony Gaensbauer, et al. entitled "MAGNETIC LEVITATION HEATING OF METAL WITH CONTROLLED SURFACE QUALITY" filed Sep. 27, 2017 (now U.S. Pat. No. 10,837,090); U.S. Non-provisional patent application Ser. No. 15/717,698 to Andrew James Hobbis, et al. entitled "SYSTEMS AND METHODS FOR THREADING A HOT COIL ON A MILL" filed Sep. 27, 2017 (U.S. Pat. No. 10,370,749); and U.S. Non-provisional patent application Ser. No. 15/716,570 to Julio Malpica, et al. entitled "RAPID HEATING OF SHEET METAL BLANKS FOR STAMPING" filed Sep. 27, 2017 (now U.S. Pat. No. 10,508,328), the disclosures of which are hereby incorporated by reference in their entireties.

TECHNICAL FIELD

The present disclosure relates to metal processing generally and more specifically to heating metal strips, such as non-ferrous metal strips, using rotating magnets.

BACKGROUND

In metal processing, it can be desirable to control the temperature of a metal product before, during, or after various processing steps. For example, it can be desirable to heat a metal strip prior to performing certain processes, or it can be desirable to maintain heat in a metal strip for a duration of time without allowing the metal strip to cool past a minimum temperature. Temperature control can generally involve adding or removing heat energy to or from a metal strip.

Various techniques for adding heat energy to a metal strip exist. Various techniques, particularly direct-contact techniques, can induce undesirable effects on the metal strip, such as surface-marring, build-up of waste (e.g., carbon from a direct-impingement flame or an indirect flame heating source) on the surface, or other such undesirable results. Other techniques attempt to heat up the metal strip without contact, but are unable to efficiently transfer heat energy to the metal strip. Some other problems associated with current techniques include high installation and/or maintenance costs, occupying significant production space, limiting the mobility of the metal strip being processed, and inducing undesirable effects on the metal strip.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Some embodiments of the present disclosure include a rotating magnet heater and a system incorporating a rotating magnet heater, the rotating magnet heater comprising a top rotor vertically offset from a bottom rotor defining a gap therebetween for accepting a moving metal strip; at least one motor coupled to at least one of the top rotor and the bottom rotor for rotating the at least one of the top rotor and the bottom rotor to induce a moving and time varying magnetic field through the gap for heating the moving metal strip; and a pair of support arms each coupled to one of the top rotor and the bottom rotor for adjusting the gap.

In some embodiments, the rotating magnet heater further comprises an additional top rotor vertically offset from an additional bottom rotor defining an additional gap therebetween for accepting the moving metal strip; and an additional pair of support arms each coupled to one of the additional top rotor and the additional bottom rotor for adjusting the additional gap. The rotating magnet heater can include at least one actuator coupled to at least one of the pair of support arms and the additional pair of support arms for adjusting the gap in response to a signal; and a controller coupled to the at least one actuator for providing the signal. The rotating magnet heater can comprise a sensor coupled to the controller for providing a measurement to the controller, wherein the controller is configured to provide the signal based on the measurement. In some cases, the additional top rotor is laterally offset from the additional bottom rotor such that an overlap between the top rotor and the bottom rotor is less than a width of the moving metal strip. In some cases, the rotating magnet heater can comprise an idler roller coupled to an extendable support arm movable between an extended position and a retracted position, wherein at least one of the top rotor and the bottom rotor is coupled to the extendable support arm, and wherein the moving metal strip passes adjacent the top rotor and the bottom rotor when the extendable support arm is in the extended position and wherein the moving metal strip passes distant from the top rotor and the bottom rotor when the extendable support arm is in the retracted position. In some cases, the rotating magnet heater can include at least one flux director positioned adjacent at least one of the top rotor and the bottom rotor to direct magnetic flux from the at least one of the top rotor and the bottom rotor towards the gap.

In some embodiments, a method comprises passing a metal strip through a gap defined between a top rotor and a bottom rotor of a first set of magnetic rotors; passing the metal strip through an additional gap defined between an additional top rotor and an additional bottom rotor of a second set of magnetic rotors; rotating the first set of magnetic rotors to induce a moving and time varying magnetic field in the gap to heat the metal strip; rotating the second set of magnetic rotors to induce an additional moving and time varying magnetic field in the additional gap to heat the metal strip; and adjusting at least one of the gap and the additional gap such that tension (e.g., tension fluctuations) induced into the metal strip by the first set of magnetic rotors is compensated for by the second set of magnetic rotors. In some cases, the method includes taking a measurement of the metal strip, wherein adjusting at least one of the gap and the additional gap includes making an adjustment based on the measurement. In some cases, the method includes adjusting a longitudinal position of at least one of the first set of magnetic rotors and the second set of magnetic rotors. In some cases, the method includes adjusting a lateral position of at least one rotor of at least one of the first set of magnetic rotors and the second set of magnetic rotors.

Provided herein are systems and methods for curing a coating applied to a metal strip. The coating can include a paint, a lacquer, a laminate, a pretreatment, an adhesion promoter, a corrosion inhibitor, or any suitable coating applied to a metal strip. One exemplary system for curing a coating includes a curing chamber and a plurality of rotors that each have one or more magnets. The plurality of magnets can be permanent magnets and/or electromagnets. The curing chamber includes an entrance and an exit suitable for passing a coated metal strip through the curing chamber.

The plurality of rotors can be positioned within the curing chamber relative to a coated metal strip moving through the curing chamber in any suitable arrangement. In one non-limiting configuration, at least one upper magnetic rotor is positioned above the coated metal strip and at least one lower magnetic rotor is positioned below the coated metal strip. The at least one upper magnetic rotor may be aligned with the at least one lower magnetic rotor, creating a substantially vertical curing stack, or the at least one upper magnetic rotor may be offset from the at least one lower magnetic rotor to create an offset curing stack. The system can have a plurality of curing stacks. In some examples, the rotors making up each curing stack include counter-rotating rotors. In some cases, each curing stack provides an individual heating zone that is individually and precisely controllable and instantaneously adjustable. In some cases, the plurality of rotors can be positioned outside of the curing chamber and the walls of the curing chamber between the coated metal strip and the plurality of rotors can be made of a non-conducting and non-magnetic material.

In some cases, the system only includes upper magnetic rotors. In other cases, the system only includes lower magnetic rotors. Each magnetic rotor or subset of magnetic rotors can be an individual heating zone that can be individually and precisely controllable and instantaneously adjustable.

The system is configured to heat the coated metal strip and a coating on the coated metal strip by induction heating. In particular, rotating one or more magnetic rotors positioned relative to the coated metal strip induces moving or time varying magnetic fields within the metal strip. The changing magnetic fields create currents (e.g., eddy currents) within the metal strip, thus heating the metal strip (and in turn any coating applied to the metal strip) through induction heating. In some cases, the system is configured so magnetic flux from the magnetic rotors is concentrated at the surface of the metal strip.

In some configurations, a magnetic rotor above the metal strip rotates in a first direction, and a magnetic rotor below the metal strip rotates in a second opposite direction.

The magnets can be embedded within each rotor or coupled in any suitable way with a surface of each rotor. In some examples, at least a portion of each magnet is exposed. The magnets or a subset of magnets can be the same length as a longitudinal length of each rotor and embedded or attached along a longitudinal axis of each rotor. In other examples, at least some of the magnets are shorter or longer than the longitudinal length of each rotor.

Also provided herein are methods of curing a coating on a metal strip. One exemplary method includes rotating a plurality of rotors, wherein each rotor includes at least one magnet, generating heat from the plurality of rotors, and passing a coated metal strip through a curing chamber, wherein passing the coated metal strip through the curing chamber includes passing the coated metal strip through the plurality of rotors. In some cases, each rotor rotates at least 200 revolutions per minute (RPM).

Further provided herein is a method of heating a heat transfer medium comprising rotating a rotor, wherein each rotor includes at least one magnet, generating heat from the rotor, and passing the heat transfer medium to a location adjacent the rotor. In some cases, the rotor can rotate at least 200 revolutions per minute (RPM). Generating heat from the magnetic rotor can be instantaneous, precisely controlled, and instantaneously adjustable. Heat can be transferred to the heat transfer medium by induction heating. In particular, rotating one or more magnets positioned relative to the coated metal strip induces moving or time varying magnetic fields within the metal strip. The changing magnetic fields create currents (e.g., eddy currents) within the metal strip, thus heating the metal strip (and in turn any coating applied to the metal strip) through induction heating. The heat transfer medium can include water, liquid silicon, air, oil, any suitable phase changing material, or any suitable gas or liquid, and the heat transfer medium can supply heat to processes or locations adjacent the curing chamber.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
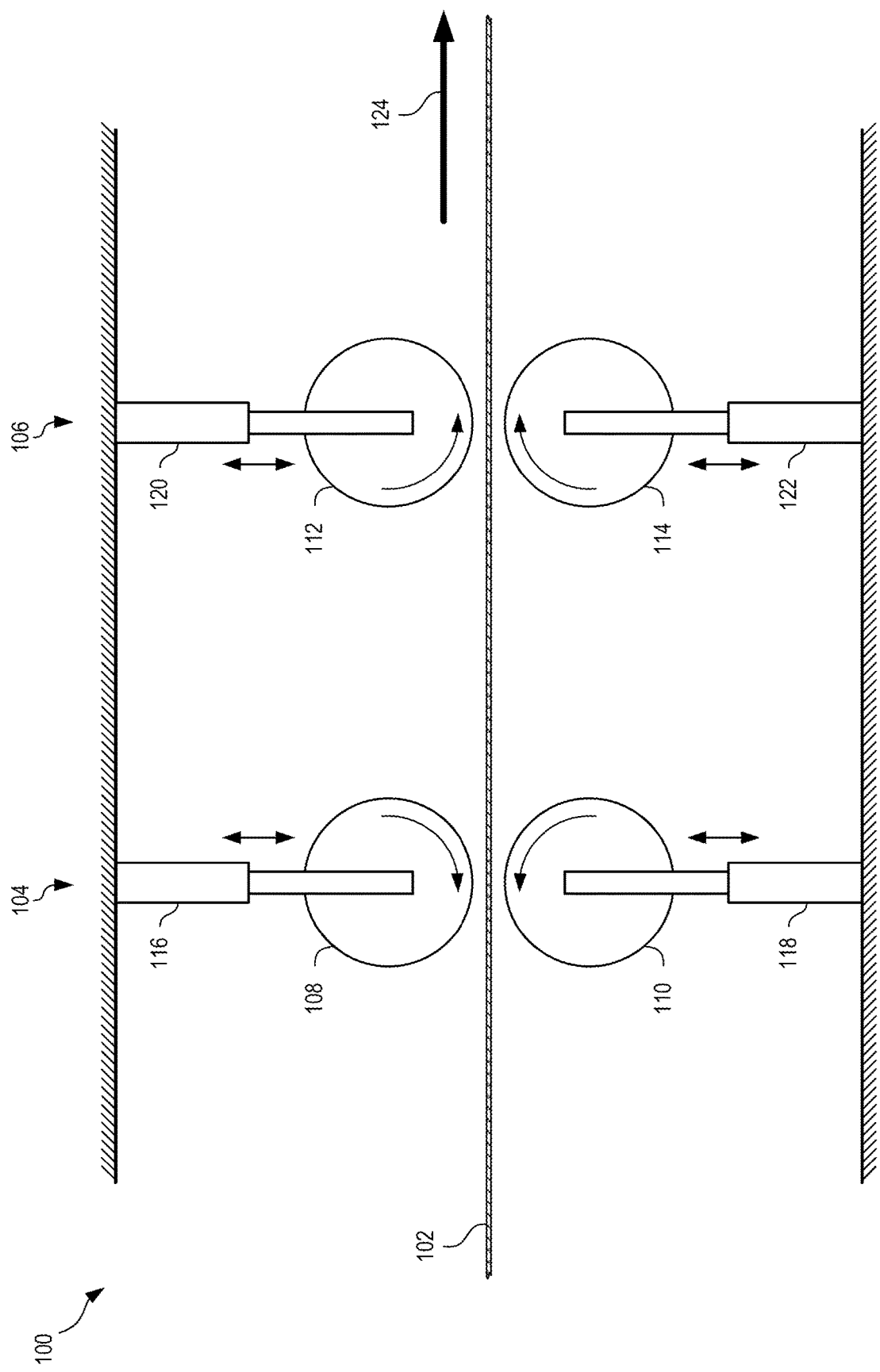
FIG. 1 is a side view of a rotating magnet heater according to certain aspects of the present disclosure.

Certain aspects and features of the present disclosure relate to a rotating magnet heater for metal products, such as metal strips, non-ferrous metal strips, and aluminum strips. The rotating magnet heater can include one or more permanent magnet rotors arranged above and/or below a moving metal strip to induce moving or time varying magnetic fields through the metal strip. The changing magnetic fields can create currents (e.g., eddy currents) within the metal strip, thus heating the metal strip. A magnetic rotor set can include one or more magnetic rotors, such as a single magnetic rotor or a pair of matched magnetic rotors on opposite sides of a metal strip that rotate at the same speed. Each magnetic rotor of a set can be positioned equidistance from the metal strip to avoid pulling the metal strip away from the passline. A downstream magnetic rotor set can be used in close proximity to an upstream magnetic rotor set to offset tension induced by the upstream magnetic rotor set. The use of one or more magnetic rotors, as well as optional other heating or controlling elements, can induce a tailored temperature profile on a metal article. The tailored temperature profile can be a specific temperature profile across a lateral width of the metal article, including a uniform or substantially uniform temperature profile.

As used herein, the terms "above," "below," "vertical," and "horizontal" are used to describe relative orientations with respect to a metal strip as if the metal strip were moving in a horizontal direction with its top and bottom surfaces generally parallel to the ground. The term "vertical" as used herein can refer to a direction perpendicular to a surface (e.g., top or bottom surface) of the metal strip, regardless of the orientation of the metal strip. The term "horizontal" as used herein can refer to a direction parallel to a surface (e.g., top or bottom surface) of the metal strip, such as a direction parallel to the direction of travel of a moving metal strip, regardless of the orientation of the metal strip. The terms "above" and "below" can refer to locations beyond top or bottom surfaces of a metal strip, regardless of the orientation of the metal strip. In some cases, a metal strip can move in a horizontal direction, a vertical direction, or any other direction, such as diagonal.

A rotating magnet heater can be used on any suitable metal strip capable of generating eddy currents in the presence of moving and time varying magnetic fields, but may be especially suitable for use with aluminum metal strips. As used herein, the terms vertical, longitudinal, and lateral can be used with reference to the metal strip being heated. The longitudinal direction can extend along a direction of travel of a metal strip through processing equipment, such as along a passline through a continuous annealing solution heat treatment (CASH) line or other equipment. The longitudinal direction can be parallel to the top and bottom surfaces of the metal strip, as well as the side edges of the metal strip. The longitudinal direction can be perpendicular to the lateral direction and the vertical direction. The lateral direction can extend between the side edges of the metal strip. The lateral direction can extend in a direction perpendicular to the longitudinal direction and the vertical direction. The vertical direction can extend between the top and bottom surfaces of the metal strip. The vertical direction can be perpendicular to the longitudinal direction and the lateral direction.

Aspects and features of the present disclosure are described herein with respect to metal strips, such as continuously-cast or uncoiled metal strips, however the present disclosure can also be used with any suitable metal products, such as in the form of foils, sheets, slabs, plates, shates, or other metal products. The aspects and features of the present disclosure can be especially suitable for any metal product having flat surfaces. The aspects and features of the present disclosure can be especially suitable for any metal product having parallel or approximately parallel opposing surfaces (e.g., top and bottom surfaces). As used throughout this application, approximately parallel can include parallel or within 1°, 2°, 3°, 4°, 5°, 6°, 7°, 8°, 9° or 10° of parallel, as appropriate. As used throughout this application, approximately perpendicular can include perpendicular or within 1°, 2°, 3°, 4°, 5°, 6°, 7°, 8°, 9° or 10° of perpendicular, as appropriate. In some cases, approximately parallel or approximately perpendicular may include elements that are more than 10° off parallel or off perpendicular, respectively.

Precise heating control can be achieved when using a rotating magnet heater. Such precise control can be achieved through manipulation of various factors, including strength of magnets in the rotor, number of magnets in the rotor, orientation of magnets in the rotor, size of magnets in the rotor, speed of the rotor, size of the rotor, vertical gap between vertically offset rotors in a single rotor set, laterally offset placement of rotors in a single rotor set, longitudinal gap between adjacent rotor sets, thickness of the strip being heated, vertical distance between the rotor and the strip being heated, forward speed of the strip being heated, and number of rotors sets used. Other factors can be controlled as well. In some cases, control of one or more of the aforementioned factors, among others, can be based on a computer model, operator feedback, or automatic feedback (e.g., based on signals from realtime sensors).

Each magnetic rotor can include one or more magnetic sources, such as permanent magnets or electromagnets. Permanent magnet rotors may be preferable in some cases and may be able to achieve more efficient results than rotors having internal electromagnets. Each magnetic rotor can rotate about an axis of rotation that is perpendicular or approximately perpendicular a longitudinal axis of the metal strip passing adjacent the rotor. In other words, each magnetic rotor can rotate about an axis of rotation that is perpendicular or approximately perpendicular a processing direction (e.g., a rolling direction or downstream direction) of the metal strip. The axis of rotation of a magnetic rotor can also be parallel or approximately parallel a lateral width of the metal strip. In an example, a magnetic rotor that is perpendicular a downstream direction and parallel a lateral width of the metal strip can advantageously provide heating power and tension control (e.g., longitudinal tension control) simultaneously. In some cases, an axis of rotation of a magnetic rotor can be perpendicular a processing direction and coplanar a lateral width of the metal strip, in which case the axis of rotation can be intentionally angled (e.g., angled with one end of the magnetic rotor closer the metal strip than the other end) to achieved desired control over the temperature profile in the metal article. In some cases, an axis of rotation of a magnetic rotor can be perpendicular a height of the metal strip and can fall within an plane parallel and spaced apart from a plane formed by the lateral width of the metal strip and the processing direction, in which case the axis of rotation can be intentionally angled (e.g., angled with one end of the magnetic rotor further downstream than the other end) to achieved desired control over the temperature profile in the metal article. In some cases, the axis of rotation of a magnetic rotor can be otherwise angled. The rotational movement of the rotor causes the magnet sources to induce a moving or changing magnetic field. The rotor can be rotated through any suitable method, including through a rotor motor (e.g., electric motor, pneumatic motor, or otherwise) or sympathetic movement of a nearby magnetic source (e.g., another magnetic rotor).

The use of a rotating magnetic rotor, as opposed to stationary electromagnets, can allow for improved efficiency, as well as more even heating of the metal strip. Using stationary electromagnets to vary inductive fields imparted across the width of the strip can generate localized hotspots in the strip. Inductive fields of various intensities can be caused by the natural variance in the windings of different stationary electromagnets. Variances in electromagnet windings can result in some locations generating more heat than adjacent lateral locations. Localized hotspots can unevenly deform the strip and can cause other manufacturing defects. By contrast, while permanent magnets may include some level of inherent magnetic variance across dimensions or from one magnet to another, this variance is automatically averaged out due to the rotation of the permanent magnets in the rotor. No single permanent magnet is being held at any laterally stationary position, and thus an average magnetic field is being applied by the rotating permanent magnets. Thus, the rotating magnetic rotor is able to heat the metal strip evenly in a more controlled manner. When electromagnets are used in a rotating magnet heater, variances between different electromagnets can be averaged out due to rotation of the rotor. This averaging-out of the variances does not occur with stationary electromagnets.

A rotor set can include one or more rotors. In some cases, a rotor set includes two vertically offset rotors forming a gap therebetween through which the metal strip may be passed. The size of the gap (e.g., vertical gap) between the rotors in a rotor set can be controlled through the use of appropriate actuators, such as linear actuators (e.g., hydraulic pistons, screw drives, or other such actuators). The vertical position of each rotor in a rotor set may be individually controllable, or the vertical position of both a top and bottom rotor of a rotor set may be simultaneously controllable by a single actuator responsible for control of the vertical gap. The vertical gap can be centered around a desired or actual passline of the metal strip. In some cases, the rotors of a rotor set will rotate in synchrony, at least due to the magnetic attraction between them. For example, when a south pole of a top rotor is facing down, towards the strip, a north pole of the bottom rotor may face upwards, towards the strip.

In some cases, a rotor set can include a single rotor located on either side of the metal strip. In some cases, a rotor set including a single rotor can optionally include an opposing element located opposite the metal strip from the rotor. The opposing element can facilitate the movement of magnetic flux through the metal strip and/or can provide mechanical support for the metal strip. Examples of suitable opposing elements include stationary plates (e.g., an iron or steel plate) and support rollers (e.g., a steel roller). In some cases, the use of a single rotor can facilitate self-regulating of the temperature increases induced in the metal strip due to the moving magnetic field. In some cases, the use of an odd number of rotors in a rotor set (e.g., 1, 3, 5, or 7 rotors) can result in an uneven amount of force being applied to the metal strip to move the metal strip away from a desired passline. In some cases, additional supports (e.g., support rollers or pressurized fluid/air nozzles) can be provided to maintain the metal strip at the desired passline. In some cases, the position of rotors in the rotor set can be staggered to keep the metal strip close to the desired passline.

A rotor set can rotate in a "downstream" direction or an "upstream" direction. As used herein, a rotor set rotating in a downstream direction provides a nonzero force that urges the metal strip in its longitudinal direction of travel. For example, when looking at a metal strip from the side with the metal strip moving in its longitudinal direction of travel to the right, the top rotor of a rotor set rotating in a downstream direction can rotate counterclockwise while the bottom rotor rotates clockwise. As used herein, a rotor set rotating in an upstream direction provides a nonzero force that urges the metal strip in a direction opposite its longitudinal direction of travel. For example, when looking at a metal strip from the side with the metal strip moving in its longitudinal direction of travel to the right, the top rotor of a rotor set rotating in an upstream direction can rotate clockwise while the bottom rotor rotates counterclockwise.

In some cases, magnetic flux concentrators can be used adjacent the rotors. A magnetic flux concentrator can be any suitable material capable of redirecting magnetic flux. The magnetic flux concentrator can receive magnetic flux from magnets in the rotor that are not near or directly facing the strip and redirect that magnetic flux towards the strip (e.g., in a direction perpendicular to a top or bottom surface of the strip). Magnetic flux concentrators can also provide benefits of magnetic shielding between the rotor and adjacent equipment other than the metal strip being heated. For example, magnetic flux concentrators can allow adjacent, longitudinally offset rotor sets to be placed closer to one another with less magnetic interaction between the two. Magnetic flux concentrators can be made of any suitable material, including silicon alloyed steel (e.g., electrical steel). A magnetic flux concentrator may comprise multiple laminations. Magnetic flux concentrators can be flux diverters or flux controllers. When magnetic flux concentrators are used, the rotors may be able to achieve efficient results at lower rotational speeds and the magnets may be able to be placed further from the metal strip.

A rotating magnet heater can include one or more rotor sets. In some cases, the rotating magnet heater includes at least two rotor sets including an upstream rotor set and a downstream rotor set. When at least two rotor sets are used, one rotor set can offset any longitudinal tension induced by another of the rotor sets. In some cases, multiple rotor sets may counteract longitudinal tension induced by a single rotor set, or a single rotor set may counteract longitudinal tension induced by multiple rotor sets. In some cases, the total number of rotor sets is even (e.g., two, four, six, etc.). As used herein, a rotor grouping is a collection of two or more rotor sets that provide a net effect to the longitudinal tension of the metal strip that is at or below 0%, 1%, 2%, 3%, 4%, 5%, 6%, 7%, 8%, 9%, or 10%. For example, a rotor grouping may include an upstream magnetic rotor set that rotates in a downstream direction, thereby inducing tension in the longitudinal direction of travel of the metal strip, along with a downstream magnetic rotor set rotating in an upstream direction, thereby reducing or counteracting the induced tension from the upstream rotor set. Because the characteristics of the metal strip may change when heat is added by each rotor set, the characteristics of each of the rotor sets in a rotor grouping can be controlled to appropriately counteract induced tension. For example, the vertical gap of a first rotor set can be dynamically adjusted to induce appropriate tension that counteracts or is counteracted by a second rotor set with a known or fixed vertical gap. While it may be desirable to adjust the vertical gap between the rotors when controlling the amount of tension to apply to a metal strip, other variables may be adjusted as well, such as rotational speed.

Due to the nature and orientation of the rotors in a rotating magnet heater, a rotating magnet heater can be easily installed, removed, and maintained in a line of processing equipment. The rotating magnet heater may occupy less room than stationary electromagnetic induction heaters. Further, many stationary electromagnetic induction heaters require coils wrapped around the metal strip being heated, thus requiring complex connections and/or maneuvers to remove the metal strip from the induction coils. If necessary, a metal strip can be immediately and easily removed from a rotating magnet heater. In some cases, the vertical and/or lateral controls of a rotating magnet heater can be used to move the rotating magnet heater away from the metal strip and/or passline between runs, for maintenance, for threading the strip through the processing equipment, or simply when the additional heat is not desired for a portion of the metal strip.

Current magnetic heating techniques, such as stationary electromagnetic induction heaters, generally provide inefficient heating, such as heating with efficiencies at or below 50%, 45%, or 40%. Rotating magnet heaters, as disclosed herein, can operate at much greater efficiencies, such as efficiencies at or above 40%, 45%, 50%, 55%, 60%, 65%, 70%, 75%, 80%, or 85%. Further, rotating magnet heaters can provide the same amount of heating in a smaller space than many current magnetic or electromagnetic heating techniques. Additionally, the vertical gap between the rotors can be adjusted in a rotating magnetic heater, allowing for more room to be created in the event a metal strip begins to veer away from a desired passline, thus avoiding the metal strip contacting the rotating magnet heater and potentially causing damage to the heater or the metal strip. In contrast, many current magnetic heating techniques, such as stationary electromagnetic induction heaters, are unable to adjust their gap, which can lead to undesired impact if the metal strip begins to veer off of the desired passline.

Additionally, the use of permanent magnets may require less energy to apply the desired heat energy as compared to electromagnets, especially as the operating temperatures increase. When operating temperatures increase too far, electromagnets no longer work properly and significant resources must be spent to sufficiently cool the electromagnets. By contrast, permanent magnets can work at higher temperatures, do not generate heat by themselves, and may require less cooling.

As necessary, temperature control can be applied to the rotors or any adjacent equipment to maintain high efficiency operations and/or safe operating conditions. Temperature control can include forced air, liquid, or other fluid heat exchange mechanisms. Temperature control can be combined with magnetic flux concentrators to ensure equipment adjacent the rotors does not overheat.

A rotating magnet heater can be especially suitable for processes in which physical contact with the metal strip is undesirable. For example, rotating magnet heaters can be especially useful in CASH lines (e.g., as a re-heater or a pre-heater for a flotation furnace). In a CASH line, metal passes through numerous sections under low tension. Some CASH lines may be up to approximately 800 meters long or longer. In certain sections, such as the furnace and the cooling sections, the metal strip may be unsupported by rollers or other contacting devices. The metal strip may pass through unsupported sections of approximately 100 meters and longer. As future CASH lines are developed, these lengths may become longer. In the unsupported sections, the metal strip can be floated on cushions of fluid (e.g., a gas or air). It may be desirable to provide heat (e.g., heat energy) to the metal strip during these unsupported sections. Therefore, it can be desirable to use non-contacting rotating magnet heaters in these sections. Optionally, the addition of a rotating magnet heater before these unsupported sections can aid to rapidly heat the strip, thereby minimizing the need for longer unsupported sections. Moreover, the strip passing through a vertical set of non-contacting rotating magnet experiences a vertical repulsive force from each magnet resulting in a vertical stabilization of the strip in the middle of the gap of the rotating magnets.

Certain aspects of the present disclosure may be especially well suited for drying a metal strip. One or more rotating magnet heaters can heat the metal strip without contacting the metal strip and can facilitate evaporation of liquid on surfaces of the metal strip. Certain aspects of the present disclosure may be especially well suited for reheating a metal strip over a short distance. In some cases, a rotating magnet heater can rapidly reheat a metal strip, such as following a quench (e.g., after a rapid quench after hot rolling to gauge).

Certain aspects of the present disclosure may be especially well suited for controlling strip temperature without imparting undesirable temperature changes to lubricant or other fluids on the surface of the metal strip. For example, some lubricants can have undesirable properties at high temperatures. When a metal strip is heated in a furnace or through application of hot air or direct flame impingement, the lubricant on the surface of the metal strip can be heated from the hot furnace, hot air, or direct flame, and can quickly reach undesirable temperatures before the metal strip itself has been heated to the desired temperature for the desired length of time. However, with the use of rotating magnet heaters, the changing magnetic fields induced by the relative motion of the magnets with respect to the metal strip would not directly impart temperature changes on the lubricant, but would rather heat the metal strip itself. In such cases, the lubricant may be substantially or only heated through thermal conduction from the metal strip. Thus, the metal strip may be heated to a desired temperature for a desired length of time with a decreased risk or no risk of the lubricant reaching undesirable temperatures. In some cases, heating using other techniques can risk overheating the coating.

Some traditional techniques for curing a coating, such as gas-fired ovens and infrared heaters, heat the coating from the external surface inwards (e.g., from the external surface of the coating towards the interface between the coating and the metal article). Thus, traditional techniques tend to heat the surface of the coating first, which often has a higher concentration of paint or other material than further below the surface of the coating, which can contain a higher concentration of solvent. As a result, current techniques use very specifically designed solvents to ensure bubbles do not form during heating, which can detrimentally affect the surface of the coating, which had been heated first in traditional techniques. By contrast, certain aspects of the present disclosure permit the coating to be heated from the inside out (e.g., from the interface with the metal article out towards the surface of the coating). Thus, there is less concern from solvent bubbles, since the surface of the coating is the last part of the coating to be heated. Therefore, certain aspects of the present disclosure can enable the use of more different types of solvents or solvents with less stringent requirements.

Additionally, some traditional techniques for curing a coating require the presence of a high-temperature atmosphere near the coating being cured, such as the hot gasses within a gas-fired oven or the hot air adjacent infrared heaters. Since solvents can evaporate into a surrounding atmosphere, there is increased risk of explosion or ignition as that atmosphere increases in temperature. For example, an atmosphere at 300° C. can have a much higher explosive potential than an atmosphere at room temperature. Thus, the traditional techniques can be effectively limited by safety concerns, which can result in a decrease in line speed or processing speed, as well as a decrease in the amount or types of solvents permitted to be used in a particular coating. By contrast, certain aspects of the present disclosure permit the coating to be heated from the inside out, which can occur in a surrounding atmosphere that is much lower than traditional techniques, such as a surrounding atmosphere that is at or near ambient (e.g., room) temperature. Thus, certain aspects of the present disclosure can enable faster line speeds or processing speeds, as well as enable the use of greater amounts of solvents and different types of solvents that may have been unusable for traditional techniques.

Certain aspects of the present disclosure may be especially well suited for increasing or decreasing tension in the metal strip without contacting the metal strip while simultaneously providing heat to the metal strip. For example, when a metal strip is to be heated after unwinding from a coil, one or more rotors all rotating in the same direction (e.g., upstream towards the unwinder) can act to reduce the tension in the metal strip after each rotor. Likewise, when a metal strip is to be heated before winding onto a coil, one or more rotors all rotating in the same direction (e.g., downstream towards the rewinder) can increase the tension in the metal strip as it approaches the rewinder, while simultaneously increasing the temperature of the metal strip. Tension can be controlled anywhere during metal processing, such as before or after any suitable processing equipment, including equipment other than unwinders and rewinders.

Certain aspects of the present disclosure may be especially well suited for heating a surface portion of the metal strip to a desired depth. For example, the rotating magnet heaters can be positioned to heat the surface of the metal strip down to a desired depth (e.g., 1%, 2%, 3%, 4%, 5%, 6%, 7%, 8%, 9%, 10, 1%, 12%, 13%, 14%, 15%, 16%, 17%, 18%, 19%, or 20% of the thickness of the metal strip) without substantially heating the center of the metal strip.

In some cases, a rotating magnet heater can be especially useful for fusion products where a metal strip includes a core section made of a different material than a clad section. The adjustable parameters of the rotating magnet heater can be manipulated to achieve desired results based on the type of materials selected for the clad and core and based on the thickness of the clad.

In some cases, the amount of magnetic flux applied to the metal strip can be adjusted through various techniques. A rotating magnet heater's applied flux can be adjusted offline (e.g., prior to passing a metal strip adjacent the rotating magnet heater) or dynamically (e.g., adjusting while a metal strip is passing adjacent the rotating magnet heater). In some cases, the amount of magnetic flux applied by the rotating magnet heater can vary along the width of the heater. For example, when a constant-flux rotor is used, the metal strip may carry a temperature profile (e.g., temperature profile along the width of the metal strip) that includes hot spots near the edges and cool spots just inward of the edges. To combat such a temperature profile and instead attempt to achieve a flat temperature profile, a rotating magnet heater can have a flux that varies across its width, such as providing increased flux at the locations of the cold spots and decreased flux at the locations of the hot spots. As described herein, other techniques can be used to combat hot spots to achieve a desired temperature profile (e.g., tailored temperature profile) across the metal article, such as a uniform temperature profile across a lateral width of the metal article.

Magnetic flux of a rotating magnet heater can be adjusted offline or dynamically in various ways. In some cases, flux concentrators can be added to the rotor at desired locations to increase flux therethrough. For example, electrical steel, also known as laminated steel or transformer steel, can be used as a suitable flux concentrator. In some cases, a flux concentrator can be placed adjacent a radial end of each of the individual magnets at a particular lateral position on the rotor. In some cases, the stronger or weaker magnets can be selected for inclusion at specific locations in the rotor. In some cases, larger magnets (e.g., larger diameter or thickness) can be used at locations where increased flux is desired and smaller magnets can be used at locations where less flux is desired. In some cases, magnetically opaque or magnetically translucent materials can be used to inhibit flux at undesired locations. In some cases, a rotor can be made of numerous axially-aligned sub-rotors. To achieve increased or decreased flux at various locations in the rotor, the sub-rotors at that location can spin faster or slower than the other sub-rotors of the rotor. In some cases, each sub-rotor can be individually controlled, such as through individual motors. In some cases, each sub-rotor can be mechanically coupled to one another or coupled to a single driving motor using gears to achieve the desired rotation speeds with respect to one another. In some cases, a transmission (e.g., transmission with multiple gear sizes or a continuously variable transmission) can allow the speeds of certain sub-rotors with respect to the speed of other sub-rotors to be adjusted dynamically.

Magnets (e.g., magnetic sources) in rotors can have any desirable magnetic flux profile. In some cases, a flat profile may be desirable. In some cases, a flux profile can be designed to minimize the risk of hot or cold spots in the metal strip. In some cases, a flux profile can be variable in a fashion that provides improved flexibility to provide various different amounts of flux through the metal strip depending on the position and/or orientation of the rotor. In an example, a rotor can have a flux profile taking a continuously variable crown shape and may optionally be placed opposite a rotor having a complementary flux profile. Controlling the position and/or orientation of the rotor can allow the amount of flux passing through the metal strip to be adjusted as desired.

In some cases, the amount of magnetic flux applied to the metal strip can be adjusted by inserting a piece of magnetically translucent or magnetically opaque material between the rotor and the metal strip.

In use, a rotating magnet heater provides heat to an adjacent metal strip by inducing eddy currents within the metal strip. The eddy currents induced come from the moving and time varying magnetic fields generated by the rotors and by the relative movement of the metal strip past the rotors. The moving and time varying magnetic fields can be modeled in up to four subparts, including a first part attributable to movement of the metal strip past the rotors, a second part attributable to rotation of the magnets around the axis of rotation of the rotor, a third part attributable to rotation of the orientation of the magnets as they rotate around the axis of rotation of the rotor, and a fourth part attributable to attenuation or concentration of flux due to additional devices such as shielding or flux concentrators at localized areas along the strip. The modeling of heat generation in the moving metal strip is further complicated due to the change in inductance and/or resistivity of the metal strip as its physical properties (e.g., temperature) change. Also, surface effects (e.g., uneven heating across the vertical height of the strip) and edge effects (e.g., uneven heating across the lateral width of the strip) can further complicate modeling. Through numerous models and experimentation, various aspects and features of the present disclosure as described in further detail herein have been found to be especially suitable for heating metal strips with high efficiency.

Certain aspects and features of the present disclosure are described with reference to a moving metal strip, such as a moving metal strip passing adjacent a rotating magnet heater. The concepts applicable to a moving metal strip can be likewise applicable to stationary metal (e.g., stationary metal strips, plates, shates, or other metal products) adjacent to a moving, rotating magnet heater. For example, instead of a metal strip moving adjacent a rotor, the metal strip can be held stationary while the rotor is translated along a length of the stationary metal strip, such as while the rotor is also rotating. Additionally, certain aspects and features of the present disclosure can be suitable for use with pieces of metal other than metal strips, moving or stationary. For example, rotating magnetic heaters can be used with rolled bars, extrusions, slabs (e.g., greater than 10 mm in thickness), metal greater than 50 mm or 100 mm in thickness, bars greater than 400 mm to 500 mm in diameter, non-symmetrical metal products, or other suitable metal products.

In some cases, rotating magnetic heaters as described herein can be arranged around a metal product. Magnetic rotors, such as those described herein, can be arranged symmetrically or equally-distributed around a metal product, such as adjacent opposing faces of a metal strip (e.g., top and bottom rotors) or in a triple orientation around a metal bar (e.g., magnetic rotors equally spaced at 120° angles from one another as viewed in the direction of relative motion of the metal bar with respect to the magnetic rotors). The arrangement of magnetic rotors around a metal product can be selected to achieve desired heating in the metal product. In some cases, an arrangement of magnetic rotors can focus the most magnetic flux through a center of a metal product (e.g., a metal rod) to provide more heat to the center of the metal product than the outer surface of the metal product, thus allowing the center to heat faster than the outer surface of the metal product. Any number of magnetic rotors can be used in an arrangement, such as one magnetic rotor, two magnetic rotors (e.g., arranged at 180° angles from one another), three magnetic rotors (e.g., arranged at 120° angles from one another), four magnetic rotors (e.g., arranged at 90° angles from one another), or more. In some cases, magnetic rotors in an arrangement can be oriented symmetrically or equally-distributed about a central axis (e.g., longitudinal axis of the metal strip), however in some cases the magnetic rotors can be arranged asymmetrically or with uneven distribution around the metal product.

Certain aspects and features of the present disclosure relate to rotating magnet heaters providing a changing magnetic field (e.g., changing magnetic flux) through a metal strip. In some cases, other sources of changing magnetic fields can be used, such as electromagnets; magnets moving in a non-circular path, such as along a belt (e.g., similar to a tank tread) or in an elongated path; magnets rotating on a disc; or other such sources of changing magnetic fields. In some cases, rotating magnet heaters as described herein may have advantages over other sources of changing magnetic fields, although other sources of changing magnetic fields can be used as applicable.

Certain aspects and features of the present disclosure can be used to provide spot-heating to a localized location on a metal strip or other metal product. The location can be defined in one, two, or three dimensions. For example, the location can be defined as a location along a lateral width of the metal strip, thus resulting in magnetic heating to the entire length of the metal strip at that lateral width. In another example, the location can be defined as a location along both a lateral width and longitudinal length of the metal strip, thus resulting in magnetic heating to certain portions of the metal strip (e.g., 10 cm×10 cm square portion of the metal strip repeating every 1 m). This two-dimensional localized heating can be achieved by altering the relative movement of the metal strip and the magnetic heater (e.g., using a stationary metal strip, a moving magnetic heater, or otherwise). In some cases, a third dimension of localization can be provided by concentrating magnetic flux at particular depths in the metal strip. This type of spot-heating can provide spot-annealing capabilities to a magnetic heater, allowing for certain portions of a metal product (e.g., a metal strip) to be annealed without annealing other portions of the metal product. This spot-annealing can be useful, especially when high strength is desired for a metal product, but increased formability is needed in the region where a stamping process takes place.

In some cases, painted or coated material strips, such as metal strips, require subsequent curing procedures to remove water, solvents and/or other suitable additives contained in a coating for application procedures. Curing may be required, for example, to provide a smooth and well-adhering coating to the material strip. Curing parameters can affect coating characteristics of a metal strip including adhesion, gloss, color, surface lubricity, overall sheet shape, and mechanical properties, to name a few. According to certain aspects and features of the present disclosure, magnetic rotors can be used to cure coatings on metal articles, such as metal strips. One exemplary system includes rotors with magnets housed in a curing chamber. Rotating rotors with associated magnets can induce moving or time varying magnetic fields within the coated metal strip. The changing magnetic fields can create currents (e.g., eddy currents) within the metal strip, thus heating the metal strip and its coating. Additionally, rotating magnets can be used to heat water or any other suitable heat exchanging matter for use in other systems or processes.

In some non-limiting examples, a system for curing a coating on a metal or other material strip includes a curing chamber and a plurality of rotors, each of the rotors including at least one magnet. Suitable coatings to be cured by the disclosed systems and methods include organic coatings, inorganic coatings, hybrid organic-inorganic coatings, water-borne coatings, solvent-borne coatings, paints, adhesives, lacquers, powder coatings, and/or laminates, or others.

In some cases, magnetic rotors can be useful for providing heating to subsequent metal articles that have different thermal needs (e.g., desired temperature setpoints). For example, a first metal article and a subsequent metal article may be processed immediately after one another on the same piece of equipment and the use of magnetic rotors for providing heating can allow the system to rapidly adjust from a temperature setpoint for the first metal article to the temperature setpoint for the second metal article. This rapid adjustment can help reduce the amount of material that must be scrapped during a transition between subsequent metal articles.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a side view of a rotating magnet heater 100 according to certain aspects of the present disclosure. The rotating magnet heater 100 can include any number of rotors 108, 110, 112, 114 and rotor sets 104, 106. As seen in FIG. 1, the rotating magnet heater 100 includes a first rotor set 104 and a second rotor set 106. The first rotor set 104 includes a first top rotor 108 and a first bottom rotor 110 vertically spaced apart and defining a gap therebetween. In some cases, as mentioned above, a rotor set includes only a top rotor. In other cases, a rotor set includes only a bottom rotor. A metal strip 102 can be passed through the vertical gap in direction 124. The first top rotor 108 can be supported by a first top rotor support arm 116, which can be fixed or actuatable to move in a vertical direction to adjust the vertical gap in the first rotor set 104. The first bottom rotor 110 can be supported by a first bottom rotor support arm 118, which can be fixed or actuatable to move in a vertical direction to adjust the vertical gap in the first rotor set 104. In some cases, one or both of the first top and bottom rotor support arms 116, 118 can be vertically fixed or adjustable. The first rotor set 104 is shown operating in an upstream direction, wherein the first top rotor 108 is depicted as rotating in a clockwise direction while the first bottom rotor 110 is depicted as rotating in a counterclockwise direction.

The second rotor set 106 includes a second top rotor 112 and a second bottom rotor 114 vertically spaced apart and defining a gap therebetween. A metal strip 102 can be passed through the vertical gap in direction 124. The second top rotor 112 can be supported by a second top rotor support arm 120, which can be fixed or actuatable to move in a vertical direction to adjust the vertical gap in the second rotor set 104. The second bottom rotor 114 can be supported by a second bottom rotor support arm 122, which can be fixed or actuatable to move in a vertical direction to adjust the vertical gap in the second rotor set 104. In some cases, one or both of the second top and bottom rotor support arms 120, 122 can be vertically fixed or adjustable. The second rotor set 104 is shown operating in a downstream direction, wherein the second top rotor 112 is depicted as rotating in a counterclockwise direction while the second bottom rotor 114 is depicted as rotating in a clockwise direction.

Rotor sets can be arranged to rotate in any suitable direction. In some cases, the first rotor set 104 can operate in a downstream direction, wherein the first top rotor 108 rotates in a counterclockwise direction while the first bottom rotor 110 rotates in a clockwise direction. The second rotor set 104 can operate in an upstream direction, wherein the second top rotor 112 rotates in a clockwise direction while the second bottom rotor 114 rotates in a counterclockwise direction. In some cases adjacent rotor sets (e.g., first rotor set 104 and second rotor set 106) can operate in opposing directions (e.g., upstream and downstream as depicted in FIG. 1), which can facilitate counteracting any tension changes induced by one of the rotor sets. In some cases, as described in further detail herein, adjacent rotor sets can operate in the same direction, such as to induce tension changes in the metal strip.

In some cases, a rotating magnet heater can include additional rotor sets, such as 3, 4, 5, 6, 7, 8, or more rotor sets. In other cases, a rotating magnet heater can include only a single rotor set. Each rotor 108, 110, 112, 114 can include one or more magnetic sources. A magnetic source can be any source or magnetic flux, such as a permanent magnet or an electromagnet. In some cases, a rotor includes at least one permanent magnet.

Figure 2:
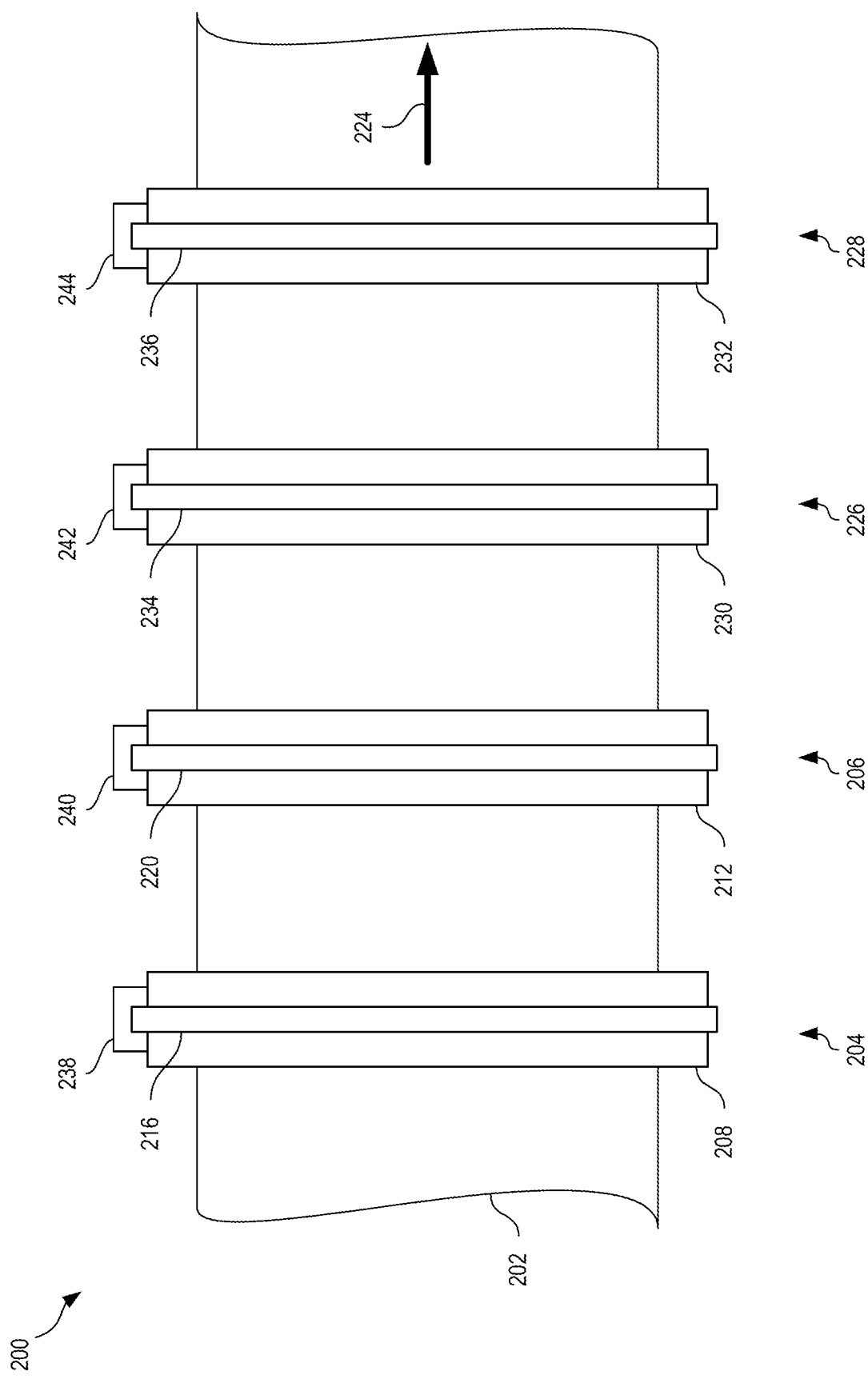
FIG. 2 is a top view of a rotating magnet heater according to certain aspects of the present disclosure.

FIG. 2 is a top view of a rotating magnet heater 200 according to certain aspects of the present disclosure. The rotating magnet heater 200 can be similar to the rotating magnet heater 100 of FIG. 1, although with four rotor sets 204, 206, 226, 228 shown. The metal strip 202 can pass through the vertical gaps of each of the four rotor sets 204, 206, 226, 228 in direction 224. As seen from above, the first rotor set 204 can include a first top rotor 208 supported by a first top rotor support arm 216 and driven by a first top rotor motor 238, the second rotor set 206 can include a second top rotor 212 supported by a second top rotor support arm 220 and driven by a second top rotor motor 240, the third rotor set 226 can include a third top rotor 230 supported by a third top rotor support arm 234 and driven by a third top rotor motor 242, and the fourth rotor set 228 can include a fourth top rotor 232 supported by a fourth top rotor support arm 236 and driven by a fourth top rotor motor 244. The bottom rotors of each of the rotor sets in FIG. 2 are laterally aligned with their respective top rotors, and therefore are not visible in FIG. 2.

Figure 3:
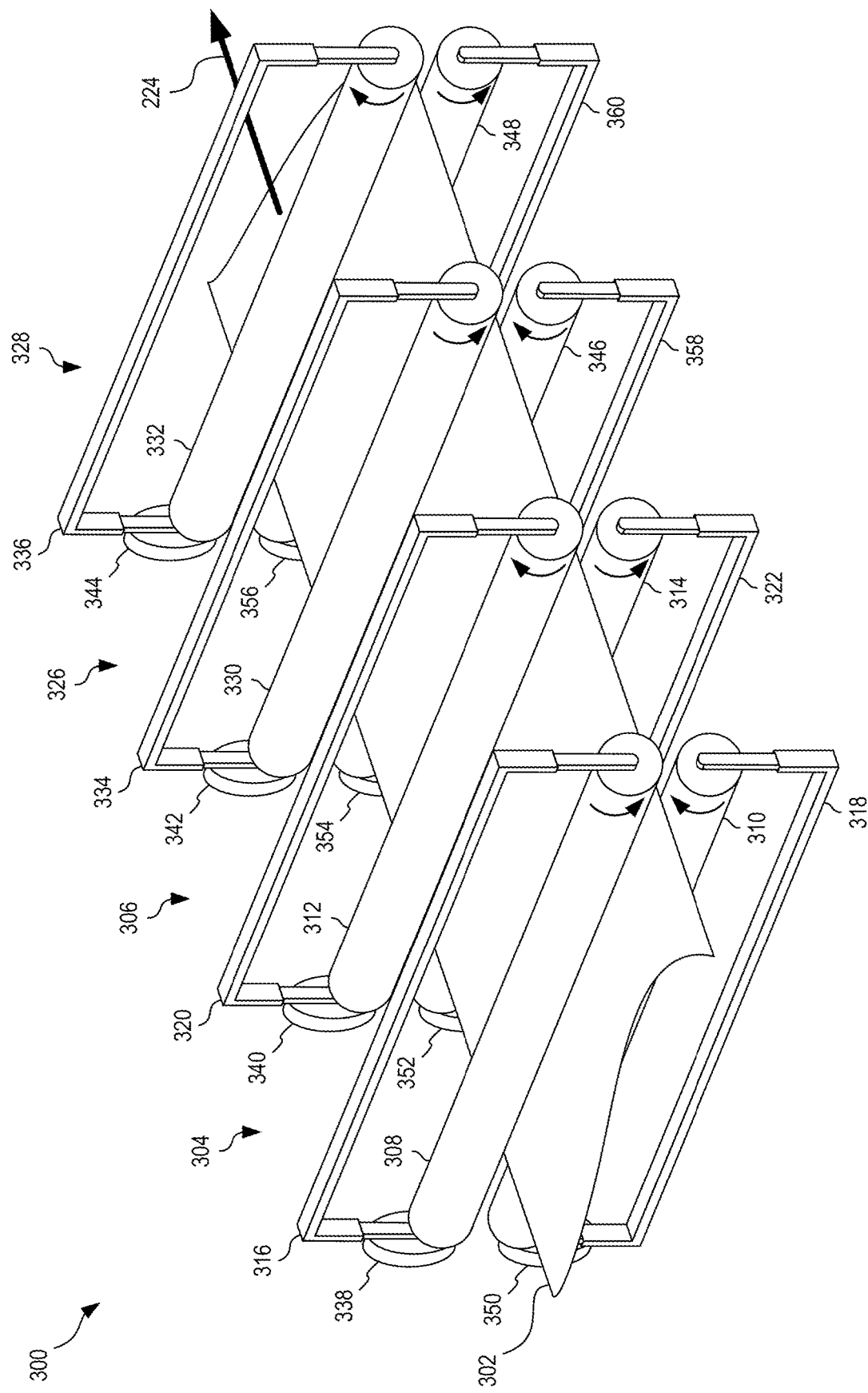
FIG. 3 is an axonometric projection of a rotating magnet heater according to certain aspects of the present disclosure.

FIG. 3 is an axonometric projection of a rotating magnet heater 300 according to certain aspects of the present disclosure. Rotating magnet heater 300 can be similar to rotating magnet heater 200 of FIG. 2. The first rotor set 304 includes a first top rotor 308 supported by a first top rotor support arm 316 and driven by a first top rotor motor 338 as well as a first bottom rotor 310 supported by a first bottom rotor support arm 318 and powered by a first bottom rotor motor 350. The second rotor set 306 includes a second top rotor 312 supported by a second top rotor support arm 320 and driven by a second top rotor motor 340 as well as a second bottom rotor 314 supported by a second bottom rotor support arm 322 and powered by a second bottom rotor motor 352. The third rotor set 326 includes a third top rotor 330 supported by a third top rotor support arm 334 and driven by a third top rotor motor 342 as well as a third bottom rotor 346 supported by a third bottom rotor support arm 358 and powered by a third bottom rotor motor 354. The fourth rotor set 328 includes a fourth top rotor 332 supported by a fourth top rotor support arm 336 and driven by a fourth top rotor motor 344 as well as a fourth bottom rotor 348 supported by a fourth bottom rotor support arm 360 and powered by a fourth bottom rotor motor 356.

Any suitable source of motive force can be used in place of a rotor motor. Any suitable motor can be used as a rotor motor. In some cases, the rotor motors can be rotationally coupled to their respective rotors through a belt or chain drive, allowing the rotor motor itself to be placed at a distance from its respective rotor. In some cases, a single motor can drive one or more than one rotor, including one or more than one rotors of a single rotor set. In some cases, the rotor motor can be coupled to a controller for adjustment to the rotor speed. In some cases, the rotor motor is designed to provide a fixed amount of torque, and desired adjustments to a rotor set can be accomplished by manipulating the vertical gap between rotors of the rotor set.

Each of the rotor support arms 316, 320, 334, 336, 318, 322, 358, 360 may be actuatable to move respective rotors 308, 312, 330, 332, 310, 314, 346, 348 in one or more of a vertical direction (e.g., up and down), a longitudinal direction (e.g., in direction 224 or opposite direction 224), and a lateral direction (e.g., along a direction parallel to the axis of rotation of the respective rotor). Vertical movement can control the vertical gap between rotors of a single rotor set. Longitudinal movement can control the longitudinal gap between adjacent rotor sets. Lateral movement can control the percentage of the surface of the metal strip 302 covered by a particular rotor, and therefore the amount of magnetic flux passing through portions of the surface of the metal strip 302, as seen in further detail with respect to FIGS. 5-6.

Figure 4:
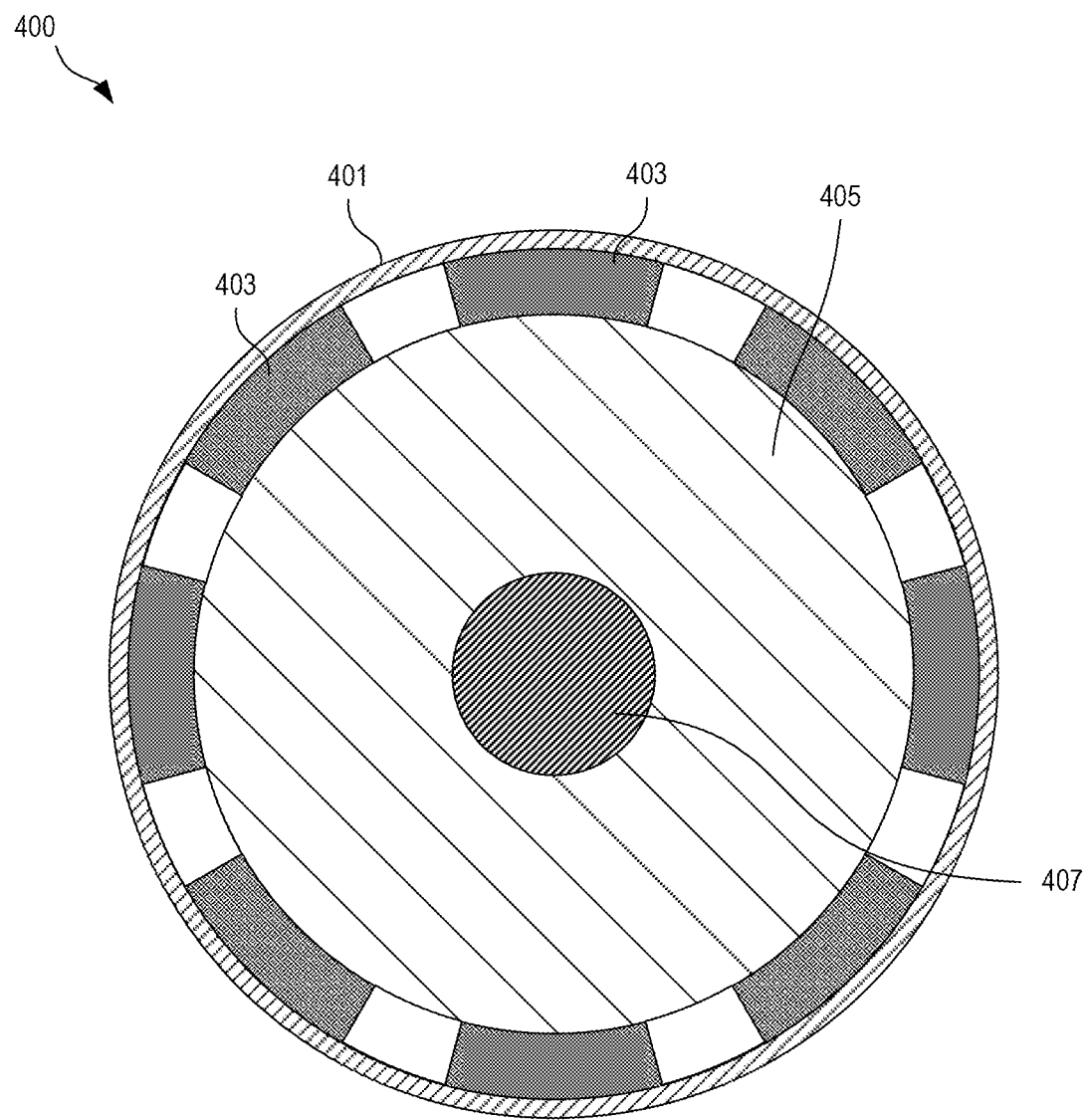
FIG. 4 is a cutaway side view of a permanent magnetic rotor according to certain aspects of the present disclosure.

FIG. 4 is a cutaway side view of a permanent magnetic rotor 400 according to certain aspects of the present disclosure. The magnetic rotor 400 is an example of a rotor suitable to be rotors 108, 110, 112, 114 of FIG. 1. The magnetic rotor 400 can include one or more magnetic sources 403. As seen in FIG. 4, the magnetic rotor 400 includes eight magnetic sources 403 that are permanent magnets. The magnets can be arranged in any suitable orientation. Magnetic sources 403 can be arranged such that adjacent permanent magnets provide different poles facing radially outwards (e.g., alternating N, S, N, S, N, S, N, S). Any suitable permanent magnet can be used, such as samarium cobalt, neodymium, or other magnets. In some cases, samarium cobalt magnets may be desirable over neodymium magnets, as samarium cobalt magnets may drop in magnetic field strength slower with higher heats. However, in some cases, neodymium magnets may be desirable over samarium cobalt magnets, as neodymium magnets have stronger field strengths at cooler temperatures.

The magnetic sources 403 can be enclosed by a shell 401. The shell 401 can be any suitable material capable of allowing magnetic flux to pass therethrough. In some cases, the shell 401 can be made of or can further include a non-metallic coating. In some cases, the shell 401 can include a Kevlar coating.

In some cases, the magnetic rotor 400 can include a ferromagnetic core 405 having a central axle 407. The magnetic rotor 400 can include other internal arrangements suitable for supporting the magnetic sources 403. Any suitable number of magnetic sources 403 can be used, however it has been found that efficient results can be achieved with an even number of magnetic sources 403, specifically six or eight magnetic sources 403.

The magnetic sources 403 can be sized to cover any percentage of the circumference of the magnetic rotor 400. Efficient results can be achieved with magnetic sources 403 sized to occupy approximately 40%-95%, 50%-90%, or 70%-80% of the circumference of the magnetic rotor 400.

The magnetic rotor 400 can be formed in any suitable size, however it has been found that efficient results can be achieved with a rotor having a diameter between 200 mm and 600 mm, at least 300 mm, at least 400 mm, at least 500 mm, or at least 600 mm.

The thickness of each magnetic source 403 can be any suitable thickness capable of fitting within the magnetic rotor 400, however it has been found that efficient results can be achieved with permanent magnet thicknesses of at or at least 15 mm, 15-100 mm 15-40 mm, 20-40 mm, 25-35 mm, 30 mm, or 50 mm. Other thicknesses can be used.

Through trial and experimentation, it has been determined that highly efficient heating power can be obtained with the use of six or eight magnets positioned around a single rotor, although other numbers of magnets can be used. When too many magnets are used, the heating power can drop off. In some cases, the number of magnets can be selected to minimize installation and/or maintenance cost (e.g., the number of magnets to purchase). In some cases, the number of magnets can be selected to minimize the tension fluctuations that occur in the metal strip due to the movement of the magnets adjacent the metal strip. For example, very few magnets may cause larger and/or longer tension fluctuations, whereas more magnets may cause smaller and/or shorter fluctuations. Through trial and experimentation, it has been determined that highly efficient heating power can be obtained when the magnets occupy 40% to 95% of the circumference of the rotor, or more specifically 50%-90%, or 70%-80% of the circumference of the rotor. Through trial and experimentation, it has been determined that highly efficient heating power can be obtained when the diameter of the rotor is large, such as at or greater than 200, 300, 400, 500, or 600 mm. Additionally, the use of larger rotors can help minimize magnet costs. Through trial and experimentation, it has been determined that highly efficient heating power can be obtained when the diameter of the rotor is large, such as at or greater than 200, 300, 400, 500, or 600 mm. Additionally, the use of larger rotors can help minimize magnet costs.

As the speed of the rotor increases, the heating power tends to increase. However, in some cases, if the speed of the rotor reaches a threshold level, further increases in speed will negatively impact the heating efficiency due to the inherent inductance and resistivity characteristics of the metal strip. It has been determined that at or approximately 1800 revolutions per minute (e.g., within 1%, 2%, 3%, 4%, 5%, 6%, 7%, 8%, 9%, 10%, 15%, or 20% of 1800 revolutions per minute) can be a desirable speed in part due to the simplicity in controlling rotor motors at the 60 Hz frequency found in mains power in various locales. In some cases, other frequencies can be selected based on the rotor motor used and/or the mains power supplied. It has been determined that while rotor speed can be a useful method for controlling the amount of heat energy applied to the metal strip, it can be advantageous to maintain a constant rotor speed and use vertical gap control and other controls to adjust the amount of heat energy applied to the metal strip.

Through trial and experimentation, it has been determined that highly efficient heating power can be obtained when the thicknesses of the permanent magnets in the rotor are between 15-40 mm, 20-40 mm, or 25-35 mm, or at or approximately at 30 mm. While strong heating power can be obtained with thicker magnets, the use of magnets within the above ranges can provide sufficiently strong heating power while simultaneously keeping the installation/maintenance costs of the magnets down.

Through trial and experimentation, it has been determined that highly efficient heating power is obtained for metal strips having thicknesses at or approximately at 2 mm (e.g., from 1 mm to 4 mm or 1 mm to 3 mm), although other sized metal strips can be used. In some cases, while heating a metal strip having a 1 mm thickness may provide fast heating, it may also induce undesirable tension and tension fluctuations in the metal strip. Through trial and experimentation, it has been determined that strip tension can be efficiently controlled when using metal strips having thicknesses at or approximately at 2 mm (e.g., from 1 mm to 4 mm or 1 mm to 3 mm).

Figure 5:
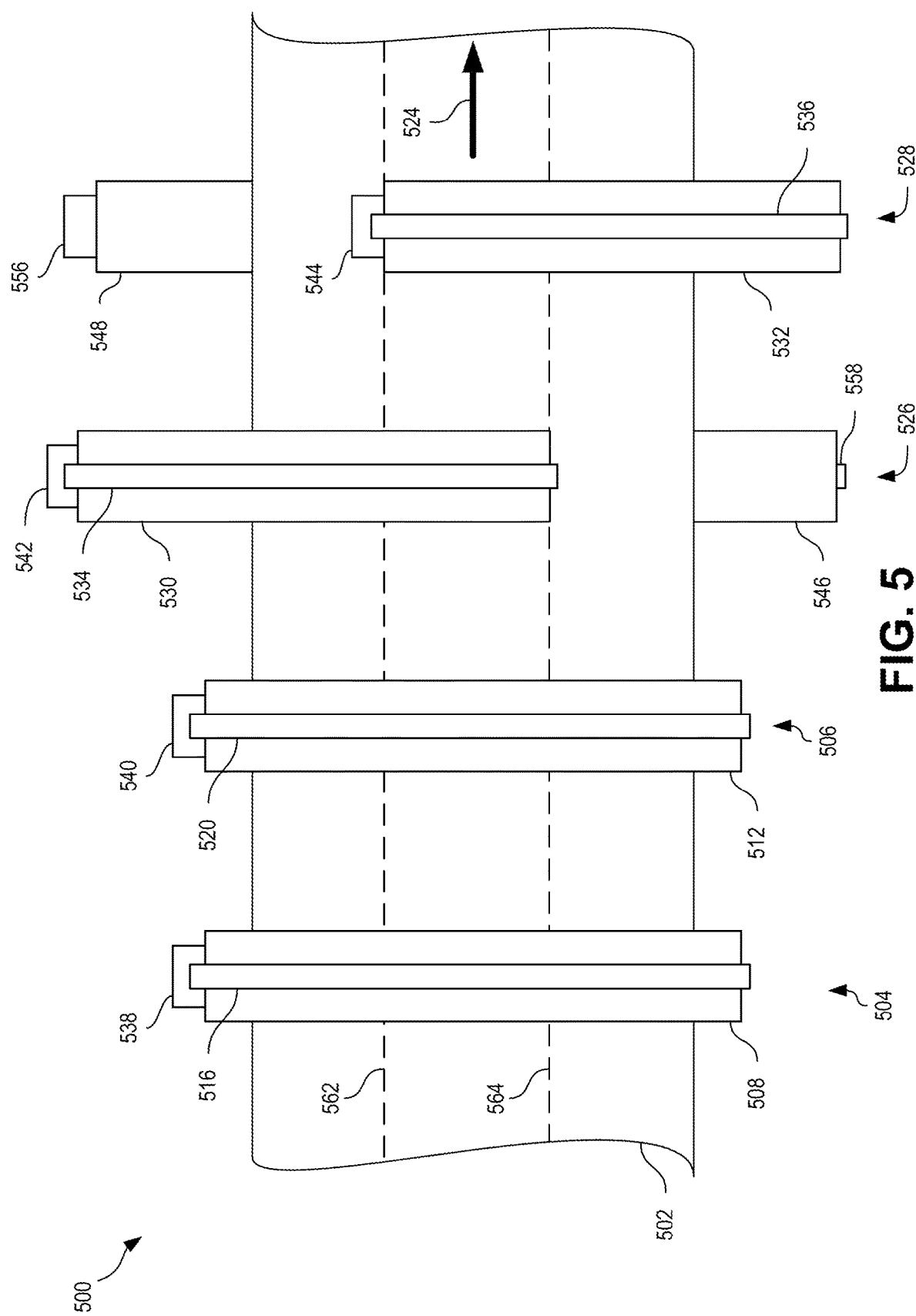
FIG. 5 is a top view of a rotating magnet heater with offset rotors according to certain aspects of the present disclosure.

FIG. 5 is a top view of a rotating magnet heater 500 with offset rotors according to certain aspects of the present disclosure. The rotating magnet heater 500 can be similar to the rotating magnet heater 200 of FIG. 2, although with third and fourth rotor sets 526, 528 in an offset configuration. The use of laterally offset rotors, such as in a single rotor set, can facilitate compensation for edge effect. Edge effect is an uneven heating of an edge of a metal strip 502, especially when a rotor extends beyond the edge of the metal strip 502. The degree of offset is exaggerated in FIG. 5 for illustrative purposes.

The metal strip 502 can pass through the vertical gaps of each of the four rotor sets 504, 506, 526, 528 in direction 524. As seen from above, the first rotor set 504 includes a first top rotor 508 supported by a first top rotor support arm

516 and driven by a first top rotor motor 538, the second rotor set 506 includes a second top rotor 512 supported by a second top rotor support arm 520 and driven by a second top rotor motor 540, the third rotor set 526 includes a third top rotor 530 supported by a third top rotor support arm 534 and driven by a third top rotor motor 542, and the fourth rotor set 528 includes a fourth top rotor 532 supported by a fourth top rotor support arm 536 and driven by a fourth top rotor motor 544.

Because the third and fourth rotor sets 526, 528 are in an offset configuration, third bottom rotor 546 and its third bottom rotor support arm 558, as well as fourth bottom rotor 548 and its fourth bottom rotor motor 556, can be seen. The offset configuration can involve the top rotor of a rotor set being laterally offset from the bottom rotor of a rotor set. The third top rotor 530 of third rotor set 526 is seen offset in a first direction, whereas the third bottom rotor 546 is offset in a second direction opposite to the first direction. The degree of offset can be defined by lines 562, 564. The distance from line 564 to the first edge of the metal strip 502 (e.g., the edge towards the top of FIG. 5) can be the distance that rotors 530 and 548 overlap the metal strip 502. The distance from line 562 to the second edge of the metal strip 502 (e.g., the edge towards the bottom of FIG. 5) can be the distance that rotors 546 and 532 overlap the metal strip 502. The distance between line 562 and line 564 can be the distance that the metal strip 502 is overlapped by both rotors 530, 546 of the third rotor set 526. That distance is also the distance that the metal strip 502 is overlapped by both rotors 548, 532 of the fourth rotor set 528, although in some cases the fourth rotor set 528 may take on a different overlapping distance than the third rotor set 526. In use, the rotor overlapping distance (e.g., distance between lines 562, 564) can be at least 90%, 91%, 92%, 93%, 94%, 95%, 96%, 97%, 98%, or 99% of the lateral width of the metal strip 502. However, the rotor overlapping distance may be less than 90% in some cases.

In some cases, it can be advantageous for the last rotor sets of a rotating magnet heater to be in offset configurations. In an example of a rotating magnet heater having six rotor sets, the last four rotor sets can be in offset configuration. As seen in FIG. 5, the rotating magnet heater 500 includes four rotor sets 504, 506, 526, 528 of which the last two (e.g., rotor sets 526, 528) are in offset configurations.

In some cases, the rotor support arms can adjust the rotor position in an lateral direction (e.g., up or down as seen in FIG. 5) to move a rotor into or out of an offset configuration. In some cases, one or more temperature sensors can be used to provide active feedback to control the position of the rotors in an offset configuration, and thus the amount of rotor overlap. As the amount of rotor overlap decreases, such as below 100% or 110% of the width of the metal strip 502, the edge effect can be mitigated.

Figure 6:
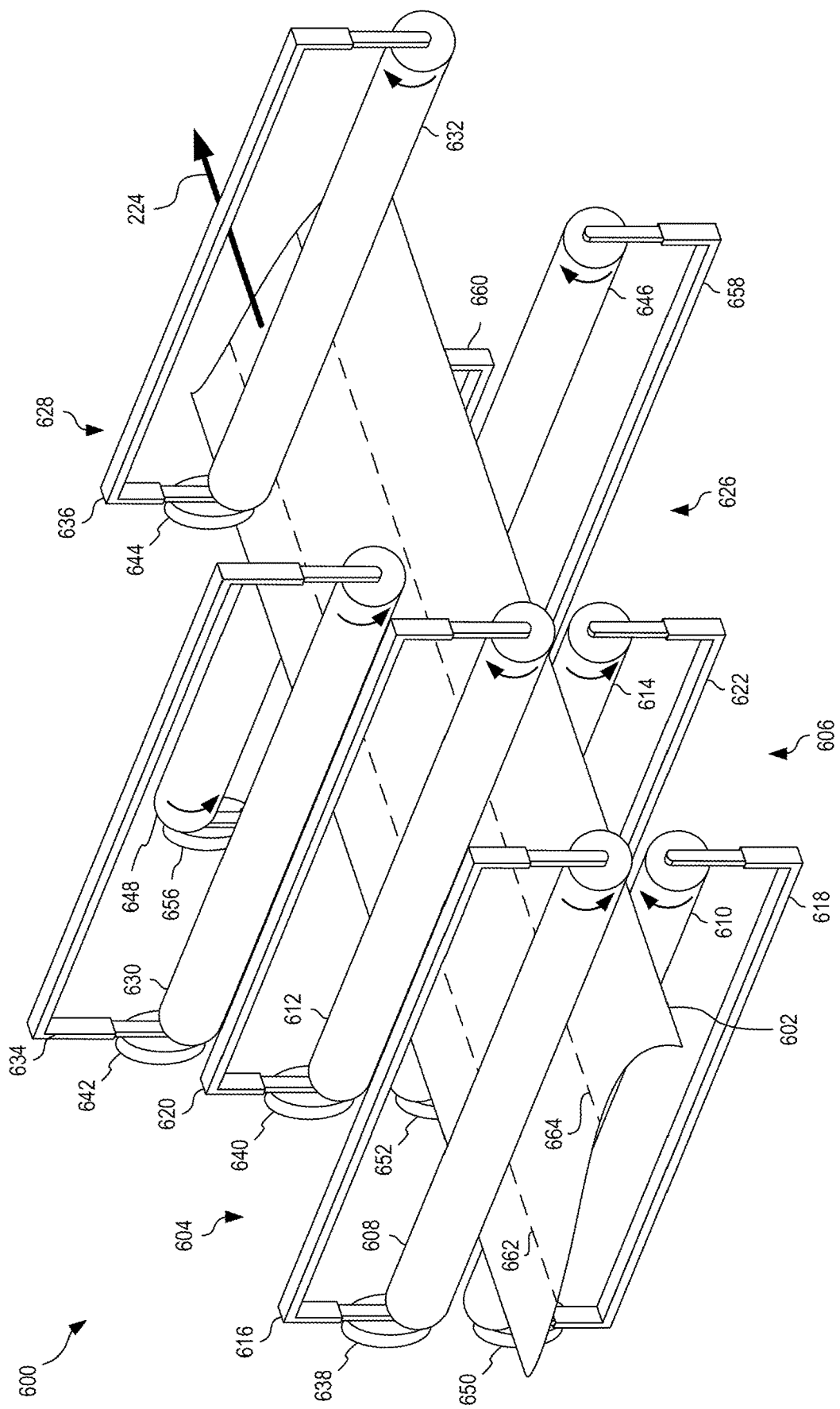
FIG. 6 is an axonometric projection of a rotating magnet heater with offset rotors according to certain aspects of the present disclosure.

FIG. 6 is an axonometric projection of a rotating magnet heater 600 with offset rotors according to certain aspects of the present disclosure. Rotating magnet heater 600 can be similar to rotating magnet heater 500 of FIG. 5. The first rotor set 604 includes a first top rotor 608 supported by a first top rotor support arm 616 and driven by a first top rotor motor 638 as well as a first bottom rotor 610 supported by a first bottom rotor support arm 618 and powered by a first bottom rotor motor 650. The second rotor set 606 includes a second top rotor 612 supported by a second top rotor support arm 620 and driven by a second top rotor motor 640 as well as a second bottom rotor 614 supported by a second bottom rotor support arm 622 and powered by a second bottom rotor motor 652. The third rotor set 626 includes a third top rotor 630 supported by a third top rotor support arm 634 and driven by a third top rotor motor 642 as well as a third bottom rotor 646 supported by a third bottom rotor support arm 658 and powered by a third bottom rotor motor 654. The fourth rotor set 628 includes a fourth top rotor 632 supported by a fourth top rotor support arm 636 and driven by a fourth top rotor motor 644 as well as a fourth bottom rotor 648 supported by a fourth bottom rotor support arm 660 and powered by a fourth bottom rotor motor 656.

Similarly to as depicted in FIG. 5, the third rotor set 626 and fourth rotor set 628 are depicted in an offset configuration.

Figure 7:
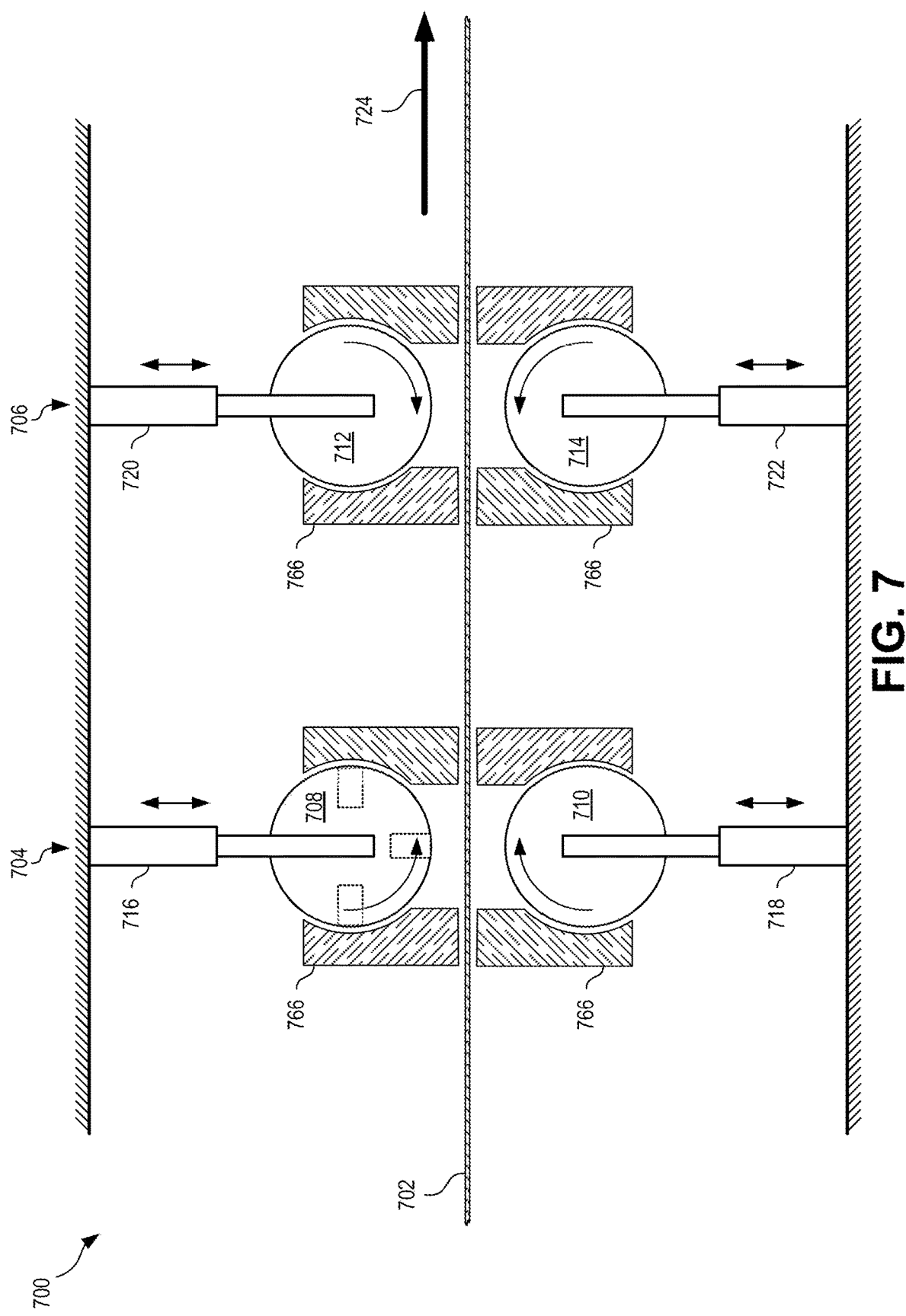
FIG. 7 is a side view of a rotating magnet heater with flux directors according to certain aspects of the present disclosure.

FIG. 7 is a side view of a rotating magnet heater 700 with flux directors 766 according to certain aspects of the present disclosure. Rotating magnet heater 700 can be similar to rotating magnet heater 100 of FIG. 1, however with the addition of flux directors 766 (e.g., flux concentrators or flux guides), which can allow rotors 708, 710, 712, 714 to be spaced further apart from the metal strip 702 than available to the rotors in FIG. 1. The metal strip 702 passing in direction 724 can receive magnetic flux directly from the rotors 708, 710, 712, 714 where the respective rotor is nearest the metal strip 702 (e.g., a magnetic pole located at edge of the rotor nearest the metal strip), as well as indirectly via the flux director 766. The flux director 766 can direct magnetic flux from magnetic sources in the rotor 708, 710, 712, 714 that are not oriented towards the metal strip 702, such as magnetic sources that are directing flux in a direction parallel to direction 724, towards the metal strip 702. Further, the presence of flux directors 766 around the rotors 708, 710, 712, 714 can allow the first rotor set 704 and the second rotor set 706 to be placed closer to one another without as much magnetic interference as if no flux directors 766 were used. As depicted in FIG. 1, each rotor may have four magnetic poles around the circumference of the rotor. The position of the flux directors 766 can be adjusted to ensure no magnetic poles are short-circuited to one another through the flux director 766. For example, if the rotors contained more than four magnetic poles, the flux director 766 may be slightly smaller to avoid undesirable short-circuiting of the magnetic flux.

Flux directors 766 can include iron or iron-based materials suitable for focusing, concentrating, or otherwise directing flux towards the metal strip 702. For example, the flux directors 766 can be built with silicon alloyed steel laminates. In some cases, flux directors 766 can be located adjacent the rotor, along the width of a rotor, on one or both sides (e.g., upstream or downstream of the rotor). The flux directors 766 can be located along the full width of the rotor, or more or less than the full width of the rotor. In some cases, flux directors 766 can be positioned to compensate for edge effect by redirecting magnetic flux adjacent the edges of the metal strip 702. The flux directors 766 can be held stationary with respect to the rotating rotor 708, 710, 712, 714. In some cases, the flux directors 766 can be secured to the rotor support arms 716, 718, 720, 722 or elsewhere. In FIG. 7, two flux directors per rotor are depicted. The number of two flux directors can correspond to a rotor with two magnetic poles (e.g., two externally facing magnetic poles). The number of flux directors can be increased to allow the use of four, six, eight, ten, or more poles per rotor, although any suitable number of flux directors can be used.

Figure 8:
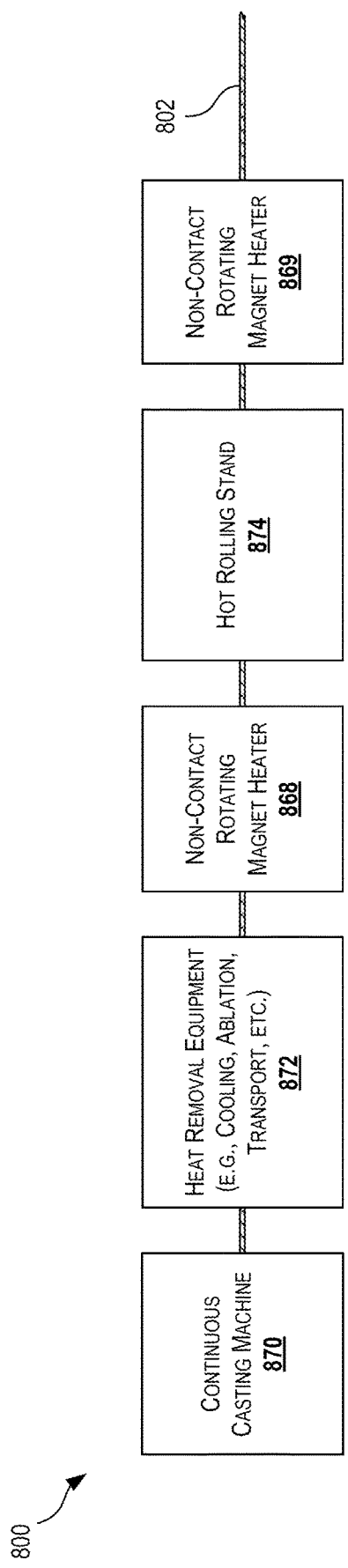
FIG. 8 is a schematic representation of a continuous casting system utilizing rotating magnet heater(s) according to certain aspects of the present disclosure.

FIG. 8 is a schematic representation of a continuous casting system 800 utilizing rotating magnet heater(s) 868, 869 according to certain aspects of the present disclosure. A continuous casting machine 870 can output a metal product, such as a metal strip 802. The metal strip 802 can optionally pass through heat removal equipment, such as cooling equipment (e.g., water-cooled or air cooled), ablation equipment, or other such equipment. In some cases, the continued transport of the metal strip 802, including contact with ambient air and/or contact with non-heated rollers, can reduce the temperature of the metal strip 802. Prior to entering a hot rolling stand 874, the metal strip 802 may be heated by a rotating magnet heater 868, such as rotating magnet heater 100 of FIG. 1 or any other rotating magnet heater as described herein. In some cases, the metal strip 802 can be heated by a rotating magnet heater 869 after exiting the hot rolling stand 874. In some cases, the metal strip 802, after exiting rotating magnet heater 869, can go through additional processes, such as additional hot rolling, cold rolling, or other processes. In a continuous casting system 800, rotating magnetic heaters 868, 869 can increase or maintain strip temperature before or after various processes, such as hot rolling. The use of rotating magnet heaters 868, 869 can improve the efficiency and speed of metal production in continuous casting systems 800. Any number of rotating magnet heaters 868, 869 can be used, and in some cases only one of rotating magnet heaters 868, 869 is used.

Figure 9:
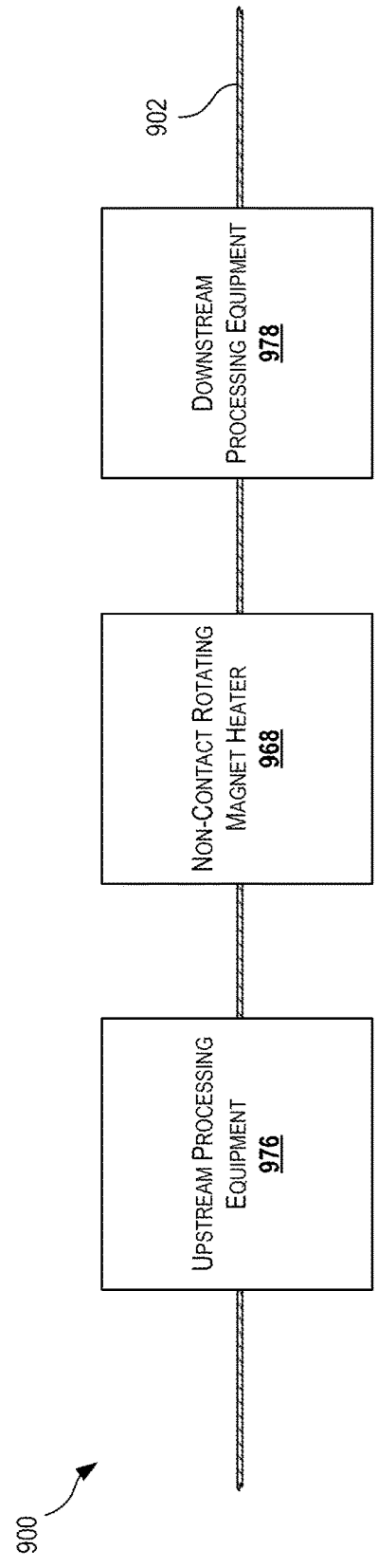
FIG. 9 is a schematic representation of a metalworking process using a rotating magnet heater according to certain aspects of the present disclosure.

FIG. 9 is a schematic representation of a metalworking system 900 using a rotating magnet heater 968 according to certain aspects of the present disclosure. The metalworking system 900 includes a rotating magnet heater 968, such as rotating magnet heater 100 of FIG. 1 or any other rotating magnet heater as described herein. Rotating magnet heater 968 acts on a metal strip 902.

In some cases, the rotating magnet heater 968 can be located immediately downstream of a piece of upstream processing equipment 976 in order to maintain or increase the temperature of the metal strip 902 after exiting the upstream processing equipment 976.

In some cases, the rotating magnet heater 968 can be located immediately upstream of a piece of downstream processing equipment 978 in order to maintain or increase the temperature of the metal strip 902 prior to entering the downstream processing equipment 978.

In some cases, the rotating magnet heater 968 can be located between a piece of upstream processing equipment 976 and a piece of downstream processing equipment 978 in order to maintain or increase the temperature of the metal strip 902 as it travels between the upstream processing equipment 976 and the downstream processing equipment 978.

The upstream processing equipment 976 and the downstream processing equipment 978 can be any suitable pieces of metalworking equipment, such as parts of a CASH line (e.g., furnaces, cooling units, or other equipment). The use of a rotating magnet heater 968 can improve the efficiency and speed of metal production in a metalworking system 900.

Figure 10:
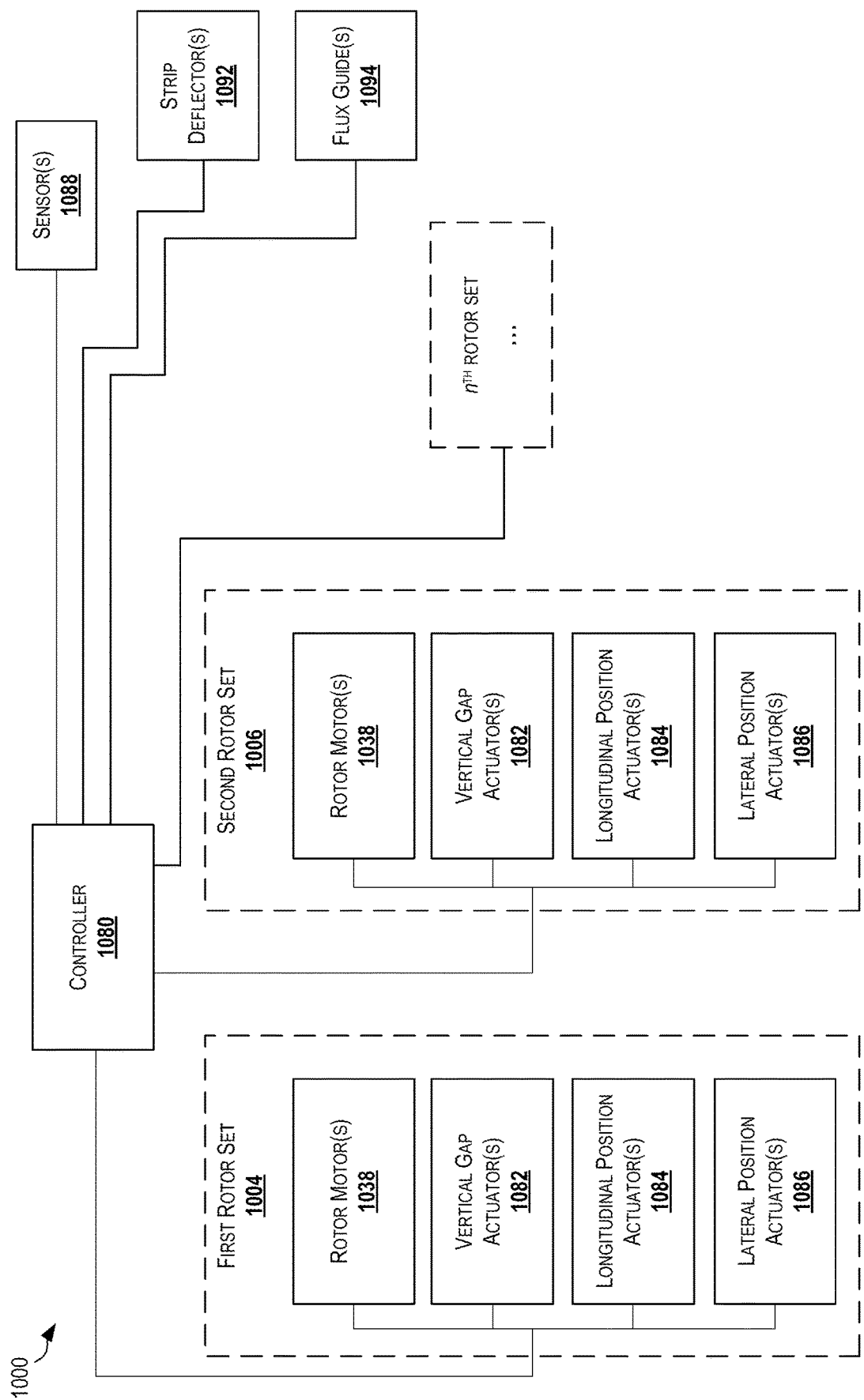
FIG. 10 is a schematic representation of a rotating magnet heater control system according to certain aspects of the present disclosure.

FIG. 10 is a schematic representation of a rotating magnet heater control system 1000 according to certain aspects of the present disclosure. A controller 1080 can be any suitable control equipment, such as a processor or computer. The controller 1080 can couple to various parts of the system 1000 to provide manual or automatic (e.g., programmed and/or dynamic) control of any controllable part of the system. Controller 1080 can be coupled to the rotor motor(s) 1038, vertical gap actuator(s) 1082 (e.g., rotor support arms), longitudinal position actuator(s) 1084, and/or lateral position actuator(s) 1086 of any number of rotor sets 1004, 1006 in order to provide proper control of the system 1000. Controller 1080 may be coupled to a data storage (e.g., a non-transitory, machine readable storage) for storing and accessing program information and other data.

In some cases, controller 1080 can be coupled to sensor(s) 1088. One or more sensors 1088 can be used to provide feedback to a display for a user to interpret, or can be used to provide dynamic control of one or more parts of the system 1000.

In an example, controller 1080 can use a sensor 1088 (e.g., a temperature sensor, a flatness sensor, or a tension sensor) to provide feedback to dynamically adjust the vertical gap (e.g., via vertical gap actuator(s) 1082) of the first rotor set 1004 to ensure that the tension induced by the first rotor set 1004 is compensated for by the second rotor set 1006. When a temperature sensor is used, the controller 1080 may correlate changes in temperature of the metal strip to an adjustment of vertical gap that is necessary to maintain a low, near zero, or zero net change in tension for the first and second rotor sets 1004, 1006. When a tension sensor is used, the measured tension itself can be used to control the vertical gap so that the net tension of the first and second rotor sets 1004, 1006 is low, near zero, or at zero.

In some cases, the controller 1080 or a suitable sensor 1088 can monitor the power usage associated with the rotor motors 1038. The power usage can provide insight into the operation of the system and can be used by the controller 1080 to make inferences about the state of the system. The controller 1080 can then provide feedback to dynamically adjust the system, such as described above (e.g., a vertical gap), based on the sensed power.

In some cases, controller 1080 can be coupled to a single rotor rather than a rotor set, in which case the controller 1080 can control any controllable aspect of the rotor, such as rotor speed, lateral position, vertical position, longitudinal position, or other aspects (e.g., magnetic field intensity in rotors with electromagnetic sources).

In some cases, controller 1080 can be coupled to actuators for controlling the position of the metal strip with respect to one or more rotors or rotor sets. For example, controller 1080 can be coupled to one or more strip deflectors 1092 to control the passline of the metal strip. Examples of such strip deflectors 1092 can include one or more of the metal plates 1892 of FIG. 18, the rollers 1992 of FIG. 19, the spray 2396 of FIG. 32, and the rollers 3298 of FIG. 32. In some cases, a deflector 1092 can deflect a portion of the metal strip (e.g., less than a full width of the metal strip) towards or away from a magnetic rotor, thus providing a laterally differentiable distance between the metal strip and the magnetic rotor.

In some cases, controller 1080 can be coupled to one or more flux guides 1094 to move or reposition the flux guide 1094 to adjust the amount of magnetic flux passing through all or parts of the metal strip. Any suitable flux guide, such as those described with reference to FIGS. 7, 27, 28, and 35-39, may be controllable by controller 1080.

Figure 11:
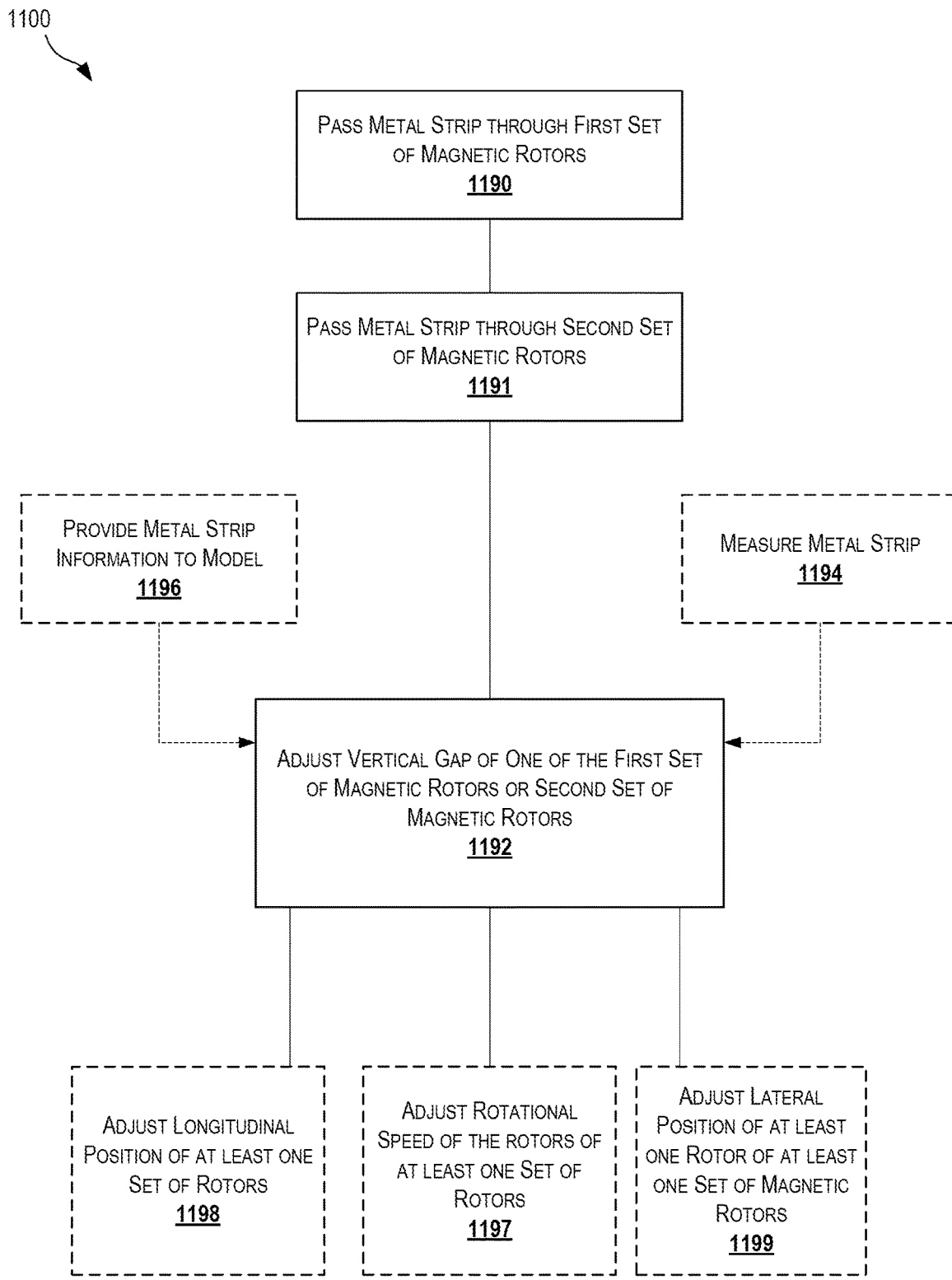
FIG. 11 is a flowchart depicting a process for using a rotating magnet heater according to certain aspects of the present disclosure.

FIG. 11 is a flowchart depicting a process 1100 for using a rotating magnet heater according to certain aspects of the present disclosure. At block 1190, a metal strip is passed through a first set of magnetic rotors. The metal strip can be passed through a first vertical gap between the first set of rotors. At block 1191, a metal strip can be passed through a second set of magnetic rotors. The metal strip can be passed through a second vertical gap between the second set of rotors.

At block 1192, a vertical gap of one of the first set of rotors or second set of rotors can be adjusted. The vertical gap can be increased or decreased as necessary to decrease or increase, respectively, the amount of tension induced in the metal strip by the adjusted rotor set. For example, if the first rotor set is applying too much downstream force to be compensated for by the second rotor set, the vertical gap of the first rotor set can be increased at block 1192 so that the first rotor set now applies less downstream force, which may be compensated for by the second rotor set. In some cases, block 1192 can be replaced by a block that adjusts a different parameter of the rotor set, such as rotational speed. In some cases, instead of adjusting a vertical gap, the distance adjacent the rotor can be adjusted, as described in further detail with reference to FIGS. 13-14.

At optional block 1196, information about the metal strip can be provided to a model. Such information can be information about the type of metal used, the dimensions of the metal strip, the speed of the metal strip, or any other characteristics of the metal strip. By applying this information to a model, the system may be able to determine the necessary vertical gap for the first or second rotor set at block 1192.

At optional block 1194, the system can take a measurement of the metal strip, such as a temperature measurement or a tension measurement. The measurement can be taken by any suitable sensor. The measurement can be used to provide dynamic feedback to adjust the vertical gap at block 1192 based on the measurement. For example, a measurement received at block 1194 of increasing tension in the metal strip can be used at block 1194 to adjust the vertical gap of one of the rotor sets to bring the tension back to desired levels.

At optional block 1198, a longitudinal position of at least one set of rotors can be adjusted. For example, the first rotor set can be longitudinally adjusted to move closer to or further away from the second rotor set.

At optional block 1199, a lateral position of at least one rotor of at least one set of magnetic rotors can be adjusted. In some cases, a lateral adjustment of one rotor of a set of magnetic rotors is accompanied by an equal and opposite lateral adjustment of an opposing rotor of the same set of rotors. For example, a top rotor that is laterally offset in a first direction towards a first edge of the metal strip can be accompanied by a bottom rotor of the same rotor set being laterally offset by the same amount in a second direction towards the second edge of the metal strip. Examples of lateral offsets can be seen with reference to FIGS. 5-6.

At optional block 1197, the rotational speed of the rotors of at least one set of rotors can be adjusted. The rotational speed can be adjusted to change the amount of heat energy imparted onto the moving metal strip. In some cases, the rotational speed of one set of rotors can be adjusted to provide control of the tension fluctuations between adjacent sets of rotors.

Figure 12:
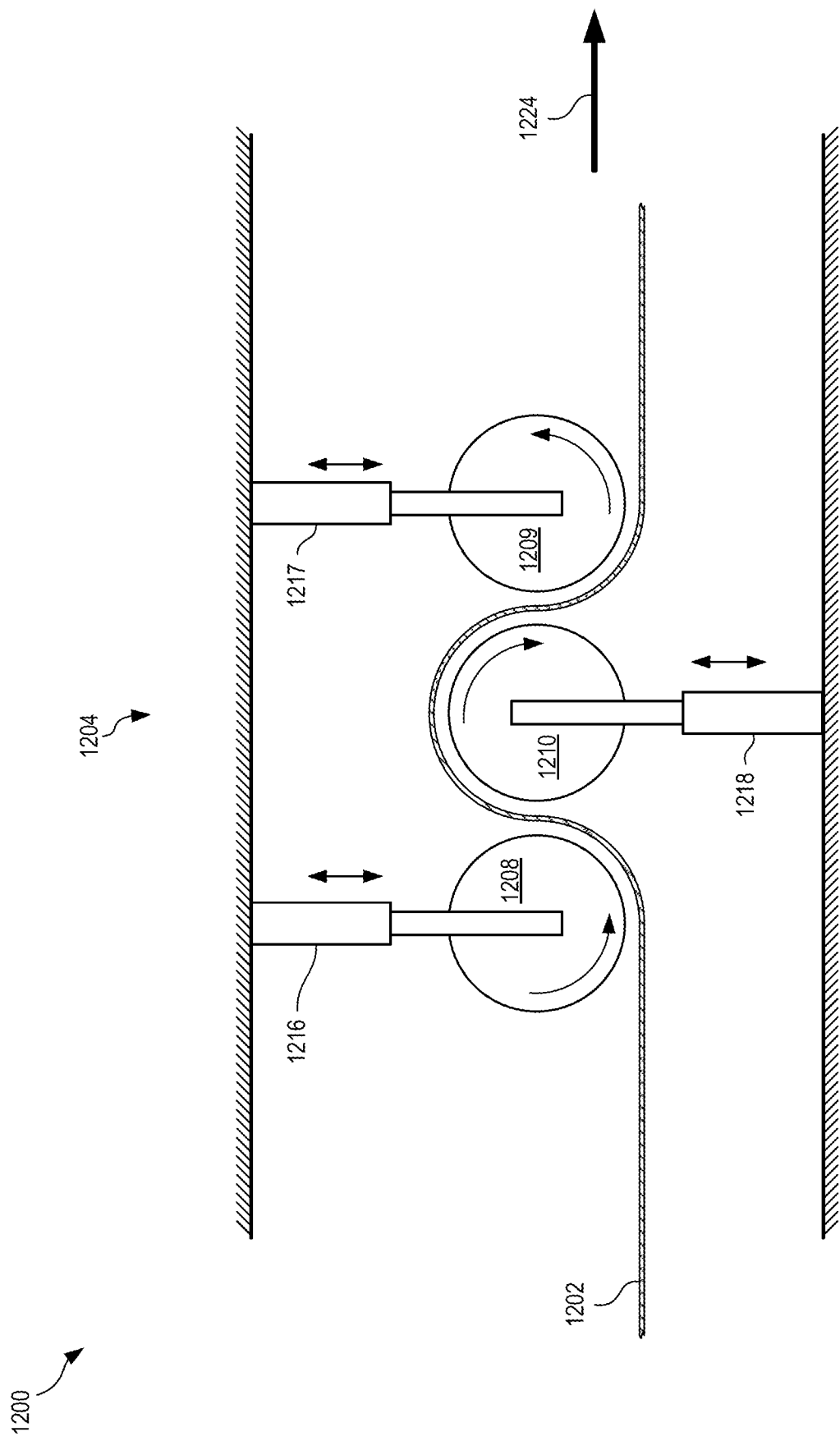
FIG. 12 is a side view of a serpentine rotating magnet heater according to certain aspects of the present disclosure.

FIG. 12 is a side view of a serpentine rotating magnet heater 1200 according to certain aspects of the present disclosure. A serpentine rotating magnet heater 1200 can include multiple rotors 1208, 1210, 1209 in a single rotor set 1204. The serpentine rotating magnet heater 1200 can include moving the metal strip 1202 in a winding, serpentine, or sinusoidal pattern through the rotor set 1204. The extent of the serpentine pattern as seen in FIG. 12 may be exaggerated for illustrative purposes.

Any number of rotors can be used. As seen in FIG. 12, the rotor set 1204 includes an upstream rotor 1208, a middle rotor 1210, and a downstream rotor 1209. The upstream rotor 1208 and the downstream rotor 1209 are located on the same side of the metal strip 1202 (e.g., the top side), whereas the middle rotor 1210 is located on the opposite side of the metal strip 1202 (e.g., the bottom side) thus inducing the serpentine pattern in the metal strip 1202.

In some cases, the heater 1200 may include additional rotor sets. When additional rotor sets are used, adjacent rotor sets may be oriented such that adjacent rotors of adjacent rotor sets are located on opposite sides of the metal strip. For example, the upstream rotor of a rotor set immediately after downstream rotor 1209 can be located opposite the metal strip 1202 from the downstream rotor 1209 (e.g., on the bottom of the metal strip 1202 as seen in FIG. 12).

Figure 13:
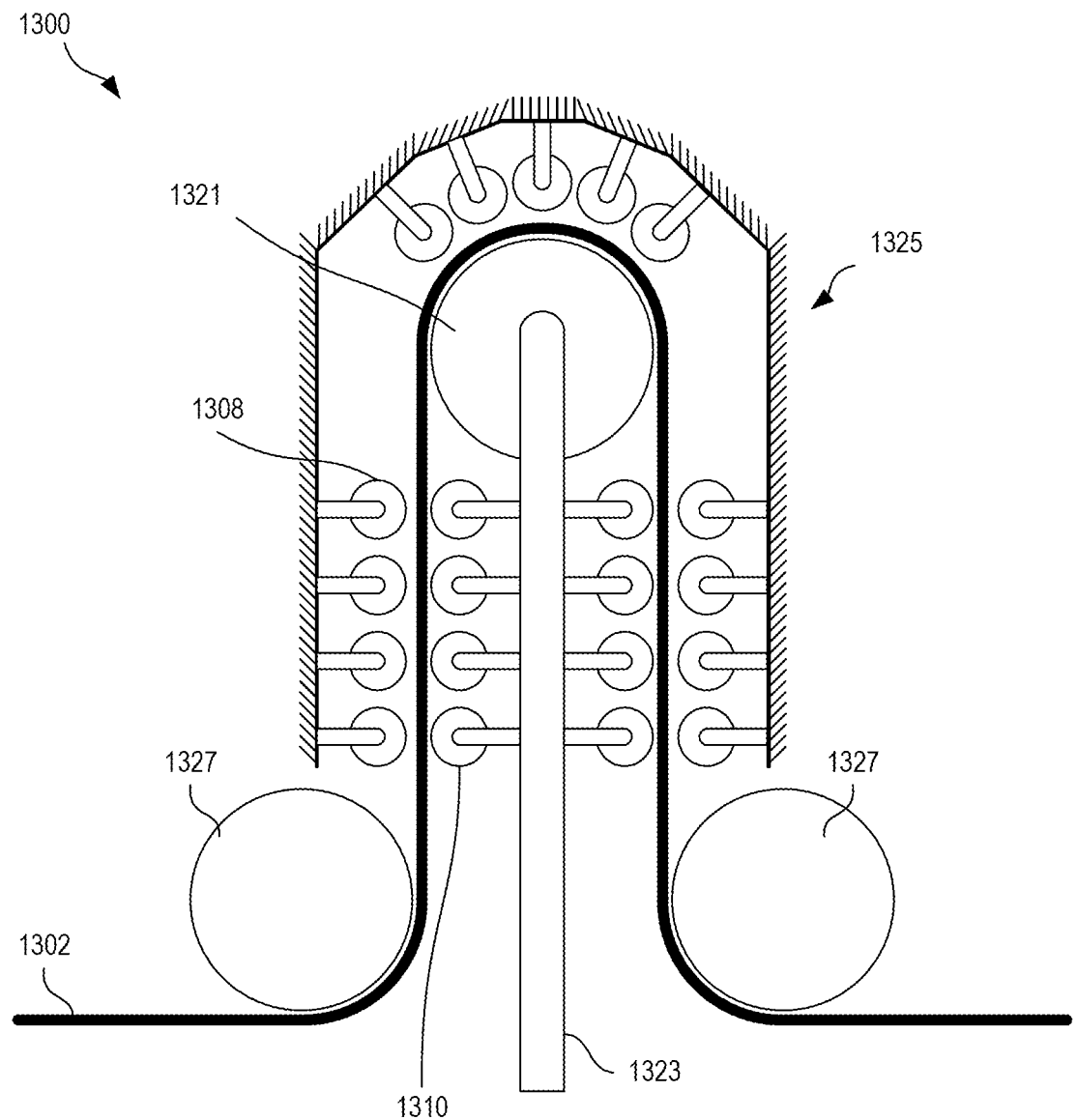
FIG. 13 is a side view of a retractable rotating magnet heater in an extended position according to certain aspects of the present disclosure.

FIG. 13 is a side view of a retractable rotating magnet heater 1300 in an extended position according to certain aspects of the present disclosure. The retractable rotating magnet heater 1300 can include an idler roller 1321 coupled to an extendable support arm 1323. When in an extended position, as seen in FIG. 13, the extendable support arm 1323 forces idler roller 1321 into a cavity 1325. Support rollers 1327 can help maintain proper orientation of the metal strip 1302 and can support the metal strip 1302 away from obstacles (e.g., walls). When in the cavity 1325, the metal strip 1302 can pass a number of cavity-supported rotors 1308, as well as a number of centrally-supported rotors 1310 (e.g., supported by the extendable support arm 1323). In some cases, the cavity 1325 can include cavity-supported rotors 1308 opposite the metal strip 1302 from the idler roller 1321 when the idler roller 1321 is in an extended position, in which case the idler roller 1321 may be an idler rotor (e.g., an idler roller with an internal rotor) as described in further detail with respect to FIG. 15.

Rotors 1308, 1310 can be the same as rotors described herein with reference to other rotating magnet heaters, and can include any and all of the parts and/or features thereof, including gap adjustability, longitudinal adjustability, and lateral adjustability. For a retractable rotating magnet heater 1300, the "vertical gap" can include the gap between opposing rotors 1308, 1310 located on opposite sides of the metal strip 1302 when the extendable support arm 1323 is in an extended position.

The retractable rotating magnet heater 1300 allows for a substantial length of the metal strip 1302 to be affected by rotors 1308, 1310 without occupying much longitudinal space in a process line. The depth of the cavity 1325, and therefore length of the extendable support arm 1323, can be any suitable size. In some cases, the amount of extension of the extendable support arm 1323 can control the amount of heat imparted into the metal strip 1302 because the amount of extension is directly related to the length of metal strip exposed to the rotors 1308, 1310, and therefore the duration that a particular portion of the metal strip is exposed to the rotors 1308, 1310 as it travels through the retractable rotating magnet heater 1300.

Figure 14:
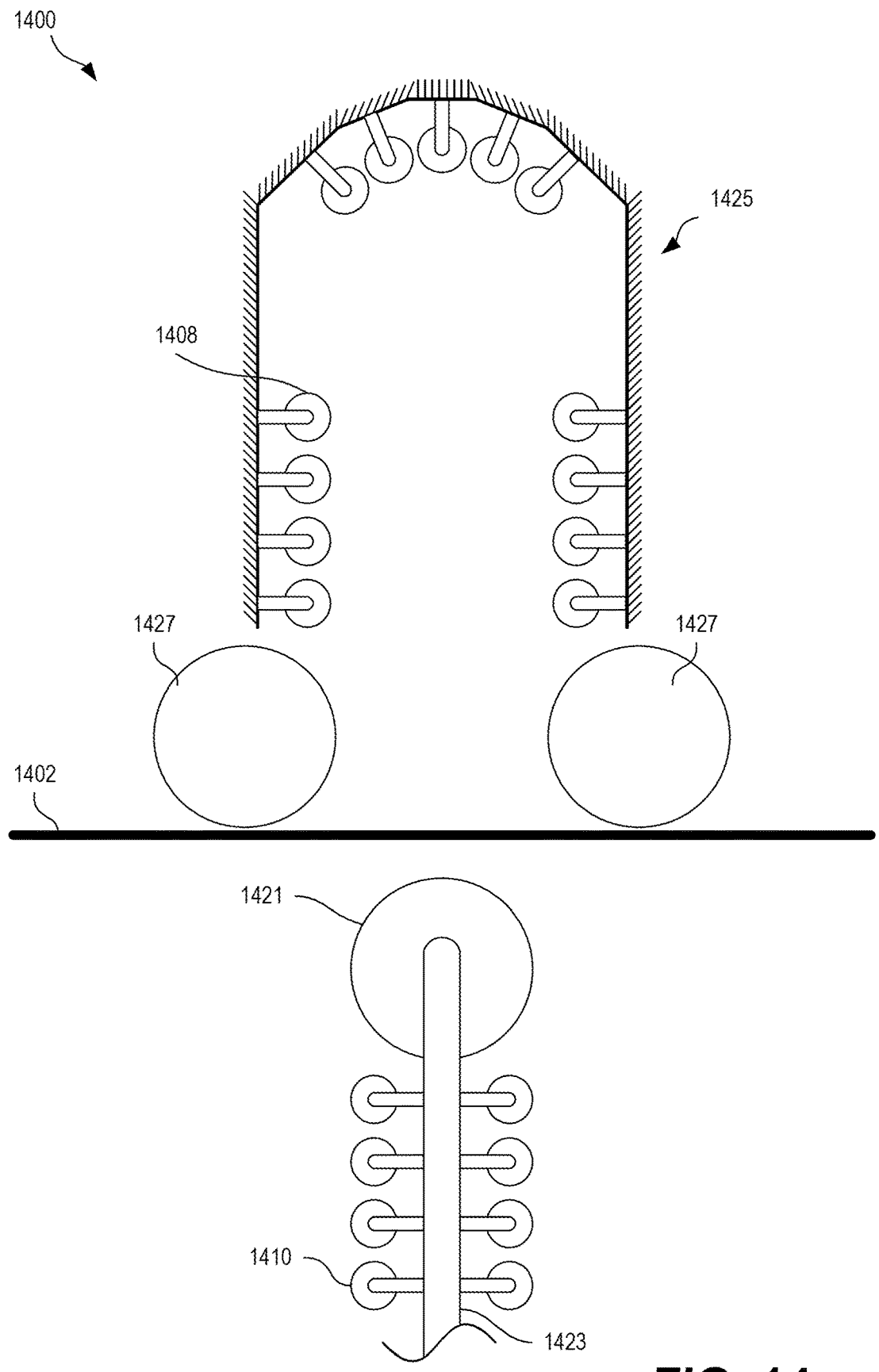
FIG. 14 is a side view of a retractable rotating magnet heater in a retracted position according to certain aspects of the present disclosure.

FIG. 14 is a side view of a retractable rotating magnet heater 1400 in a retracted position according to certain aspects of the present disclosure. The retractable rotating magnet heater 1400 can be retractable rotating magnet heater 1300 of FIG. 13 in a retracted position. When the extendable support arm 1423 is in a retracted position, the idler roller 1421 may be spaced apart from the metal strip 1402, thus allowing the metal strip to pass through the retractable rotating magnet heater 1400 without passing into the cavity 1425, and therefore without passing adjacent magnetic rotors 1408, 1410. In some cases, the metal strip 1402 may or may not contact support rollers 1427 when the extendable support arm 1423 is in a retracted position.

Figure 15:
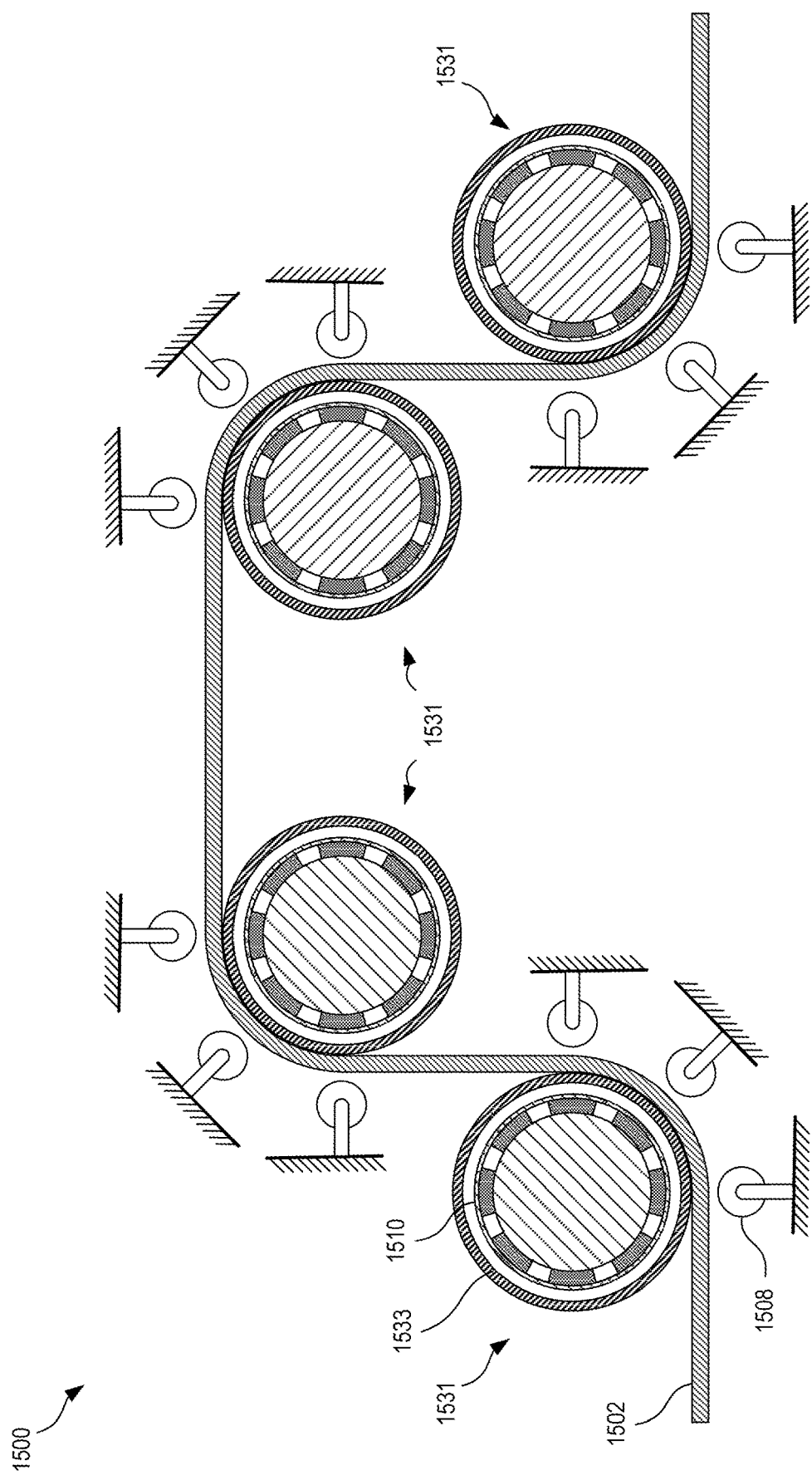
FIG. 15 is a side view of a serpentine rotating magnet heater using combination idler rotors according to certain aspects of the present disclosure.

FIG. 15 is a side view of a serpentine rotating magnet heater 1500 using combination idler rotors 1531 according to certain aspects of the present disclosure. Any rotating magnet heater can include combination idler rotors 1531, although they are especially useful in serpentine rotating magnet heaters 1500. The serpentine rotating magnet heater 1500 of FIG. 15 includes four idler rotors 1531.

A combination idler rotor 1531 is an idler roller 1533 with an internal rotor 1510. The internal rotor 1510 can be any suitable rotor, such as those described herein. However, the idler roller 1533 acts as a shell around the internal rotor 1510 against which the metal strip 1502 may rest and be supported. The idler roller 1533 can be rotationally decoupled from the internal rotor 1510, or can be rotationally coupled to spin at a different speed than the internal rotor 1510. Thereby, the idler roller 1533 can rotate at a speed appropriate to the speed of travel of the metal strip 1502, while the internal rotor 1510 is able to rotate at a speed appropriate for the desired changing magnetic field. One or more opposing rotors 1508 can be located opposite the metal strip 1502 from the idler rotor 1531.

In some cases, the distance between the magnetic sources in the idler rotor 1531 (e.g., the internal rotor 1510) and the surface of the idler rotor 1531 (e.g., the idler roller 1533) may be fixed. In such cases, any adjustment in vertical gap may be solely attributable to adjustment of the opposing rotor 1508. In some cases, however, the strength of the magnetic field from the idler rotor 1531 can be controlled by inserting magnetically translucent or magnetically opaque material in the idler rotor 1531 between the idler roller 1533 and the magnetic sources of the internal rotor 1510.

Figure 16:
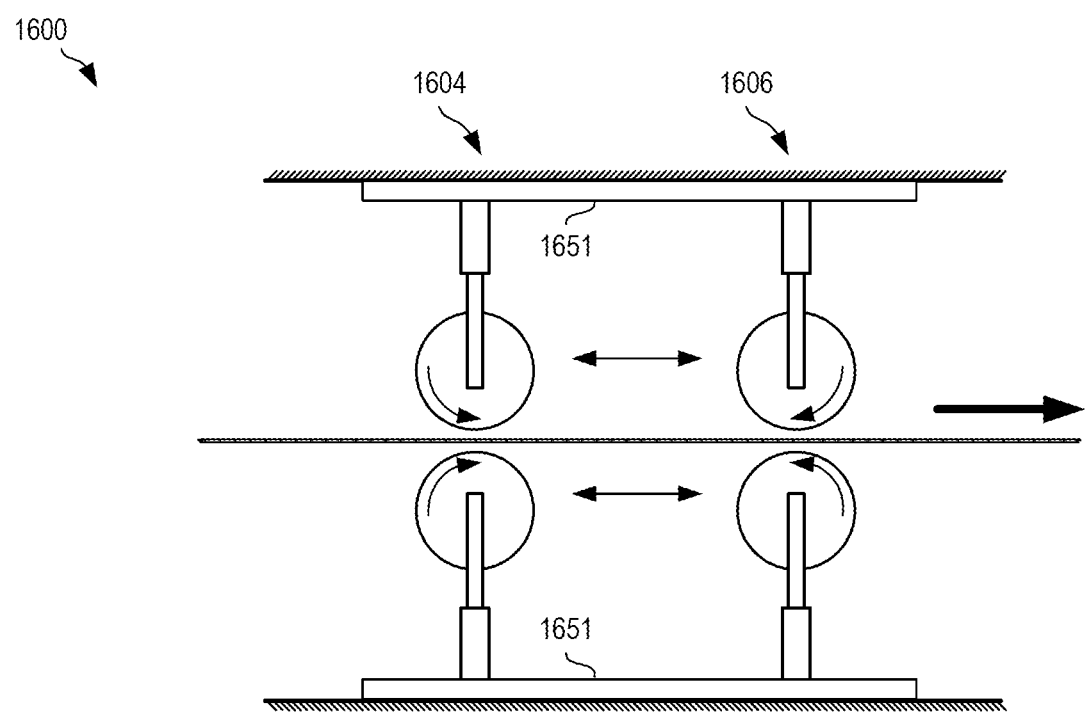
FIG. 16 is a side view of a rotating magnet heater having longitudinal gap control according to certain aspects of the present disclosure.

FIG. 16 is a side view of a rotating magnet heater 1600 having longitudinal gap control according to certain aspects of the present disclosure. The rotating magnet heater 1600 can be similar to rotating magnet heater 100 of FIG. 1, however the first set of rotors 1604 and the second set of rotors 1606 are mounted on longitudinal tracks 1651. While longitudinal gap control can be achieved in many different ways, such as through individual control of rotor support arms, one such way can include mounting rotor support arms on a longitudinal track 1651 and using linear actuators (e.g., belt drives, screw actuators, or other actuators) to maneuver the support arms along the longitudinal track 1651.

Through trial and experimentation, it has been determined that strip tension itself cannot be controlled through adjustment of the longitudinal gap (e.g., horizontal gap) between sets of adjacent rotors (e.g., the longitudinal gap between the first and second sets of rotors 1604, 1606 of FIG. 16). However, fluctuations in strip tension can be controlled through adjustment of the gap. Through trial and experimentation, it has been determined that highly efficient tension fluctuation control can be achieved with 400 mm rotors placed at distances of 250 mm apart. In some cases, first and second sets of rotors and third and fourth sets of rotors can be placed at 250 mm apart, while second and third sets of rotors can be placed at 500 mm apart. In some cases, second and third sets of rotors can be positioned to have longitudinal gaps that are twice as wide as the longitudinal gaps between the first and second sets of rotors and third and fourth sets of rotors.

Through trial and experimentation, it has been determined that tension fluctuations can be controlled by ensuring the longitudinal gap between adjacent rotors is sufficiently far so that magnetic interactions between the adjacent rotors does not induce undesired tension fluctuations. It can be advantageous to position adjacent sets of rotors with longitudinal gaps at or above 50 mm, 100 mm, 200 mm, 300 mm, 400 mm, or 500 mm. In some cases, when flux diverters are used, the distance of the longitudinal gap can be decreased while maintaining effective tension control.

Figure 17:
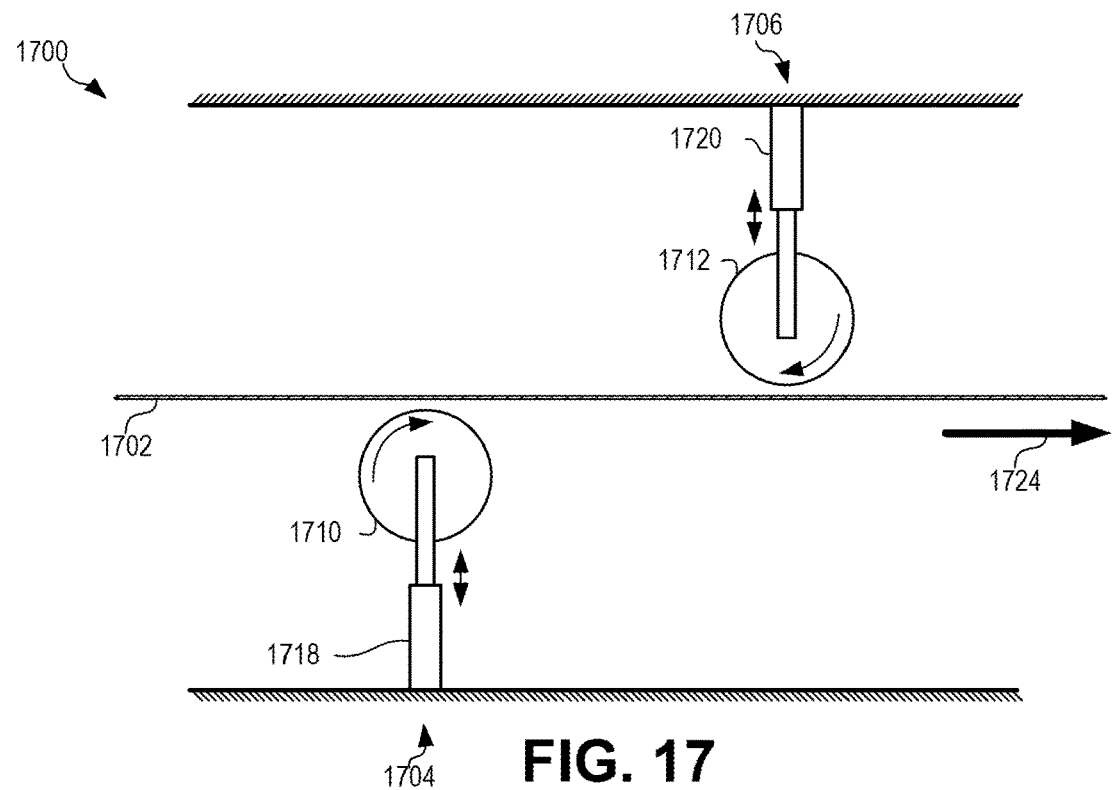
FIG. 17 is a side view of a rotating magnet heater with single-rotor rotor sets according to certain aspects of the present disclosure.

FIG. 17 is a side view of a rotating magnet heater 1700 with single-rotor rotor sets according to certain aspects of the present disclosure. The rotating magnet heater 1700 can include any number of rotors 1710, 1712 and rotor sets 1704, 1706. The rotors 1710, 1712 can be similar to rotors 110, 112 of FIG. 1. As seen in FIG. 17, the rotating magnet heater 1700 includes a first rotor set 1704 and a second rotor set 1706 each having a single rotor. The first rotor set 1704 includes a single bottom rotor 1710 adjacent which the metal strip 1702 can be passed in direction 1724. The bottom rotor 1710 can be supported by a bottom rotor support arm 1718, which can be fixed or actuatable to move in a vertical direction to adjust the distance between the bottom rotor 1710 and the metal strip 1702. In some cases, the bottom rotor support arm 1718 can be vertically fixed or adjustable. The first rotor set 1704 is shown operating in a downstream direction, wherein the bottom rotor 1710 is depicted as rotating in a clockwise direction.

The second rotor set 1706 includes a top rotor 1712 adjacent which the metal strip 1702 can be passed in direction 1724. The top rotor 1712 can be supported by a top rotor support arm 1720, which can be fixed or actuatable to move in a vertical direction to adjust the distance between the top rotor 1712 and the metal strip 1702. In some cases, the top rotor support arm 1720 can be vertically fixed or adjustable. The second rotor set 1704 is shown operating in an upstream direction, wherein the top rotor 1712 is depicted as rotating in a clockwise direction.

Rotors 1710, 1712 can operate without any directly-opposing rotor located opposite the metal sheet from the rotor 1710, 1712. In some cases, adjacent rotor sets 1704, 1706 each having a single rotor can be arranged such that the adjacent rotors are located on opposite sides of the metal strip 1702, although that need not be the case. In some cases, additional equipment, such as supporting rollers, gas nozzles (e.g., air nozzles), or other such equipment can be used to counteract any force induced by the rotors 1710, 1712 to move the metal strip 1702 away from a desired passline. For example, a single rotor 1710, 1712 may pull the metal strip 1702 slightly towards the rotor 1710, 1712. Such pulling force can be counteracted through gravity, supporting rollers, or any other applied force (e.g., via gas nozzles). In some cases, no counteracting force is applied.

Figure 18:
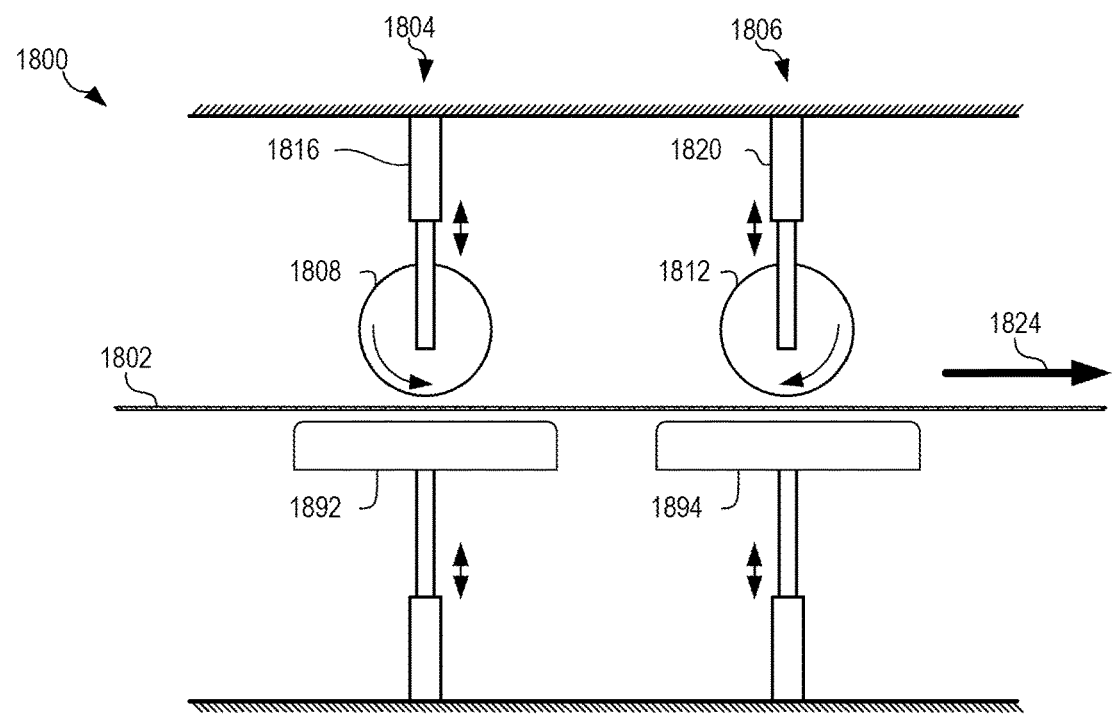
FIG. 18 is a side view of a rotating magnet heater with single-rotor rotor sets opposite metal plates according to certain aspects of the present disclosure.

FIG. 18 is a side view of a rotating magnet heater 1800 with single-rotor rotor sets opposite metal plates 1892, 1894 according to certain aspects of the present disclosure. The rotating magnet heater 1800 can include any number of rotors 1808, 1812 and rotor sets 1804, 1806. The rotors 1808, 1812 can be similar to rotors 110, 112 of FIG. 1. As seen in FIG. 18, the rotating magnet heater 1800 includes a first rotor set 1804 and a second rotor set 1806 each having a single rotor and an opposing metal plate. The first rotor set 1804 includes a single top rotor 1808 adjacent which the metal strip 1802 can be passed in direction 1824. The top rotor 1808 can be supported by a top rotor support arm 1816, which can be fixed or actuatable to move in a vertical direction to adjust the distance between the top rotor 1808 and the metal strip 1802. In some cases, the top rotor support arm 1816 can be vertically fixed or adjustable. The first rotor set 1804 is shown operating in a downstream direction, wherein the top rotor 1808 is depicted as rotating in a counterclockwise direction.

The second rotor set 1806 includes a top rotor 1812 adjacent which the metal strip 1802 can be passed in direction 1824. The top rotor 1812 can be supported by a top rotor support arm 1820, which can be fixed or actuatable to move in a vertical direction to adjust the distance between the top rotor 1812 and the metal strip 1802. In some cases, the top rotor support arm 1820 can be vertically fixed or adjustable. The second rotor set 1804 is shown operating in an upstream direction, wherein the top rotor 1812 is depicted as rotating in a clockwise direction.

Rotors 1808, 1812 can operate without any directly-opposing rotor located opposite the metal sheet from the rotor 1808, 1812, rather with opposing metal plates 1892, 1894. The metal plates 1892, 1894 may or may not come into contact with the metal strip 1802. The metal plates 1892, 1894 may be made of a metal, such as a ferrous metal or a non-ferrous metal. In some cases, the metal plates 1892, 1894 may be made of steel. The use of metal plates 1892, 1894 can help orient and/or concentrate the magnetic fields from the rotors 1808, 1812 through the metal strip 1802. The metal plates 1892, 1894 may be held stationary. In some cases, the metal plates 1892, 1894 may be actuatable vertically to adjust the distance between the metal plates 1892, 1894 and the metal strip 1802. In some cases, the metal plates 1892, 1894 can be coated with a protective layer, such as Kevlar. In some cases, rotating magnet heater 1800 does not include metal plates 1892, 1894.

Figure 19:
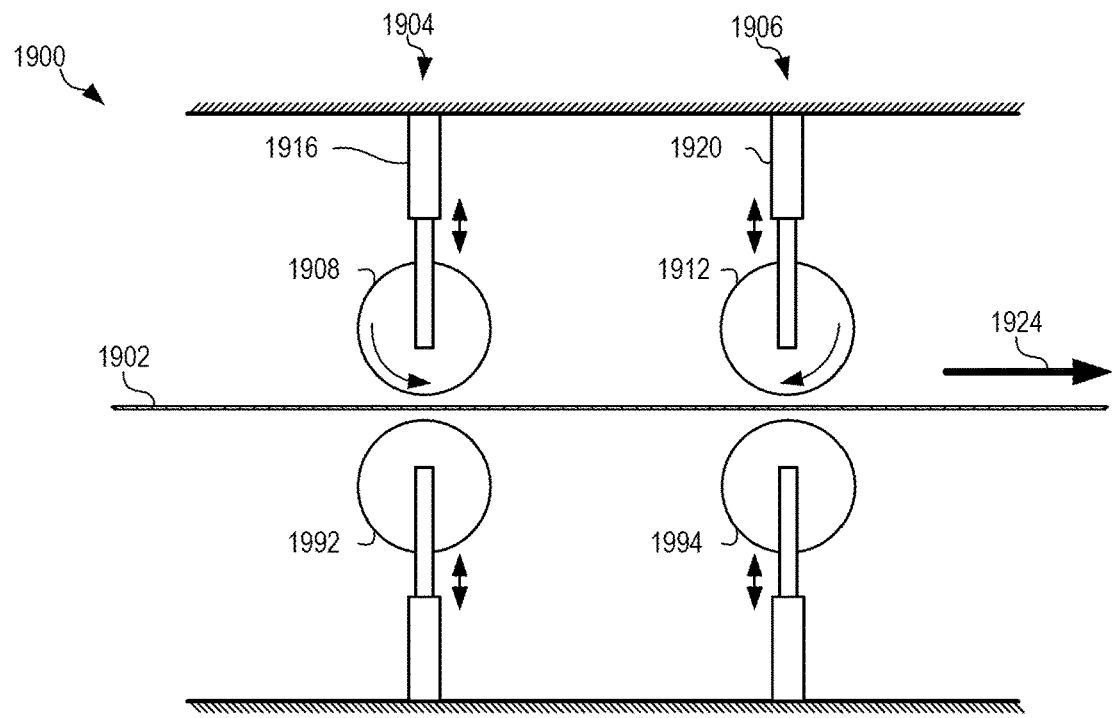
FIG. 19 is a side view of a rotating magnet heater with single-rotor rotor sets opposite rollers according to certain aspects of the present disclosure.

FIG. 19 is a side view of a rotating magnet heater 1900 with single-rotor rotor sets opposite rollers 1992, 1994 according to certain aspects of the present disclosure. The rotating magnet heater 1900 can include any number of rotors 1908, 1912 and rotor sets 1904, 1906. The rotors 1908, 1912 can be similar to rotors 110, 112 of FIG. 1. As seen in FIG. 19, the rotating magnet heater 1900 includes a first rotor set 1904 and a second rotor set 1906 each having a single rotor and an opposing roller. The first rotor set 1904 includes a single top rotor 1908 adjacent which the metal strip 1902 can be passed in direction 1924. The top rotor 1908 can be supported by a top rotor support arm 1916, which can be fixed or actuatable to move in a vertical direction to adjust the distance between the top rotor 1908 and the metal strip 1902. In some cases, the top rotor support arm 1916 can be vertically fixed or adjustable. The first rotor set 1904 is shown operating in a downstream direction, wherein the top rotor 1908 is depicted as rotating in a counterclockwise direction.

The second rotor set 1906 includes a top rotor 1912 adjacent which the metal strip 1902 can be passed in direction 1924. The top rotor 1912 can be supported by a top rotor support arm 1920, which can be fixed or actuatable to move in a vertical direction to adjust the distance between the top rotor 1912 and the metal strip 1902. In some cases, the top rotor support arm 1920 can be vertically fixed or adjustable. The second rotor set 1904 is shown operating in an upstream direction, wherein the top rotor 1912 is depicted as rotating in a clockwise direction.

Rotors 1908, 1912 can operate without any directly-opposing rotor located opposite the metal sheet from the rotor 1908, 1912, rather with opposing rollers 1992, 1994. The rollers 1992, 1994 may or may not come into contact with the metal strip 1902. The rollers 1992, 1994 may be made of a metal, such as a ferrous metal or a non-ferrous metal. In some cases, the rollers 1992, 1994 may be made of steel. The use of rollers 1992, 1994 can help orient and/or concentrate the magnetic fields from the rotors 1908, 1912 through the metal strip 1902, while optionally providing support to the metal strip 1902. The rollers 1992, 1994 may be free to rotate or may be driven to rotate (e.g., with a motor). In some cases, the rollers 1992, 1994 may be actuatable vertically to adjust the distance between the rollers 1992, 1994 and the metal strip 1902. In some cases, the rollers 1992, 1994 can be coated with a protective layer, such as Kevlar.

Figure 20:
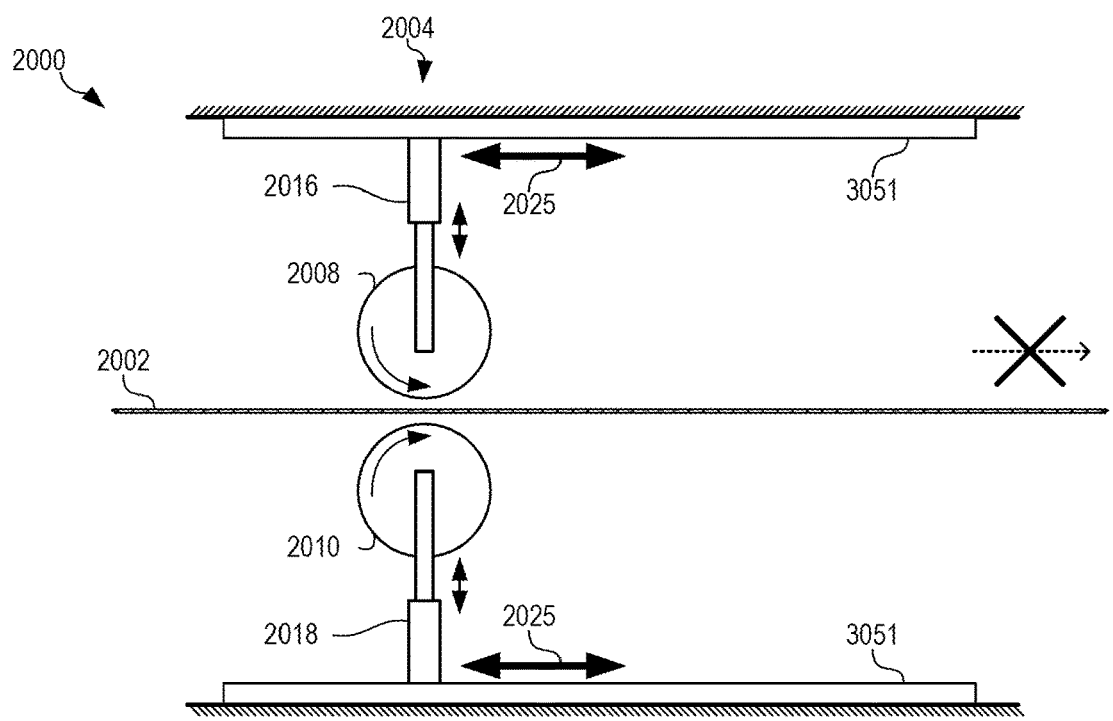
FIG. 20 is a side view of a rotating magnet heater movable relative to a stationary metal strip according to certain aspects of the present disclosure.

FIG. 20 is a side view of a rotating magnet heater 2000 movable relative to a stationary metal strip 2002 according to certain aspects of the present disclosure. The rotating magnet heater 2000 can include any number of rotors 2008, 2010 and rotor sets 2004. The rotors 2008, 2010 can be similar to rotors 108, 110 of FIG. 1. As seen in FIG. 20, the rotating magnet heater 2000 includes a first rotor set 2004 having top and bottom rotors 2008, 2010. Other configurations can be used. The metal strip 2002 can be positioned adjacent the rotors 2008, 2010, such as between a vertical gap between the rotors 2008, 2010. The metal strip 2002 can be held stationary (e.g., stationary with respect to the ground), as indicated by the crossed-out direction arrow. To achieve the desired heating effects, the rotor set 2004 can move longitudinally with respect to the metal strip 2002, such as in direction 2025. In some cases, the rotor support arms 2016, 2018 can be movably coupled to tracks 2051. Movement along the tracks 2051 can permit the rotors 2008, 2010 to move longitudinally with respect to the metal strip 2002, achieving the same relative motion, and therefore overall heating effect, as if the metal strip 2002 were moving and the rotors 2008, 2010 were held longitudinally stationary, such as depicted in FIG. 1. The rotors 2008, 2010 may continue to rotate (e.g., in a downstream direction as depicted in FIG. 20) as they are translated longitudinally up or down the length of the metal strip 2002. In some cases, instead of a stationary metal strip 2002, other metal pieces, parts, or products can be used, such as metal sheets, metal shate, metal plate, formed parts, or the like.

Figure 21:
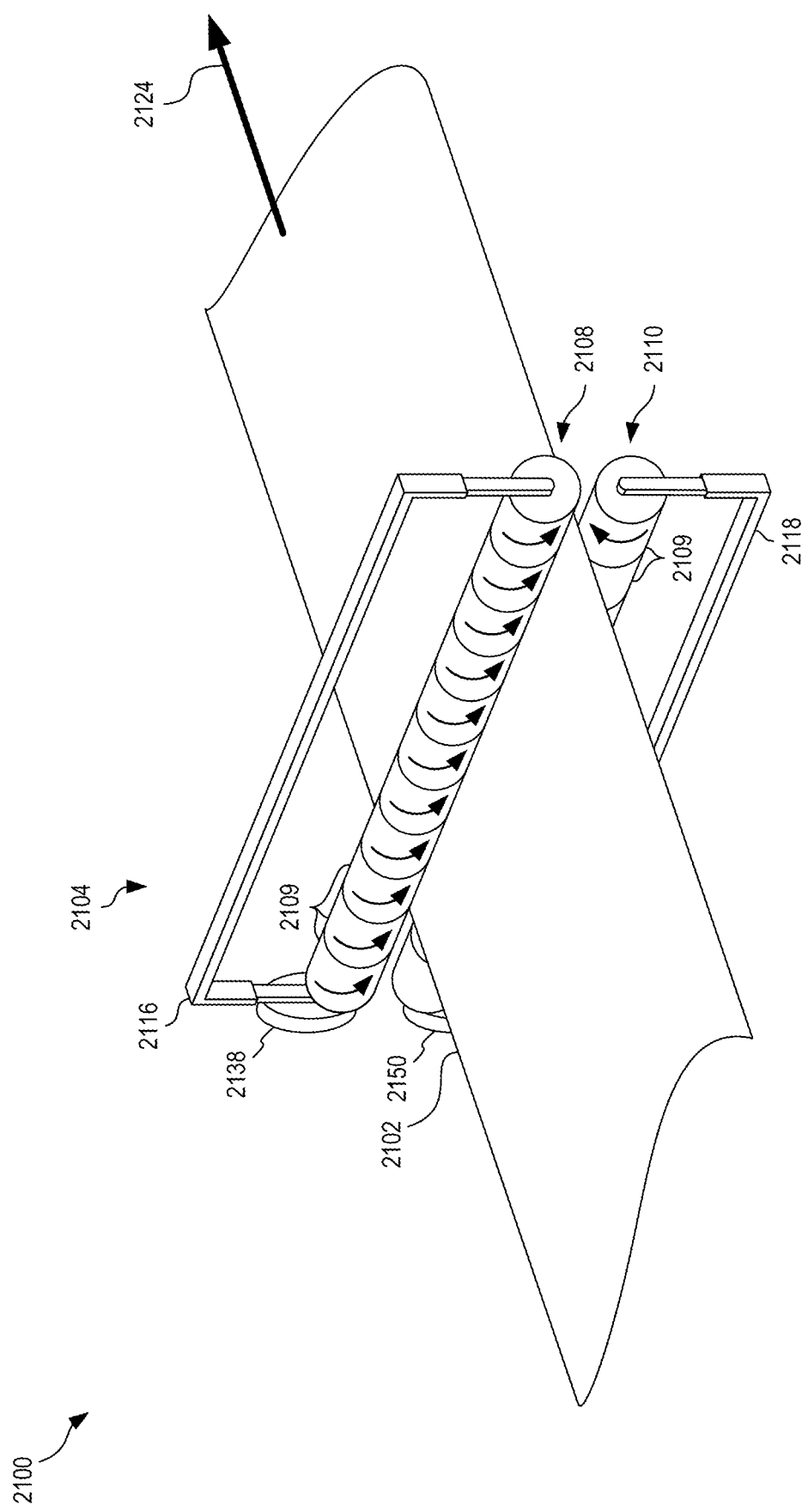
FIG. 21 is an axonometric projection of a rotating magnet heater having multiple sub-rotors according to certain aspects of the present disclosure.

FIG. 21 is an axonometric projection of a rotating magnet heater 2100 having multiple sub-rotors 2109 according to certain aspects of the present disclosure. Rotating magnet heater 2100 can be similar to rotating magnet heater 200 of FIG. 2. A rotor set 2104 can include a top rotor 2108 supported by a top rotor support arm 2116 and driven by a top rotor motor 2138 as well as a bottom rotor 2110 supported by a bottom rotor support arm 2118 and powered by a bottom rotor motor 2150. The rotors 2108, 2110 in FIG. 21 are depicted without an outer covering, although an outer covering may be used over some or all of the sub-rotors 2109.

Each rotor 2108, 2110 can include two or more sub-rotors 2109. Each sub-rotor 2109 can occupy less than 100% of the width of the rotor in which it is included. As depicted in FIG. 21, the rotors 2108, 2110 each comprise eleven sub-rotors 2109. Each sub-rotor 2109 can provide a discrete amount of magnetic flux (e.g., changing magnetic fields) to the metal strip 2102 in a discrete area (e.g., at or around the sub-rotor 2109). Each sub-rotor 2109 can be individually driven (e.g., through individual motors) or can be co-driven with one or more other sub-rotors 2109 (e.g., multiple sub-rotors 2109 sharing a single motor). Rotor motors or other motive force providers can be used to rotate the sub-rotors 2109. In some cases, individual sub-rotors 2109 can be configured to rotate at different rates of speed than other sub-rotors 2109. For example, sub-rotors 2109 longitudinally located above or below a traditionally "cold" spot on the surface of the metal strip 2102 (e.g., slightly inwards from the edges of the metal strip) can be driven faster than adjacent sub-rotors 2109, allowing that location to be heated more than adjacent locations, thus inducing a more even or more homogenous temperature profile across the width of the metal strip. In some cases, sub-rotors 2109 can be pre-set to rotate at certain relative speeds to one another, such as through the use of gears or gear systems. In some cases, transmissions can be used to manually or automatically change the relative speeds of a sub-rotor 2109 to another sub-rotor 2109.

Figure 22:
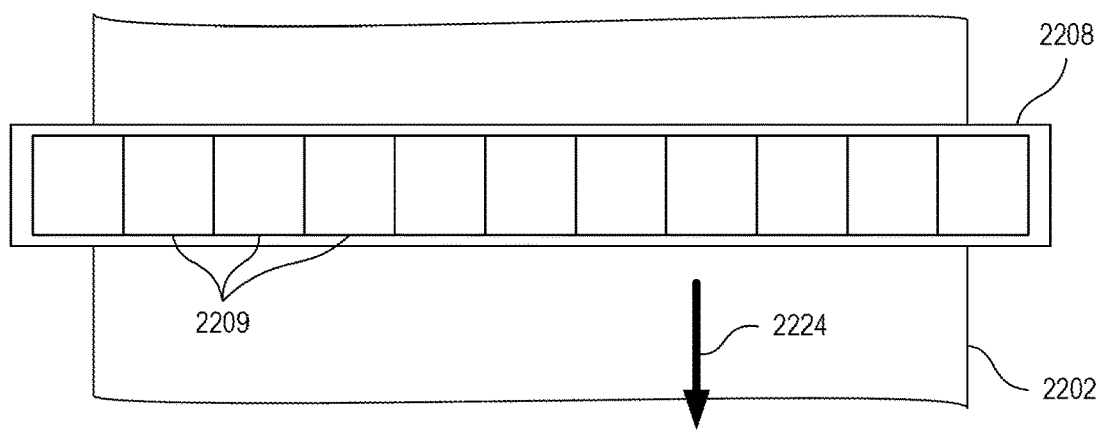
FIG. 22 is a top view of a rotating magnet heater having multiple sub-rotors according to certain aspects of the present disclosure.

FIG. 22 is a top view of a rotating magnet heater 2200 having multiple sub-rotors 2209 according to certain aspects of the present disclosure. The rotating magnet heater 2200 can include a rotor 2208. Rotor 2208 can be similar to rotor 2108 of FIG. 21. The metal strip 2202 can pass underneath rotor 2208 in direction 2224, and therefore under the sub-rotors 2209.

Figure 23:
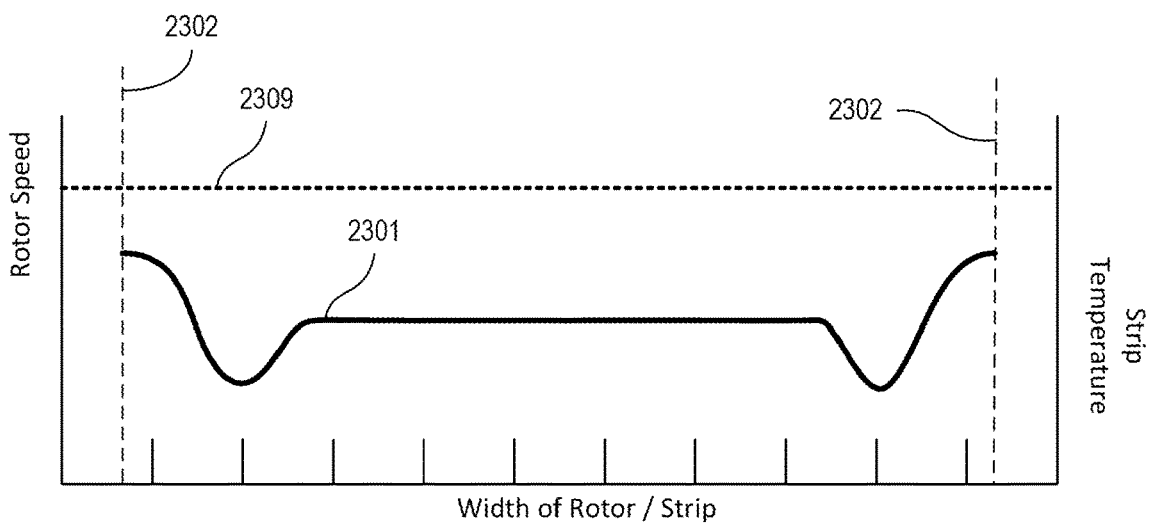
FIG. 23 is a chart depicting rotor speed and strip temperature of the rotor and metal strip of FIG. 22 under a first condition according to certain aspects of the present disclosure.

FIG. 23 is a chart depicting rotor speed 2309 and strip temperature 2301 of the rotor 2208 and metal strip 2202 of FIG. 22 under a first condition according to certain aspects of the present disclosure. Line 2309 depicts non-dimensionalized rotor speed for each of the eleven sub-rotors 2209 of FIG. 22. For convenience, the chart of FIG. 23 is aligned vertically with the sub-rotors 2209 of FIG. 22. Dashed lines 2302 denote the edges of the metal strip 2202. Line 2301 depicts non-dimensionalized strip temperature across the width of the metal strip 2202 at or immediately after passing the rotor 2208. The lines 2309, 2301 are not necessarily drawn to scale, but shown as exaggerated for demonstrative purposes.

Under the first condition, each of the sub-rotors 2209 is driven at the same speed, which generates similar or identical moving magnetic fields to a single full-length rotor. The strip temperature 2301 resulting from such moving magnetic fields shows a profile having "hot" spots at the edges of the metal strip 2202 and "cool" spots slightly proximal of the edges of the metal strip 2202 (e.g., just inwards from the edges of the metal strip 2202). These hot spots and cool spots can be the result of edge effects as the magnetic fields and induced electrical fields interact at the edges of the metal strip 2202. This uneven temperature distribution can be undesirable.

Figure 24:
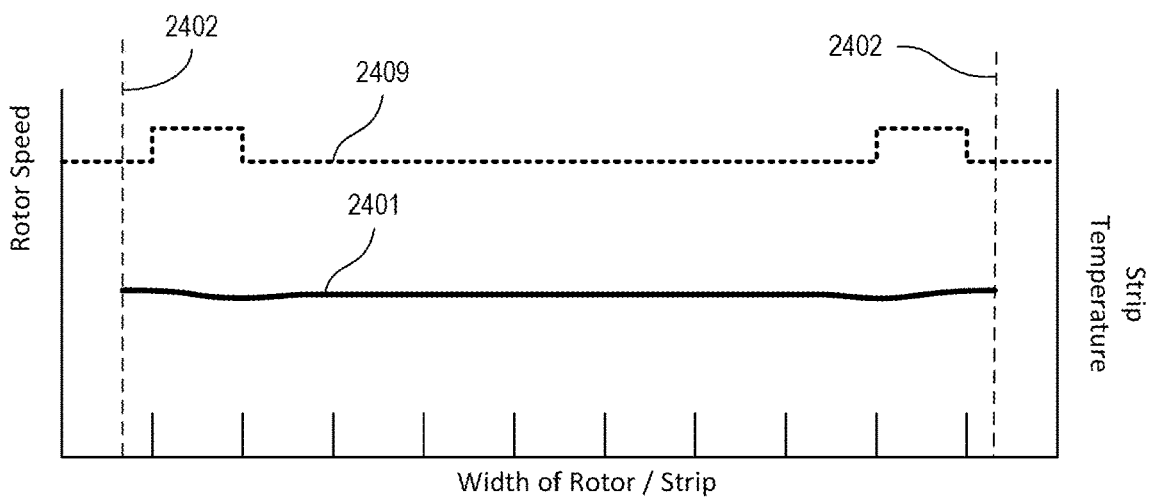
FIG. 24 is a chart depicting rotor speed and strip temperature of the rotor and metal strip of FIG. 22 under a second condition according to certain aspects of the present disclosure.

FIG. 24 is a chart depicting rotor speed 2409 and strip temperature 2401 of the rotor 2208 and metal strip 2202 of FIG. 22 under a second condition according to certain aspects of the present disclosure. Line 2409 depicts non-dimensionalized rotor speed for each of the eleven sub-rotors 2209 of FIG. 22. For convenience, the chart of FIG. 24 is aligned vertically with the sub-rotors 2209 of FIG. 22. Dashed lines 2402 denote the edges of the metal strip 2202. Line 2401 depicts non-dimensionalized strip temperature across the width of the metal strip 2202 at or immediately after passing the rotor 2208. The lines 2409, 2401 are not necessarily drawn to scale, but shown as exaggerated for demonstrative purposes.

Under the second condition, each of the sub-rotors 2209 is driven at the same speed except for the penultimate sub-rotors 2209 adjacent the ends of the rotor 2208. The penultimate sub-rotors 2209 are shown as being driven at speeds greater than the remaining sub-rotors 2209. This condition generates similar moving magnetic fields to a single full-length rotor except near or slightly inwards of the edges of the metal strip 2202, where the amount of heating in increased. The strip temperature 2401 resulting from such moving magnetic fields shows a profile that is more uniform across the width of the metal strip 2202 than the strip temperature 2301 of the first condition depicted in FIG. 23. Thus, by adjusting the speed of particular sub-rotors 2209 in a rotor 2208 having sub-rotors 2209, temperature uniformity across the width of the metal strip 2202 can be improved.

In some cases, the strip temperature 2401 can be considered a uniform temperature profile. In some cases, other techniques, such as those disclosed here, can be used to achieve a uniform temperature profile. A uniform temperature profile can include a temperature profile across a metal article that varies no more than 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., 20° C., 21° C., 22° C., 23° C., 24° C., or 25° C. from an average temperature. In some cases, other variations can be used. In some cases, the variation can be no more than 1° C., 2° C., 3° C., 4° C., 5° C., 6° C., 7° C., 8° C., 9° C., or 10° C. from an average temperature.

Figure 25:
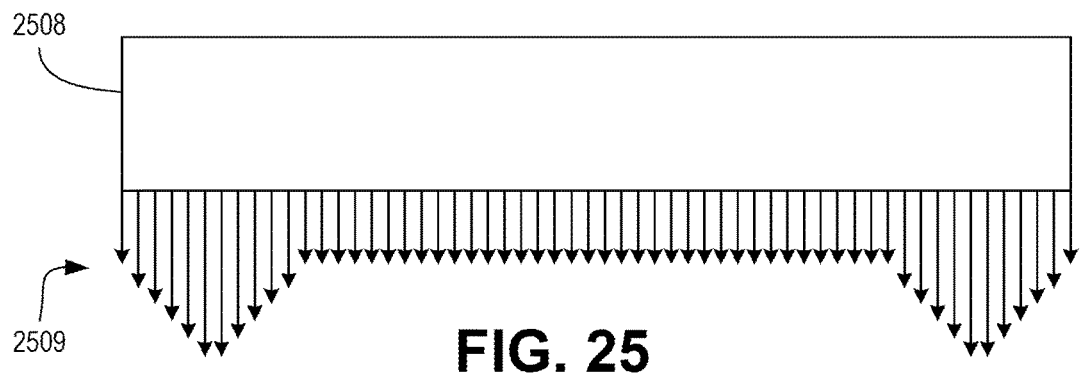
FIG. 25 is a front view of a rotor depicting a magnetic flux profile according to certain aspects of the present disclosure.

FIG. 25 is a front view of a rotor 2508 depicting a magnetic flux profile 2509 according to certain aspects of the present disclosure. As disclosed herein, various techniques can enable different amounts of magnetic flux to be passed through a metal strip traveling adjacent a magnetic rotor. One technique for controlling the amount of heat introduced across a width of the metal strip is to provide a rotor 2508 having a tailored magnetic flux profile 2509. The tailored magnetic flux profile 2509 can be designed to impart the desired amount of heating to the metal strip when the rotor 2508 is rotated adjacent a moving metal strip. Rotor 2508 can be any of the rotors described herein, such as rotor 108 of FIG. 1. Various techniques can impart a tailored magnetic flux profile 2509, as described in further detail herein. In some cases, it can be desirable to provide increased magnetic flux immediately proximal to the edges of the metal strip to reduce the prevalence of cool spots, such as those depicted in FIG. 23. In some cases, other magnetic flux profiles 2509 can be desired to provide improve temperature control, more flexibility in temperature control, or for other reasons.

In some cases, the tailored magnetic flux profile 2509 of a rotor 2508 can be static and not dynamically adjustable. In such cases, the rotor 2508 may need to be stopped (e.g., rotation halted) and optionally removed in order to adjust the magnetic flux profile 2509. In some cases, a rotor 2508 can have a tailored magnetic flux profile 2509 that is static, established using a desired array of permanent magnets, such as a Halbach array. In some cases, the magnetic flux profile 2509 can be adjusted dynamically, such as according to a pre-determined program or in response to feedback (e.g., signals from a temperature sensor, a flatness sensor, a power sensor, or other such sensor). The magnetic flux profile 2509 can be dynamically adjusted according to any suitable technique, such as adjusting rotation speed of sub-rotors, adjusting actuators to move some of the magnets of a rotor closer to or further from the metal strip (e.g., closer to or further form an outer shell of the rotor), adjusting actuators to move flux concentrators within or around a rotor and so forth.

Similarly, in some cases, the position and/or orientation of a rotor can be controlled to adjust the magnetic flux profile that passes through the metal strip. In such cases, the magnetic flux profile 2509 of the rotor 2508 itself may not dynamically change, but the profile of the magnetic flux through the metal strip can be dynamically adjusted.

The tailored magnetic flux profile 2509 of rotor 2508 depicted in FIG. 25 includes triangular shaped profile elements. In some cases, profile elements can take on other shapes, such as square-shaped, circular, ellipsoidal, sawtooth, or any other suitable shape.

Figure 26:
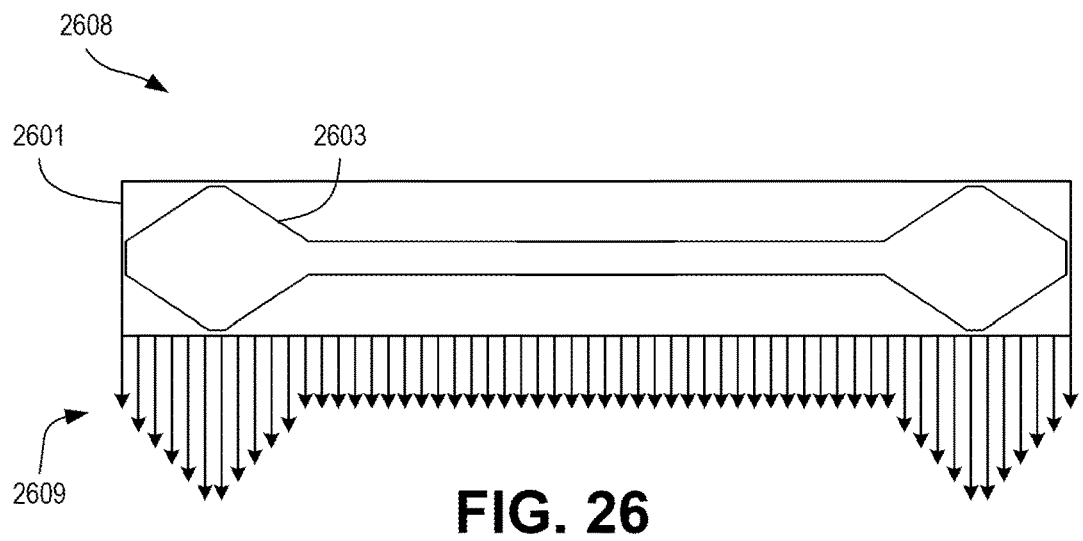
FIG. 26 is a front see-through view depicting a rotor having a contoured magnetic rotor within a shell according to certain aspects of the present disclosure.

FIG. 26 is a front see-through view depicting a rotor 2608 having a contoured magnetic rotor 2603 within a shell 2601 according to certain aspects of the present disclosure. Rotor 2608 is one example of how the tailored magnetic flux profile 2509 of FIG. 25 can be achieved. Rotor 2608 includes an outer shell 2601 presenting a cylindrical outer surface. Within the shell 2601, a contoured magnetic rotor 2603 has a contour capable of achieving the desired tailored magnetic flux profile 2609. The contoured magnetic rotor 2603 can comprise several magnets arranged around the magnetic rotor 2603. At portions where more magnetic flux is desired, the diameter of the magnetic rotor 2603 can be larger, whereas locations where the diameter of the magnetic rotor 2603 is smaller can result in less magnetic flux near those location.

Figure 27:
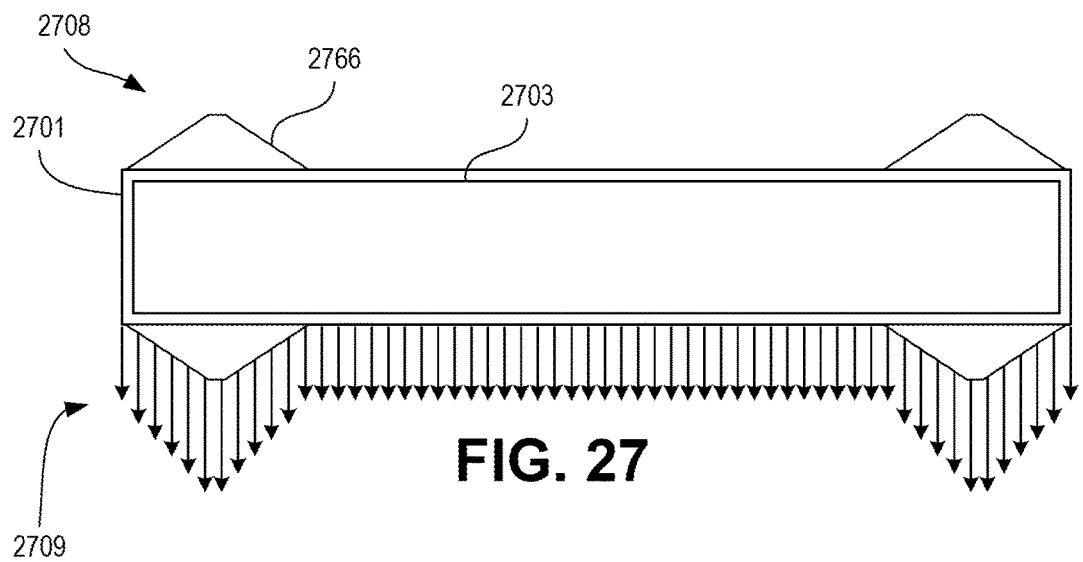
FIG. 27 is a front see-through view depicting a rotor having a flux concentrators according to certain aspects of the present disclosure.

FIG. 27 is a front see-through view depicting a rotor 2708 having a flux concentrators 2766 according to certain aspects of the present disclosure. Rotor 2708 is one example of how the tailored magnetic flux profile 2509 of FIG. 25 can be achieved. Rotor 2708 includes an outer shell 2701 with flux concentrators 2766 coupled thereto or incorporated on the shell 2701. Within the shell 2701, a magnetic rotor 2703 has a flat contour that would normally output a flat magnetic flux profile. Because of the presence of the flux concentrators 2766, the magnetic flux profile 2709 of the rotor 2708 presents a tailored contour, similar to the tailored magnetic flux profile 2509 of FIG. 25. In some cases, dynamic adjustment of a rotor's magnetic flux profile 2709 can be achieved through dynamic manipulation of the flux concentrators 2766. In some cases, the flux concentrators 2766 can be located within the shell 2701, such as between the shell 3081 and the magnetic rotor 2703. Flux concentrators 2766 can be any material suitable for concentrating magnetic flux, such as electrical steel (e.g., laminated steel).

Figure 28:
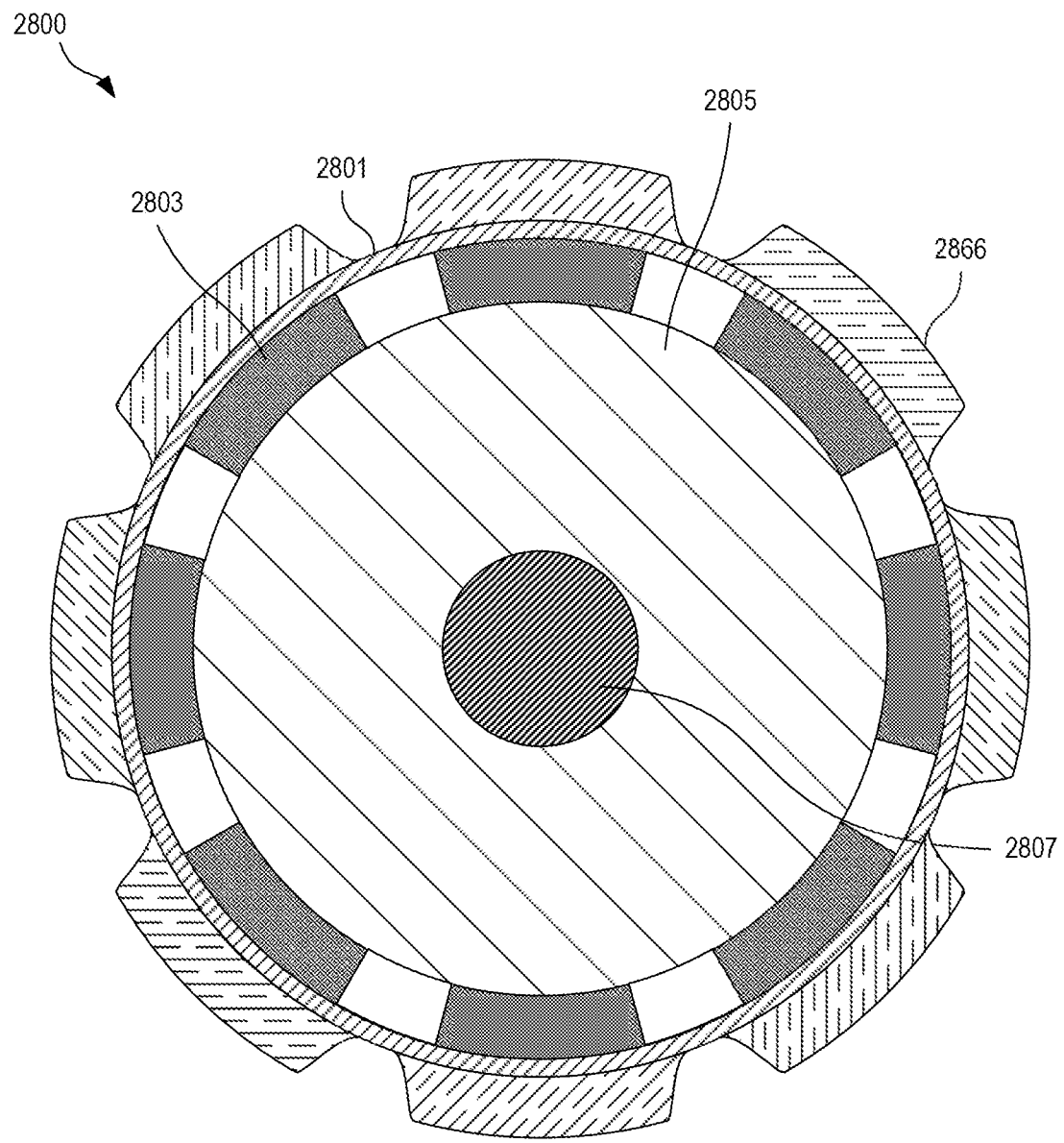
FIG. 28 is a cutaway side view of a permanent magnetic rotor with flux concentrators according to certain aspects of the present disclosure.

FIG. 28 is a cutaway side view of a permanent magnetic rotor 2800 with flux concentrators 2866 according to certain aspects of the present disclosure. The magnetic rotor 2800 can be rotor 2708 of FIG. 27, or any other suitable rotor, such as rotors 108, 110, 112, 114 of FIG. 1. The magnetic rotor 2800 can include one or more magnetic sources 2803, such as permanent magnets. The magnetic rotor 2800 of FIG. 28 can be similar to the magnetic rotor 400 of FIG. 4 but with the addition of flux concentrators 2866.

The magnetic sources 2803 can be enclosed by a shell 2801. The shell 2801 can be any suitable material capable of allowing magnetic flux to pass therethrough. In some cases, the shell 2801 can be made of or can further include a non-metallic coating. In some cases, the shell 2801 can include a Kevlar coating.

In some cases, the magnetic rotor 2800 can include a ferromagnetic core 2805 having a central axle 2807. In some cases, the magnetic rotor 2800 can include other internal arrangements suitable for supporting the magnetic sources 2803. Any suitable number of magnetic sources 2803 can be used.

In some cases, flux concentrators 2866 can be coupled to the shell 2801 or otherwise incorporated into the surface of the shell 2801. In some cases, flux concentrators can be located within the confines of the shell 2801, allowing the exterior surface of the rotor to remain substantially cylindrical. The flux concentrators 2866 can be positioned at the outward-facing edges (e.g., radially-outward-facing edges) of the magnetic sources 2803. Magnetic flux can be improved wherever flux concentrators 2866 are present relative to locations where no flux concentrators 2866 are present. Therefore, a rotor 2800 can be constructed with magnetic flux concentrators 2866 at some lateral locations along the width of the rotor 2800 (e.g., into and out of the page as seen in FIG. 28), and not at other locations. Thus, a tailored magnetic flux profile can be achieved across the width of the rotor 2800.

Figure 29:
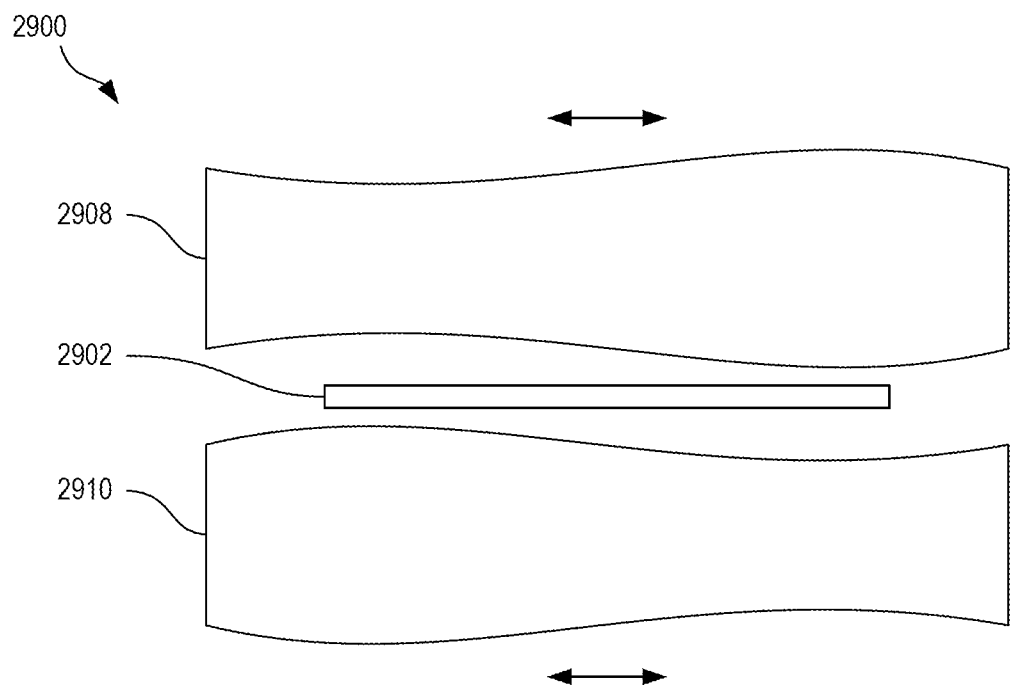
FIG. 29 is a front view depicting a rotor set including variable-flux rotors according to certain aspects of the present disclosure.

FIG. 29 is a front view depicting a rotor set 2900 including variable-flux rotors 2908, 2910 according to certain aspects of the present disclosure. As depicted in FIG. 29, the outlines of the rotors 2908, 2910 are contoured (e.g., vase-like contour or bowling-pin-like contour) to represent the contoured magnetic flux profile of the rotors 2908, 2910. The actual exterior surface of the rotors 2908, 2910 may be contoured, cylindrical, or otherwise shaped. As disclosed herein, a tailored magnetic flux profile can be established using various techniques regardless of the shape of the outer shell of the rotor 2908, 2910.

Rotors 2908, 2910 specifically take on a continuously variable magnetic flux profile. This particular profile can be known as a continuously variable crown profile. This particular profile, and other similar profiles, can be used to provide improved adjustability to the amount of flux passing through the magnetic strip 2902. By adjusting the position and/or orientation of the rotors 2908, 2910, different magnetic field profiles can be presented to the metal strip 2902. For example, moving the position of one or more rotors 2908, 2910 in a lateral direction (e.g., left-right as seen in FIG. 29) or in a vertical direction (e.g., up-down as seen in FIG. 29) can provide a certain degree of control over the magnetic flux passing through the metal strip 2902. Further, rotation of one or more of the rotors 2908, 2910 about a longitudinal axis (e.g., longitudinal axis of the metal strip, or clockwise or counterclockwise rotation as seen in FIG. 29) or about a vertical axis (e.g., rotation about an axis parallel with the page and extending from the bottom to the top of the page as seen in FIG. 29) can provide a further degree of control over the magnetic flux passing through the metal strip 2902. Finally, coordinated adjustment of the top rotor 2908 and the bottom rotor 2910 with respect to one another and with respect to the metal strip 2902 can provide even further control over the magnetic flux passing through the metal strip 2902.

Figure 30:
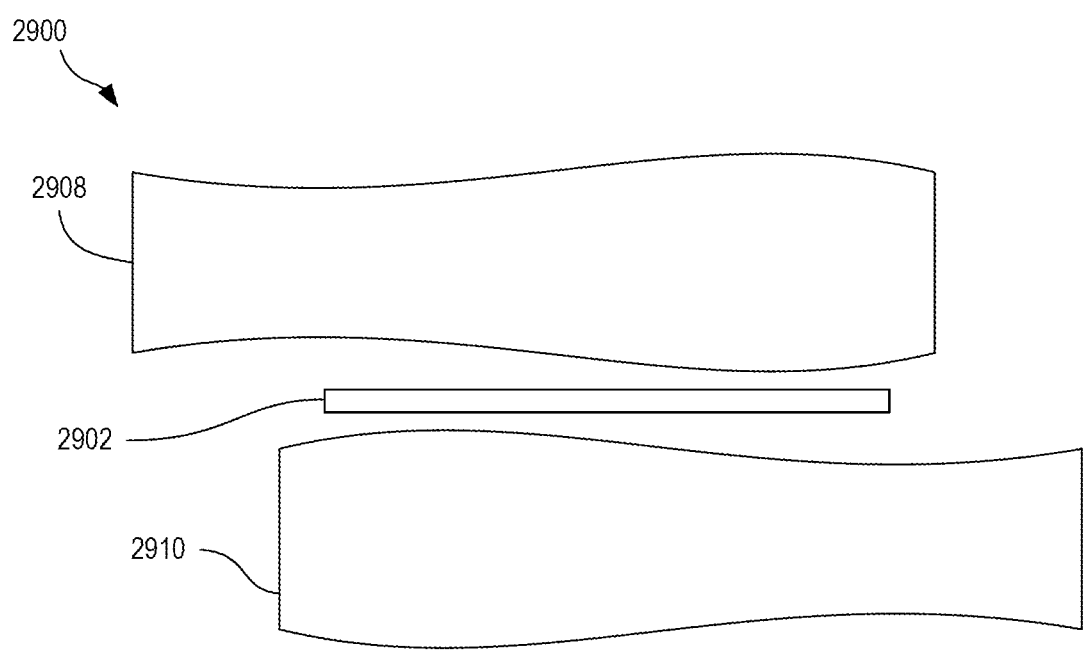
FIG. 30 is a front view depicting the rotor set of FIG. 29 after repositioning of the variable-flux rotors according to certain aspects of the present disclosure.

FIG. 30 is a front view depicting the rotor set 2900 of FIG. 29 after repositioning of the variable-flux rotors 2908, 2910 according to certain aspects of the present disclosure. In FIG. 30, the top rotor 2908 has been moved in a first direction and the bottom rotor 2910 has been moved in an opposite direction. As a result, portions of the rotors 2908, 2910 with higher magnetic flux are positioned more directly over the metal strip 2902, resulting in increased heat input into the metal strip 2902 near the edges of the metal strip 2902.

Figure 31:
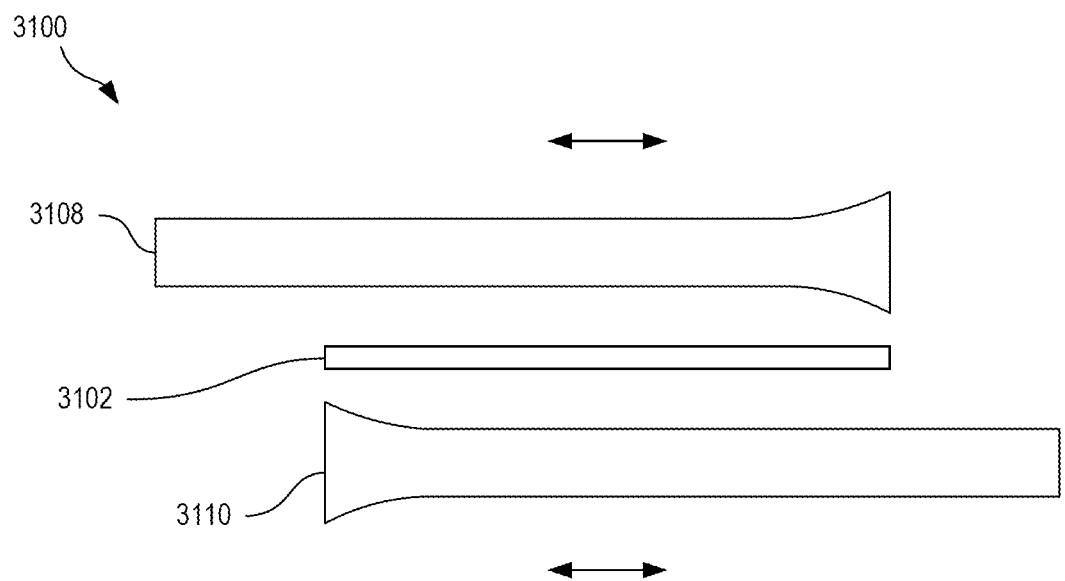
FIG. 31 is a front view depicting a rotor set including flared-flux rotors according to certain aspects of the present disclosure.

FIG. 31 is a front view depicting a rotor set 3100 including flared-flux rotors 3108, 3110 according to certain aspects of the present disclosure. As depicted in FIG. 31, the outlines of the rotors 3108, 3110 are flared (e.g., trumpet-like contour) to represent the flared magnetic flux profile of the rotors 3108, 3110. The actual exterior surface of the rotors 3108, 3110 may be flared, cylindrical, or otherwise shaped. As disclosed herein, a tailored magnetic flux profile can be established using various techniques regardless of the shape of the outer shell of the rotor 3108, 3110.

The flared shape of the magnetic flux profile of the rotors 3108, 3110 can be especially useful for adjusting the amount of heating occurring near the edges of the metal strip 3102. By laterally adjusting (e.g., left-right as seen in FIG. 31) the position of the rotors 3108, 3110 with respect to one another and with respect to the metal strip 3102, the intensity of magnetic flux passing through the metal strip can be increased near the edges of the metal strip 3102 without increasing the amount of magnetic flux passing through the center of the metal strip.

Figure 32:
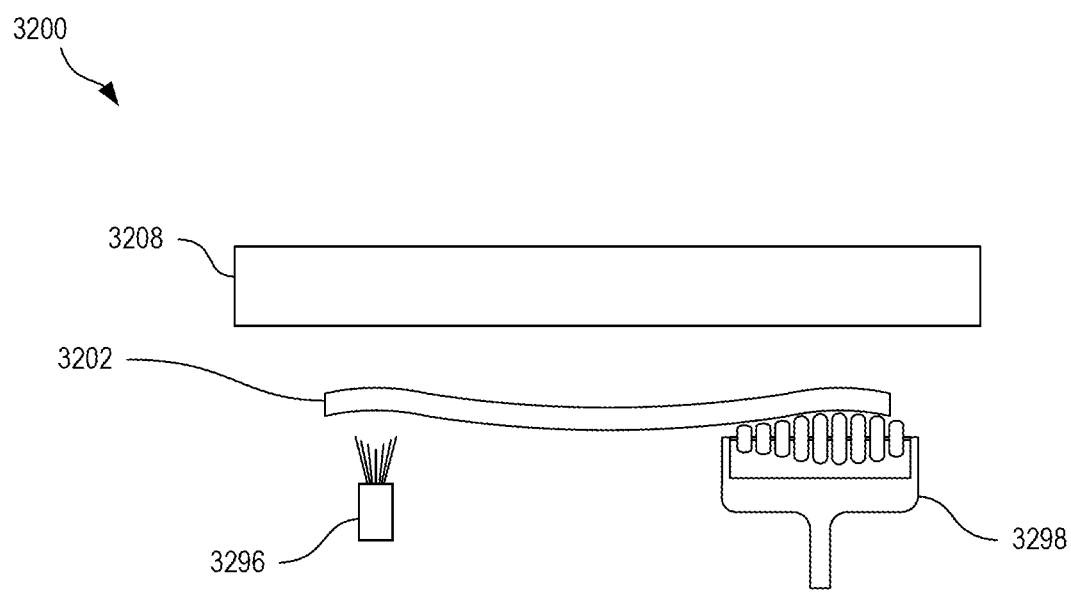
FIG. 32 is a front view depicting techniques for adjusting the amount of magnetic flux passing through a metal strip according to certain aspects of the present disclosure.

FIG. 32 is a front view depicting techniques for adjusting the amount of magnetic flux passing through a metal strip 3202 according to certain aspects of the present disclosure. As depicted in FIG. 32, the outline of the rotor 3208 is linear (e.g., cylindrical) to represent the linear magnetic flux profile of the rotors 3208. The techniques depicted in FIG. 32, however, can also be used with rotors 3208 having nonlinear (e.g., contoured) magnetic flux profiles. The actual exterior surface of the rotors 3208, 3210 may be contoured, cylindrical, or otherwise shaped. As disclosed herein, a tailored magnetic flux profile through the metal strip 3202 can be established using various techniques regardless of the magnetic flux profile of the rotor 3208. By applying external force to the metal strip 3202, the metal strip 3202 can be urged towards the rotor 3208 at certain locations (e.g., the edges of strip 3202 in FIG. 32) and remain distant from the rotor 3208 at other locations (e.g., the center of strip 3202 in FIG. 32). Thus, the portions of the metal strip 3202 nearest the rotor 3208 may be supplied with the strongest magnetic flux. Any suitable technique can be used to apply force to urge the metal strip 3202 towards the rotor 3208. In one example, a spray 3296 of fluid, such as a gas (e.g., air) can be supplied to the metal strip 3202 opposite the rotor 3208 at a location where increased magnetic flux is desired. This spray 3296 of fluid can urge the metal strip 3202 towards the rotor 3208. In another example, a roller or set of rollers 3298 can be positioned opposite the metal strip 3202 from the rotor 3208 at the location where increased magnetic flux is desired. This roller or set of rollers 3298 can urge the metal strip 3202 towards the rotor 3208. Other suitable techniques can be used to selectively urge portions of the metal strip 3202 towards the rotor 3208.

Figure 33:
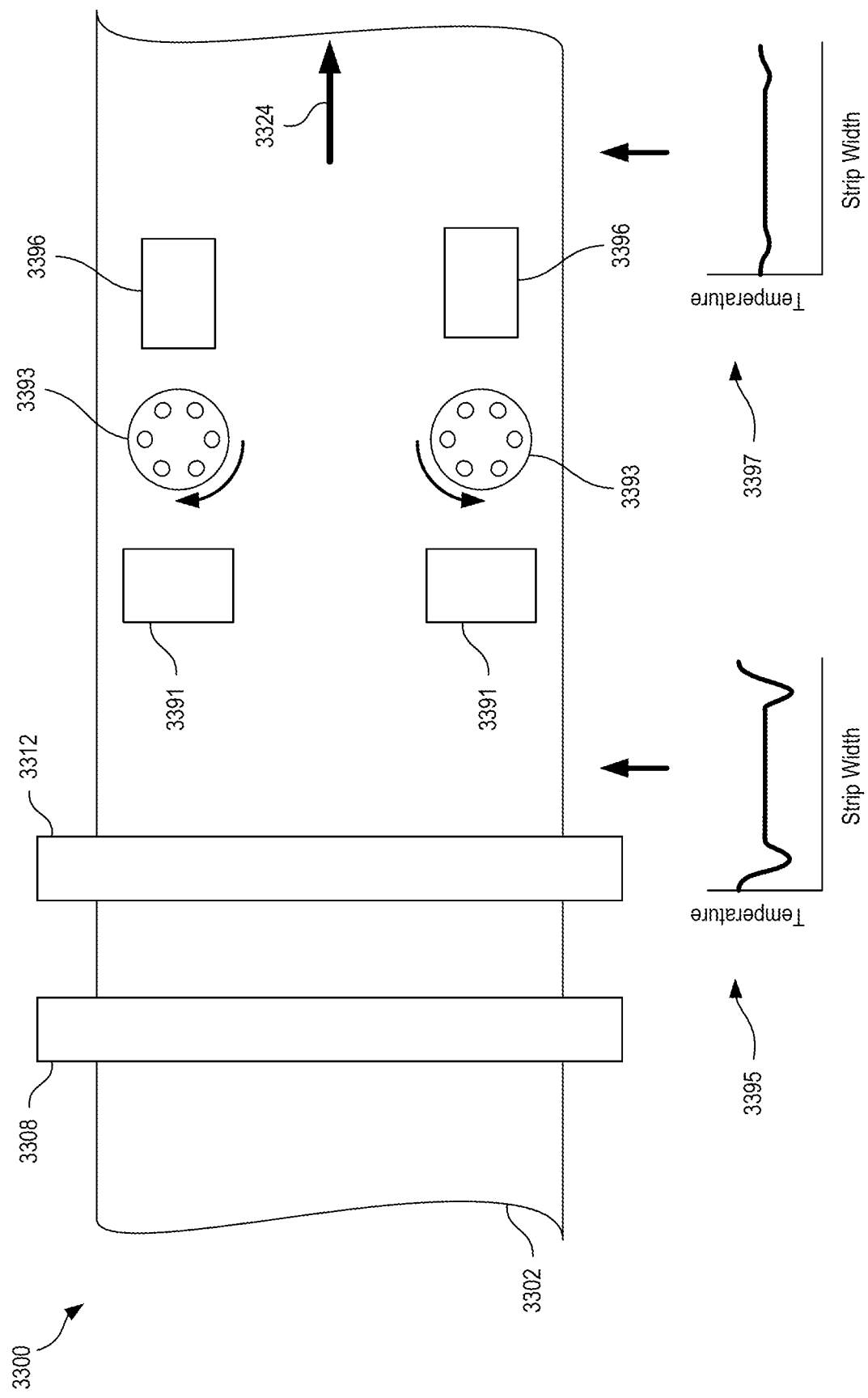
FIG. 33 is a top view of a rotating magnet heater according to certain aspects of the present disclosure.

FIG. 33 is a top view of a rotating magnet heater 3300 according to certain aspects of the present disclosure. The rotating magnet heater 3300 can be similar to the rotating magnet heater 100 of FIG. 1 or rotating magnet heater 200 of FIG. 2, although with additional heating elements 3391, 3393, 3396 (e.g., auxiliary heating elements). The rotating magnet heater 3300 of FIG. 33 can make use of the additional heating elements 3391, 3393, 3396 to even out any cool spots in the metal strip 3302 after heating using the rotors 3308, 3312. Any number of additional heating elements 3391, 3393, 3396 can be used, such as one, two (e.g., a pair of elements symmetrically positioned about a centerline of the lateral width of the metal strip 3302), or three or more.

As the metal strip 3302 passes the rotors 3308, 3312 in direction 3324, the metal strip 3302 can be heated. Depending on the magnetic flux passing through the metal strip 3302, the metal strip may exit the rotors 3308, 3312 with a temperature profile 3395 containing cold spots (e.g., localized areas of low temperature). In some cases, these cold spots can be mitigated by applying extra heating using additional heating elements 3391, 3393, 3396. Additional heating elements 3391 can represent any suitable heating element, such as a rotating magnet, hot air, heated fluid, electrical resistance, direct flame impingement, infrared heating, induction heating, or other such elements capable of adding localized heat to the metal strip 3302 at or near the cool spots. As depicted in FIG. 33, the additional heating elements 3391 are positioned downstream of the rotors 3308, 3312, although that need not be the case, and the additional heating elements 3391 can instead be positioned upstream of the rotors 3308, 3312 to pre-heat the area of the metal strip 3302 that would otherwise have resulted in a cool spot.

Additional heating element 3393 is an example of a rotating magnet that includes multiple magnetic poles on a disk that rotates about an axis perpendicular to the surface of the metal strip. This rotation induces heating within the metal strip 3302 around a targeted location, such as where the cool spots exist or are expected to exist.

Additional heating element 3396 is an example of a rotating magnet (e.g., magnetic rotor) that rotates about an axis of rotation that is parallel the direction 3324 (e.g., downstream direction) and perpendicular a lateral width of the metal strip 3302. In some cases, additional heating element 3391 can be a rotating magnet (e.g., a magnetic rotor) that rotates about an axis of rotation that is parallel the rotors 3308, 3312 (e.g., perpendicular direction 3324 and parallel the lateral width of the metal strip 3302).

After passing both the rotors 3308, 3312 and any additional heating elements 3391, 3393, 3396, the metal strip 3302 may have a temperature profile 3397 that is uniform, approximately uniform, or more uniform than temperature profile 3395.

In some cases, the cold spots occur near, but not at, the edges of the metal strip 3302. This location can be common due to the path the eddy currents must take within the metal strip 3302 when approaching an edge, resulting in a localized cold spot a short distance apart from the edge, with a localized hot spot at the edge. In some cases, additional heating elements 3391, 3393, 3396 can be positioned between proximate the metal strip 3302 at a lateral location that lies between an edge of the metal strip 3302 and a lateral centerline of the metal strip 3302. In some cases, the additional heating elements 3391, 3393, 3396 can be positioned adjacent the metal strip at a lateral location that is laterally spaced apart (e.g., towards a lateral centerline of the metal strip) from the edge of the metal strip by a distance at or approximately 5%-25%, 7%-20%, 8%-15%, 9%, 10%, 11%, 12%, 13%, or 14% of the width of the metal strip 3302.

Figure 34:
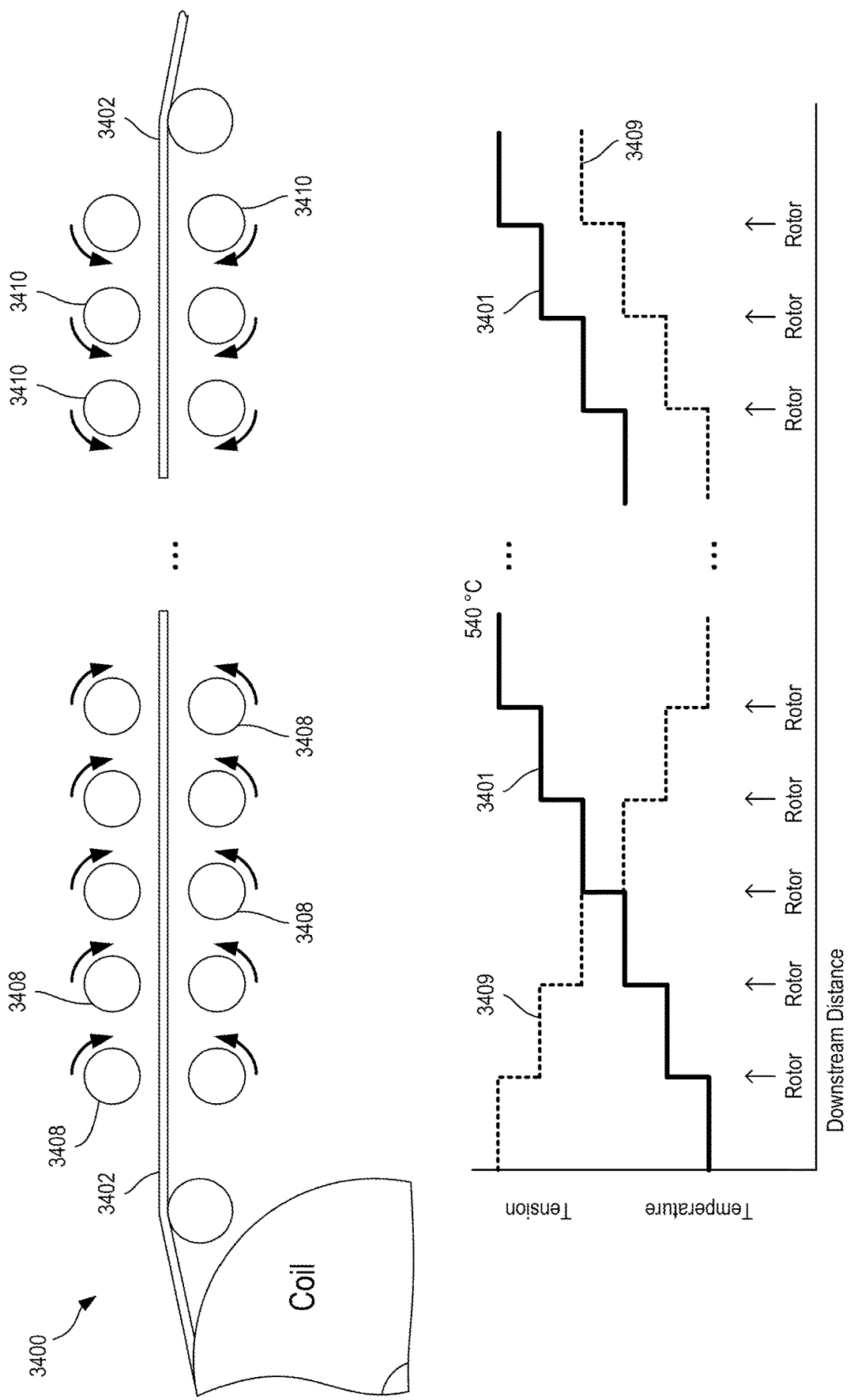
FIG. 34 is a combination schematic diagram and graph depicting a magnetic heating and tension control system according to certain aspects of the present disclosure.

FIG. 34 is a combination schematic diagram and graph depicting a magnetic heating and tension control system 3400 according to certain aspects of the present disclosure. The system 3400 can include multiple rotors 3408, 3410 capable of heating the metal strip 3402 as well as inducing tension changes in the metal strip 3402. The magnetic heating and tension control system 3400 can be used with any suitable metal processing equipment, such as a coil unwinder or a coil rewinder, as depicted in FIG. 34.

The left portion of FIG. 34 depicts rotors 3408 positioned immediately downstream of a coil unwinder. As the metal strip 3402 is unwound from the coil, the tension may initially be relatively high, as seen in the tension line 3409 of FIG. 34. By rotating each of the rotors 3408 in an upstream direction, the rotors 3408 can impart tension adjustments while simultaneously increasing the temperature of the metal strip 3402, as seen in the temperature line 3401 of FIG. 34. Each successive rotor 3408 operated in the upstream direction following the coil unwinder can decrease the tension of the metal strip while increasing the temperature of the metal strip. This technique can be especially beneficial because as the temperature of the metal strip 3402 increases, excessive tension and/or physical contact can be undesirable and can cause defects in the metal strip 3402. The use of a magnetic rotor 3408 to increase the temperature and decrease the tension in the metal strip 3402 can be accomplished without making physical contact between the metal strip 3402 and the rotor 3408.

The right portion of FIG. 34 depicts rotors 3410 positioned immediately upstream of a coil rewinder. As the metal strip 3402 is directed towards the coil rewinder, the tension may initially be relatively low and may need to increase before the metal strip 3402 is wound onto the coil. Additionally, it can be desirable to increase the temperature of the metal strip 3402 immediately prior to rewinding, especially if the metal strip 3402 has been previously quenched to a low temperature. Therefore, a magnetic rotor 3410 as described herein can be especially useful for both increasing temperature of the metal strip 3402 and increasing tension in the metal strip 3402 without needing to contact the metal strip 3402. By rotating the magnetic rotors 3410 in a downstream direction, the rotors 3410 can increase the tension in the metal strip 3402 while simultaneously increasing the temperature of the metal strip 3402.

Figure 35:
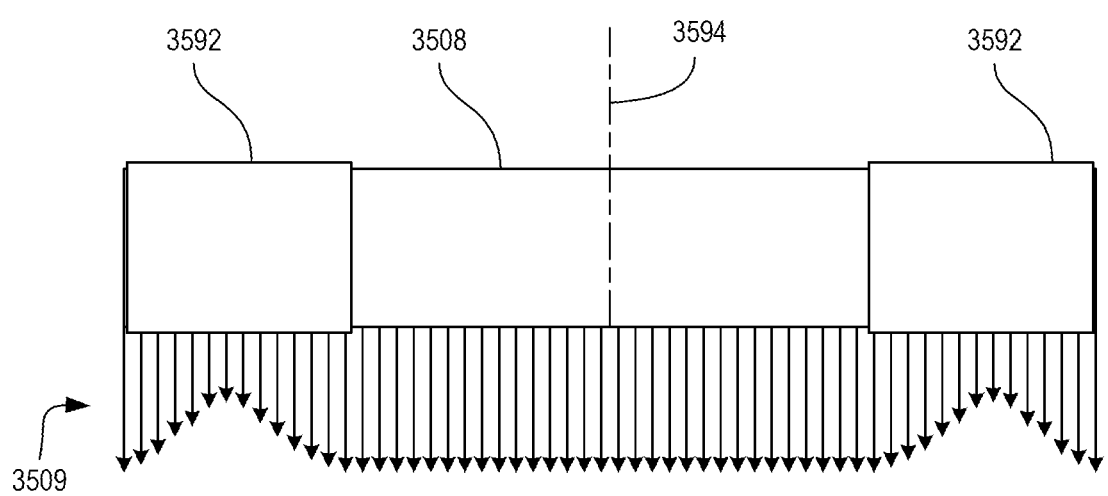
FIG. 35 is a front view of a rotor with a pair of rotor sleeves providing a magnetic flux profile according to certain aspects of the present disclosure.

FIG. 35 is a front view of a rotor 3508 with a pair of rotor sleeves 3592 providing a magnetic flux profile 3509 according to certain aspects of the present disclosure. As disclosed herein, various techniques can enable different amounts of magnetic flux to be passed through a metal strip traveling adjacent a magnetic rotor. One technique for controlling the amount of heat introduced across a width of the metal strip is to provide a rotor 3508 having a tailored magnetic flux profile 3509. The tailored magnetic flux profile 3509 can be designed to impart the desired amount of heating to the metal strip when the rotor 3508 is rotated adjacent a moving metal strip. Rotor 3508 can be any of the rotors described herein, such as rotor 108 of FIG. 1.

As depicted in FIG. 35, a tailored magnetic flux profile 3509 can be created by using rotor sleeves 3592 positioned on or around a magnetic rotor 3508 as various locations. The rotor sleeves 3592 can be designed to short-circuit and/or focus magnetic flux, thus generating a magnetic flux profile 3509 that would be similar to a magnetic rotor having a varying width, without having to actually vary the width of the rotor. The sleeve 3592 can be made of any suitable material for short-circuiting and/or focusing magnetic flux, such as ferromagnetic materials (e.g., steel).

The sleeve 3592 can extend for the full width of the rotor 3508 or less than a full width of the rotor 3508. As depicted, a two-sleeve arrangement is used to provide a magnetic flux profile 3509 with symmetry about a centerline 3594 of the rotor 3508. In other cases, one sleeve or more than two sleeves can be used. In some cases, such as depicted in FIG. 35, a sleeve 3592 can extend from at or near an end of the rotor 3508 towards the centerline 3594 for a distance that is at or approximately 60 mm to 140 mm, 70 mm to 130 mm, 80 mm to 120 mm, or 90 mm to 110 mm, or at or approximately 100 mm. In some cases, a sleeve 3592 can extend for a distance sufficient to cover between approximately 5% and approximately 25% of the full length of the rotor 3508, such as at or approximately 5%-25%, 8%-20%, 10%-18%, or 15%. In some cases, a pair of sleeves 3592 that each cover approximately 20% of the length of the rotor 3508 can together cover 40% of the length of the rotor 3508. In some cases, the sleeves 3592 can be arranged to cover portions of the rotor 3508 that extend beyond the width of a metal strip being heated. In some cases, a sleeve 3592 can cover anywhere between approximately 0% and 80% of the full length of the rotor 3508.

In some cases, sleeves 3592 can be automatically or manually adjustable to cover more or less of the rotor 3508. In such cases, it can be desirable to adjust the position of the sleeves 3592 based on the width of the metal strip being heated. Sleeves 3592 can be coupled to the rotor 3508, although that need not be the case. To avoid overheating of the sleeve 3592 due to inductive heating, especially if the sleeve 3592 is not completely rotationally coupled to the rotor 3508, the sleeve 3592 can include laminations or other features to reduce the amount of inductive heating induced by the changing magnetic fields. In some cases, the sleeve 3592 can be rotationally coupled to the rotor 3508, although that need not be the case. In some cases, a gap can exist between the sleeve 3592 and the magnetic sources within the rotor 3508. This gap can have a distance of at or approximately 5 mm-20 mm, 7 mm-15 mm, or 10 mm.

A sleeve 3592 can be of any suitable thickness, although in some cases the thickness of the sleeve can be at or approximately, 1 mm to 50 mm, 10 mm to 50 mm, 1 mm 30 mm, 15 mm to 40 mm, 20 mm to 30 mm, 10 mm to 20 mm, or at or approximately 10 mm or 20 mm.

The sleeve 3592 can act to reduce the amount of magnetic field that extends from the rotor 3508 where the magnetic sources of the rotor 3508 are covered by the sleeve 3592. The sleeve 3592 can short circuit magnetic flux. The sleeve 3592 can be positioned to create a desirable magnetic flux profile 3509, such as one providing increase magnetic flux near the edges (e.g., slightly inwards from the edges) of a metal strip being heated.

In some cases, the position and/or % overlap of a rotor sleeve 3592 with respect to the rotor 3508 can be controlled to adjust the magnetic flux profile that passes through the metal strip. In such cases, the magnetic flux profile 3509 of the rotor 3508 itself may not dynamically change, but the profile of the magnetic flux through the metal strip can be dynamically adjusted.

Figure 36:
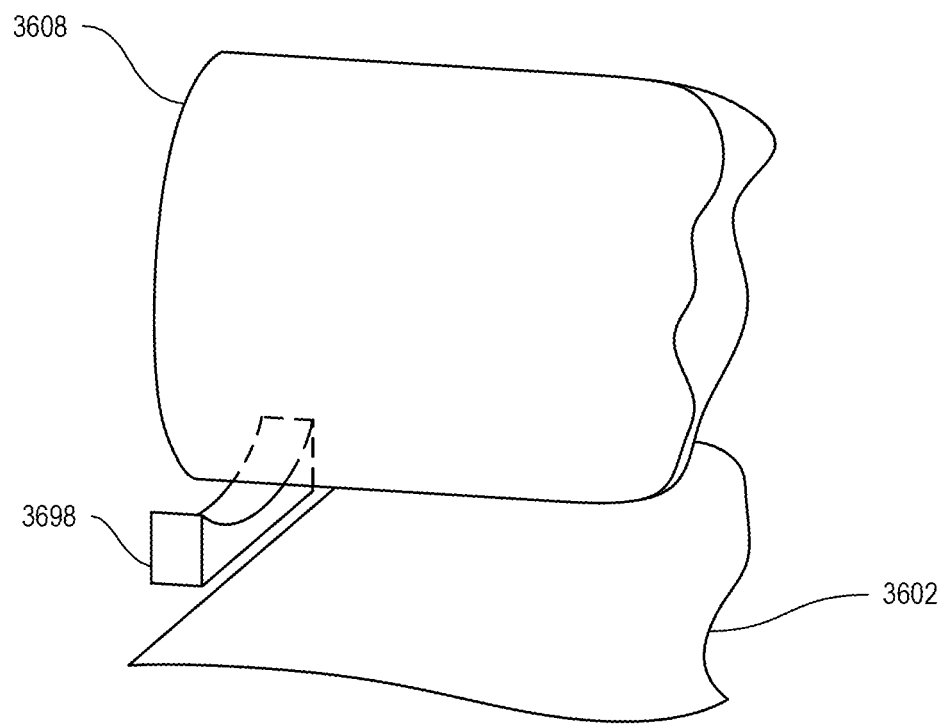
FIG. 36 is an axonometric partial schematic diagram depicting a magnetic rotor above a metal strip with a flux guide according to certain aspects of the present disclosure.

FIG. 36 is an axonometric partial schematic diagram depicting a magnetic rotor 3608 above a metal strip 3602 with a flux guide 3698 according to certain aspects of the present disclosure. The diagram of FIG. 36 depicts the flux guide 3698 and metal strip 3602 from the surface of the metal strip 3602 upwards. In some cases, the same configuration and type of flux guide 3698 can be located symmetric to a central plane of the metal strip (e.g., a plane bisecting the thickness of the metal strip). For illustrative purposes, the portion of the flux guide 3698 hidden by the rotor 3608 is shown in dotted line.

The flux guide 3698 can be positioned adjacent, but spaced apart from, an edge of the metal strip 3602. The flux guide 3698 can be shaped such that its top surface is contoured to the shape of the magnetic rotor 3608 such that the flux guide 3698 can be placed in close proximity to the rotor 3608. The rotor 3608 can extend past the edge of the metal strip 3602. The flux guide 3698 can act to deviate magnetic flux around the edge of the metal strip 3602, thus minimizing any overheating of the edge of the metal strip 3602.

The flux guide 3698 can be any suitable material, such as those described herein with respect to flux guides. The flux guide 3698 can be of any suitable dimensions. In some cases, the flux guide 3698 can be approximately 100 mm in length and approximately 30 mm in width, although that need not be the case. The flux guide 3698 can be positioned approximately 15 mm from the rotor 3608 and approximately 10 mm from the edge of the metal strip 3602, although that need not be the case.

Figure 37:
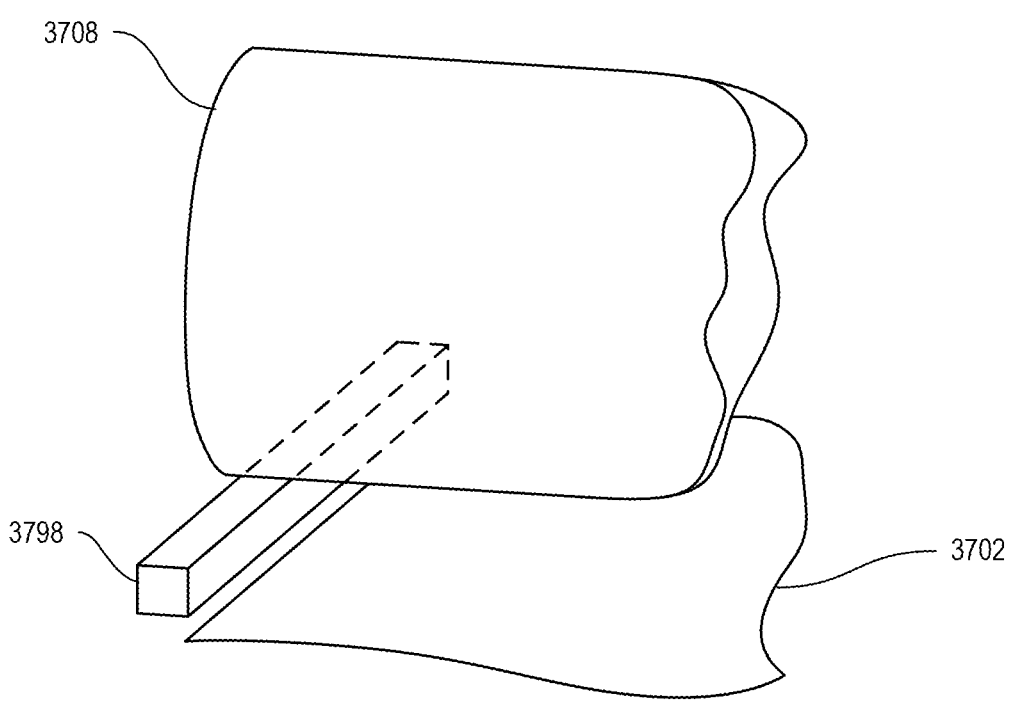
FIG. 37 is an axonometric partial schematic diagram depicting a magnetic rotor above a metal strip with a bar-shaped flux guide according to certain aspects of the present disclosure.

FIG. 37 is an axonometric partial schematic diagram depicting a magnetic rotor 3708 above a metal strip 3702 with a bar-shaped flux guide 3798 according to certain aspects of the present disclosure. The diagram of FIG. 37 depicts the bar-shaped flux guide 3798 and metal strip 3702 from the surface of the metal strip 3702 upwards. In some cases, the same configuration and type of flux guide 3798 can be located symmetric to a central plane of the metal strip (e.g., a plane bisecting the thickness of the metal strip). For illustrative purposes, the portion of the flux guide 3798 hidden by the rotor 3708 is shown in dotted line.

The flux guide 3798 can be positioned adjacent, but spaced apart from, an edge of the metal strip 3702. The flux guide 3798 can be bar shaped and can extend in length for a length that is greater than the diameter of the rotor 3708. The rotor 3708 can extend past the edge of the metal strip 3702. The flux guide 3798 can act to deviate magnetic flux around the edge of the metal strip 3702 as well as disturb and/or absorb secondary flux generated by the metal strip 3702, thus minimizing any overheating of the edge of the metal strip 3702.

The flux guide 3798 can be any suitable material, such as those described herein with respect to flux guides. The flux guide 3798 can be of any suitable dimensions. In some cases, the flux guide 3798 can be approximately 300 mm in length and approximately 30 mm in width, although that need not be the case. The flux guide 3798 can be positioned approximately 25 mm from the rotor 3708 and approximately 10 mm from the edge of the metal strip 3702, although that need not be the case.

In some cases, a desirable flux guide 3798 can have a small width (e.g., approximately 10 mm), a moderate thickness (e.g., approximately 60 mm), and a relatively long width (e.g., approximately 400 mm or longer). The small width can minimize magnetic forces on the rotor 3808.

Figure 38:
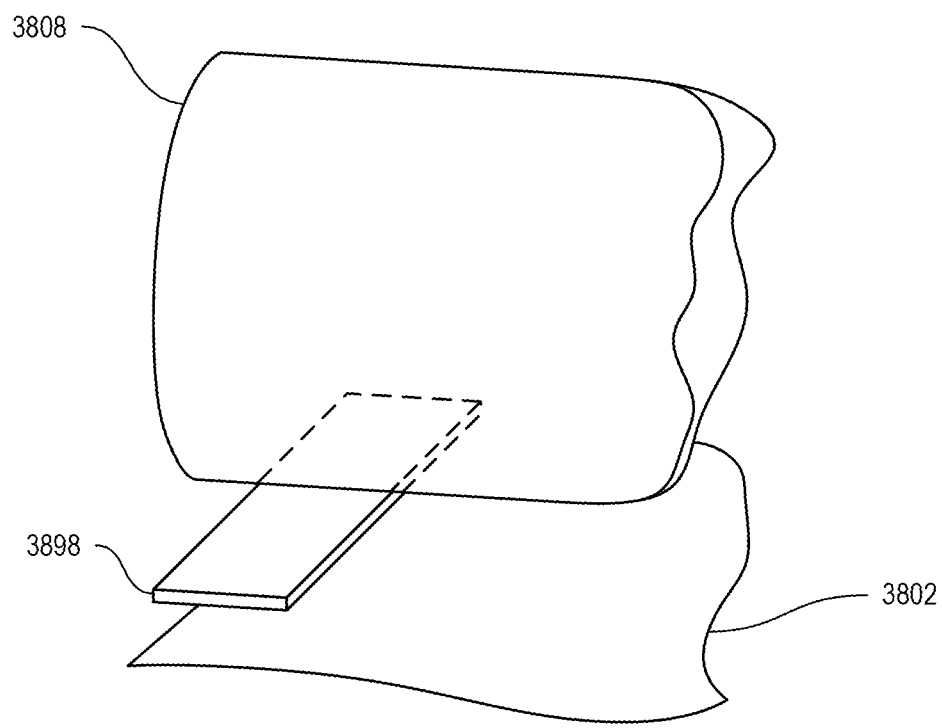
FIG. 38 is an axonometric partial schematic diagram depicting a magnetic rotor above a metal strip with an edge shielding flux guide according to certain aspects of the present disclosure.

FIG. 38 is an axonometric partial schematic diagram depicting a magnetic rotor 3808 above a metal strip 3802 with an edge shielding flux guide 3898 according to certain aspects of the present disclosure. The diagram of FIG. 38 depicts the edge shielding flux guide 3898 and metal strip 3802 from the surface of the metal strip 3802 upwards. In some cases, the same configuration and type of flux guide 3898 can be located symmetric to a central plane of the metal strip (e.g., a plane bisecting the thickness of the metal strip). For illustrative purposes, the portion of the flux guide 3898 hidden by the rotor 3808 is shown in dotted line.

The flux guide 3898 can be positioned adjacent and spaced apart from the metal strip 3802. The flux guide 3898 can be positioned between the rotor 3808 and the metal strip 3802. In some cases, the flux guide 3898 can extend beyond an edge of the metal strip 3802. The flux guide 3898 can be positioned at any suitable lateral distance and can extend for the full width of the metal strip 3802 or less than the full width of the metal strip 3802. The flux guide 3898 can be generally flat and strip-shaped and can extend in length (e.g., in the downstream direction) for a length that is greater than the diameter of the rotor 3808, although that need not be the case. The rotor 3808 can extend past the edge of the metal strip 3802. The flux guide 3898 can act to generate its own secondary magnetic flux, thus minimizing any overheating of the edge of the metal strip 3802.

The flux guide 3898 can be any suitable material, such as those described herein with respect to flux guides, such as copper, aluminum, or any electrically conducting materials. The flux guide 3898 can be of any suitable dimensions. In some cases, the flux guide 3898 can be approximately 100 mm in length and approximately 30 mm in width, although that need not be the case. The flux guide 3898 overlapping the metal strip 3802 from the edge of the metal strip 3802 can control the intensity with which the flux guide 3898 reduces the amount of heating occurring at the edge of the metal strip 3802. In some cases, the overlap can be at or approximately 10 mm to 70 mm, 20 mm to 60 mm, 30 mm to 50 mm, or 40 mm. Additionally, the thickness of the flux guide 3898 can affect the intensity with which the flux guide 3898 reduces the amount of heating occurring at the edge of the metal strip 3802. In some cases, the thickness of the flux guide 3898 can be at or approximately 1 mm-10 mm, 3 mm-7 mm, or 5 mm. In some cases, the thickness of the flux guide 3898 can be adjusted dynamically by sliding individual metal sheets into and out of the flux guide 3898. Additionally, the gap between the flux guide 3898 and the rotor 3808, and the gap between the flux guide 3898 and the strip 3802, can affect the intensity with which the flux guide 3898 reduces the amount of heating occurring at the edge of the metal strip 3802. In some cases, the gap between the flux guide 3898 and the strip 3802 can be at or approximately 5 mm-50 mm, 10 mm-40 mm, or 20 mm. Additionally, the length of the flux guide 3898 (e.g., in a downstream direction, perpendicular the axis of rotation of the rotor 3808) can affect the intensity with which the flux guide 3898 reduces the amount of heating occurring at the edge of the metal strip 3802. In some cases, the length of the flux guide 3898 can be at or approximately 100 mm-600 mm, 200 mm-500 mm, or 300 mm. Additionally, the width of the flux guide 3898 (e.g., in a direction parallel the axis of rotation of the rotor 3808) can affect the intensity with which the flux guide 3898 reduces the amount of heating occurring at the edge of the metal strip 3802. In some cases, the width of the flux guide 3898 can be at or approximately 40 mm-160 mm, 50 mm-150 mm, or 100 mm.

In some cases, a flux guide 3898 can be positioned to only overlap a certain portion of the metal strip 3802, without overlapping an edge of the metal strip 3802. For example, a flux guide 3898 can be positioned to only overlap a lateral region where a cold spot tends to form.

Figure 39:
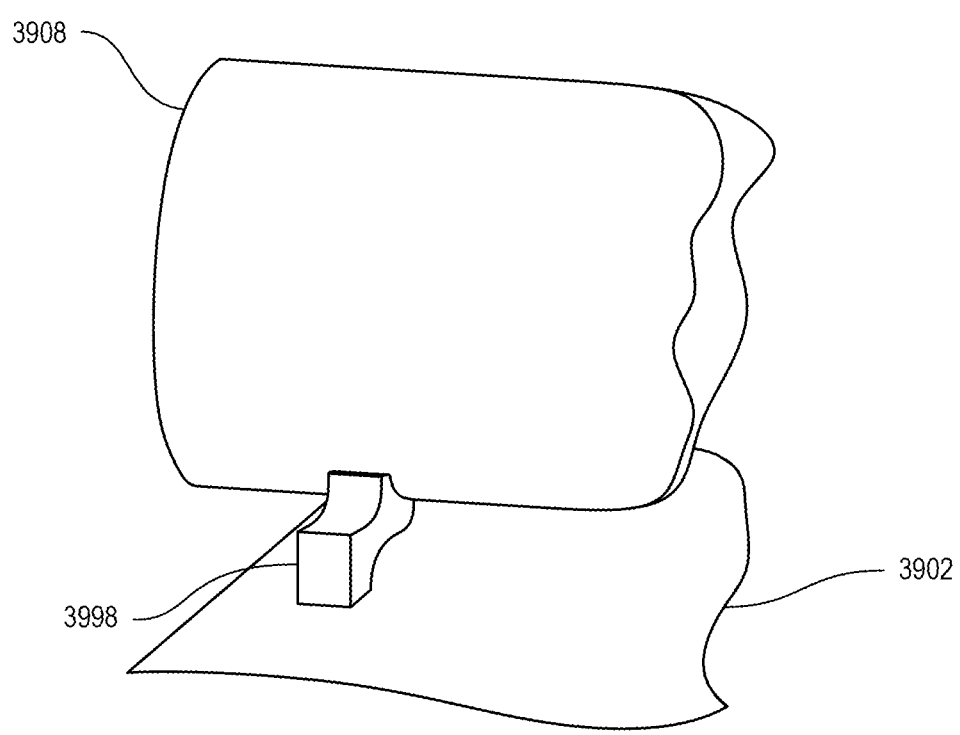
FIG. 39 is an axonometric partial schematic diagram depicting a magnetic rotor above a metal strip with a flux director according to certain aspects of the present disclosure.

FIG. 39 is an axonometric partial schematic diagram depicting a magnetic rotor 3908 above a metal strip 3902 with a flux director 3998 according to certain aspects of the present disclosure. The diagram of FIG. 39 depicts the flux director 3998 and the metal strip 3902 from the surface of the metal strip 3902 upwards. In some cases, the same configuration and type of flux director 3998 can be located symmetric to a central plane of the metal strip (e.g., a plane bisecting the thickness of the metal strip). An identical flux director 3998 can be located behind the rotor 3908 (e.g., opposite a plane that is perpendicular to the surface of the metal strip 3902 and that intersects the axis of rotation of the rotor 3908). The flux director 3998 can be similar to the flux director 766 of FIG. 7.

In some cases, a flux director 3998 can extend for a full width of the metal strip 3902, as well as less than or more than a full width of the metal strip 3902. In some cases, however, the flux director 3998 can have a width that is smaller than the width of the metal strip 3902 and can be positioned to direct flux into the metal strip 3902 at lateral regions where a cold spot may otherwise occur. The flux director 3998 can be any suitable material, such as those described herein with respect to flux directors and flux guides. The flux director 3998 can be of any suitable dimensions.

Figure 40:
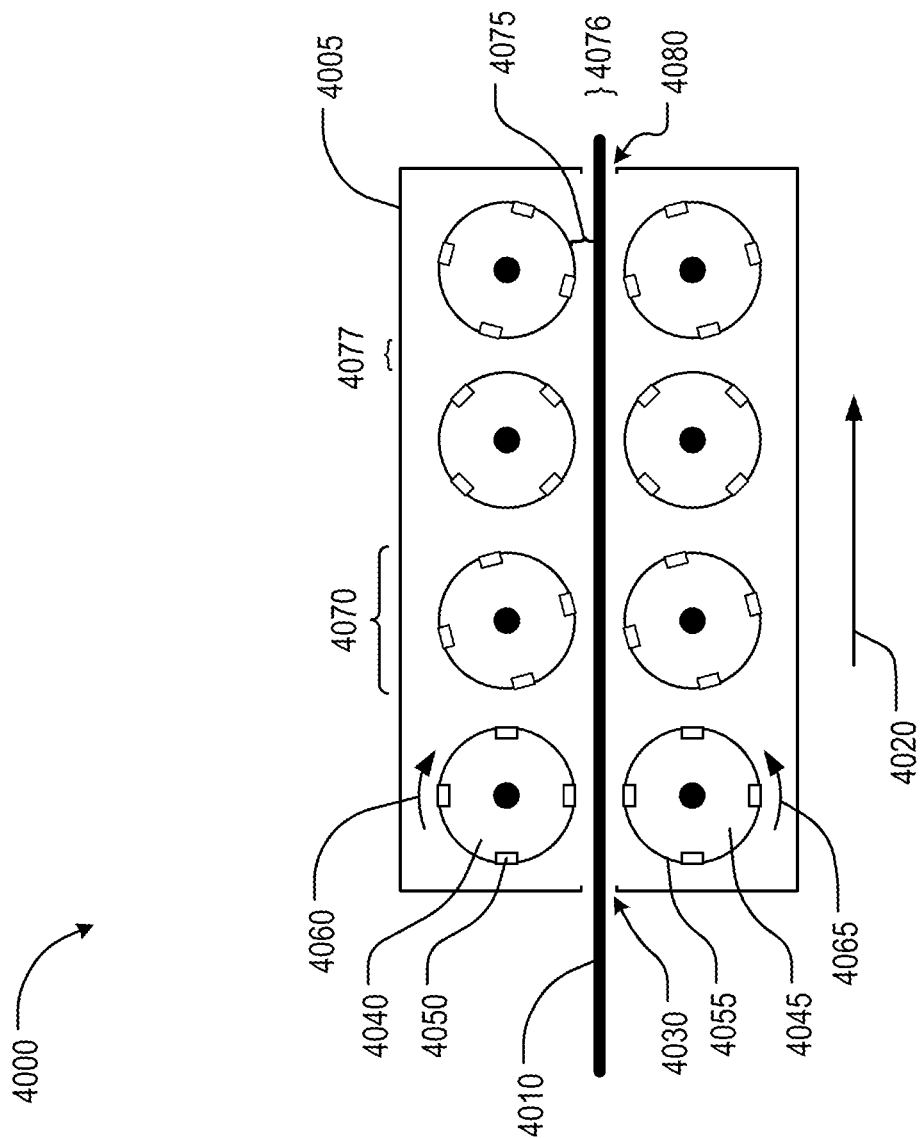
FIG. 40 is a schematic illustration of a curing chamber according to certain aspects of the present disclosure.

FIG. 40 is a schematic illustration of a curing chamber 4000 according to certain aspects of the present disclosure. In some cases, the curing chamber 4000 includes a housing 4005, which may be constructed from a non-magnetic material. A coated metal strip 4010 moving in a rolling direction 4020 can enter the curing chamber through an entrance port 4030. The coated metal strip 4010 can be any suitable metal of any thickness having a coating applied to one or both of its top and bottom surfaces (e.g., a coated aluminum sheet, a coated steel plate, a coated copper foil, a coated stainless steel shate, or a coated tin slab, to name a few.) In one example, the coated metal strip 4010 is aluminum can end stock or aluminum can body stock, although it need not be. In some examples, the coated metal strip 4010 can be substantially horizontal or in any other suitable process orientation. The coated metal strip 4010 can pass adjacent one or more upper magnetic rotors 4040 (e.g., disposed above the coated metal strip 4010) and adjacent one or more lower magnetic rotors 4045 (e.g., disposed below the coated metal strip 4010). In some configurations, only the upper magnetic rotors 4040 are present; in other configurations, only the lower magnetic rotors 4045 are present. The curing chamber 4000 may include any suitable number of upper magnetic rotors 4040 and/or lower magnetic rotors 4045. Each magnetic rotor (e.g., lower magnetic rotor 4045 or upper magnetic rotor 4040) can be a magnetic rotor as disclosed herein, such as the magnetic rotors 108, 110 of FIG. 1.

Each upper magnetic rotor 4040 and/or lower magnetic rotor 4045 includes one or more magnets 4050. The one or more magnets 4050 can be arranged on/within each rotor in any suitable manner. FIG. 40 illustrates one non-limiting example where four magnets 4050 are disposed about a surface 4055 of the magnetic rotors 4040, 4045. In some non-limiting examples, the magnets 4050 are at least partially embedded within the magnetic rotors 4040, 4045. In other examples, the magnets 4050 are coupled with or attached to the surface 4055. Each magnetic rotor 4040, 4045 can include any number of magnets 4050 having any suitable cross-sectional shape. For example, magnets 4050 can be rectangular, triangular, square, any other geometrical shape, or any combination thereof. Magnets 4050 may be permanent magnets and/or electromagnets. Although magnetic rotors 4040, 4045 are illustrated as cylindrical drums, they can have any suitable cross-sectional shape and dimensions.

In some cases, the curing chamber 4000 is configured so that a majority of the magnetic flux generated from magnetic rotors 4040, 4045 is directed at the surface of the metal strip to concentrate heat generation near the surface(s) of the metal strip. In some cases, the magnetic flux is directed such that the center of the metal strip is heated less than the outer surface(s) of the metal strip. In some cases, any of the flux concentrators or diverters described above may be used. By concentrating heat generation near the surface of the metal strip, the heat can be used to cure a coating with minimal effect to the metallurgical properties of the metal strip.

If the curing chamber 4000 includes both upper magnetic rotors 4040 and lower magnetic rotors 4045, the upper magnetic rotors 4040 can be vertically aligned with the lower magnetic rotors 4045, as shown in FIG. 40, or vertically offset from the lower magnetic rotors 4045, to form a curing stack 4070. In some examples, at least some of the upper magnetic rotors 4040 are configured to rotate in a first direction 4060, while at least some of the lower magnetic rotors 4045 are configured to rotate in a second direction 4065 that is opposite the first direction 4060. As shown in FIG. 40, the exemplary curing chamber 4000 can include a plurality of curing stacks 4070. In some cases, each curing stack 4070 or a subset of curing stacks 4070 can be controlled individually to provide discrete heating zones within the curing chamber 4000. In configurations where only upper magnetic rotors 4040 are used, or where only lower magnetic rotors 4045 are used, each upper magnetic rotor (or lower magnetic rotor) or a subset of upper magnetic rotors (or lower magnetic rotors) can be operated individually to provide discrete heating zones within the curing chamber 4000.

In some non-limiting examples, controlling a rotor 4040, 4045 or a curing stack 4070 to provide a discrete heating zone can be performed by adjusting one or more of the following parameters:
  (i) distance 4075 between each magnetic rotor 4040, 4045 and the coated metal strip 4010 (if both upper and lower magnetic rotors 4040, 4045 are used, the distances 4075 together plus the thickness of the metal strip 4010 form a gap 4076 between each magnetic rotor 4040, 4045). Positioning the magnetic rotors 4040, 4045 closer to the coated metal strip 4010 can increase a temperature conveyed to the coated metal strip 4010 and a coating applied to the coated metal strip 4010. Positioning the magnetic rotors 4040, 4045 farther away from the coated metal strip 4010 can decrease a temperature conveyed to the coated metal strip 4010 and a coating applied to the coated metal strip 4010. In some examples, positioning the magnetic rotors 4040, 4045 closer to the coated metal strip 4010 can increase a heating rate of the coated metal strip 4010 and a coating applied to the coated metal strip 4010. In some further examples, positioning the magnetic rotors 4040, 4045 farther from the coated metal strip 4010 can decrease a heating rate of the coated metal strip 4010 and a coating applied to the coated metal strip 4010;
  (ii) rotational speed of the magnetic rotors 4040, 4045. Increasing the rotational speed of the magnetic rotors 4040, 4045 can increase temperatures conveyed to the coated metal strip 4010 and a coating applied to the metal strip 4010. Decreasing the rotational speed of the magnetic rotors 4040, 4045 can lower temperatures conveyed to the coated metal strip 4010 and a coating applied to the metal strip 4010;
  (iii) strength and/or direction of the magnetic flux generated from the magnetic rotors 4040, 4045. Increasing the strength of the magnetic flux generated from the magnetic rotors 4040, 4045 can increase temperatures conveyed to the coated metal strip 4010 and a coating applied to the metal strip 4010. Similarly, directing the magnetic flux generated from the magnetic rotors 4040, 4045 toward the outer surface of the metal strip can increase temperatures conveyed to the coating applied to the metal strip 4010; and
  (iv) distance 4077 between a first magnetic rotor 4040, 4045 and an optional additional magnetic rotor 4040, 4045 disposed adjacent to the first magnetic rotor 4040, 4045 on a same side of the coated metal strip 4010, or the distance 4077 between a first curing stack 4070 and an optional second curing stack 4070. In some examples, positioning the first magnetic rotor 4040, 4045 closer to the optional second magnetic rotor 4040, 4045 can increase a heating rate of the coated metal strip 4010 and a coating applied to the coated metal strip 4010. In some further examples, positioning the first magnetic rotor 4040, 4045 farther from the optional second magnetic rotor 4040, 4045 can decrease a heating rate of the coated metal strip 4010 and a coating applied to the coated metal strip 4010. In some cases, positioning the first curing stack 4070 closer to the optional second curing stack 4070 can increase a heating rate of the coated metal strip 4010 and a coating applied to the coated metal strip 4010. In some further examples, positioning the first curing stack 4070 farther from the optional second curing stack 4070 can decrease a heating rate of the coated metal strip 4010 and a coating applied to the coated metal strip 4010.

In some non-limiting examples, in conjunction with the parameters to provide a discrete heating zone described above, controlling a speed at which the coated metal strip passes each heating zone (e.g., strip speed through the curing chamber) can be used to control the heating of the coated metal strip and any applied coating. More specifically, in some aspects, strip speed can be adjusted to control a temperature conveyed to the metal strips and coatings applied to the metal strips from the magnetic rotors 4040,

4045. Increasing strip speed can decrease the temperature conveyed to the coated metal strip 4010 and the coating applied to the metal strip 4010, and decreasing strip speed can increase the temperature conveyed to the coated metal strip 4010 and the coating applied to the metal strip 4010 (i.e., a slower strip speed increases dwell time of the metal strips and coatings applied to the metal strips within the curing chamber). Additionally, in some examples, controlling the strip speed of the metal strips and the coatings applied to the metal strips can control a dwell time of the metal strips and coatings applied to the metal strips as the metal strips pass adjacent to the magnetic rotors 4040, 4045 or curing stacks 4070. In some non-limiting examples, metal strips can be heated to a target temperature of at least 250° C. in less than about 5 seconds at a rate of over about 50° C./second when a speed of the magnetic rotors is at least 1,300 RPM.

The coated metal strip 4010 can pass through the curing chamber 4000 at any suitable strip speed. As a non-limiting example, the strip speed can be from about 20 meters per minute (m/minute) to about 400 m/minute (e.g., about 20 m/minute, about 30 m/minute, about 40 m/minute, about 50 m/minute, about 60 m/minute, about 70 m/minute, about 80 m/minute, about 90 m/minute, about 100 m/minute, about 110 m/minute, about 120 m/minute, about 130 m/minute, about 140 m/minute, about 150 m/minute, about 160 m/minute, about 170 m/minute, about 180 m/minute, about 190 m/minute, about 200 m/minute, about 210 m/minute, about 220 m/minute, about 230 m/minute, about 240 m/minute, about 250 m/minute, about 260 m/minute, about 270 m/minute, about 280 m/minute, about 290 m/minute, about 300 m/minute, about 310 m/minute, about 320 m/minute, about 330 m/minute, about 340 m/minute, about 350 m/minute, about 360 m/minute, about 370 m/minute, about 380 m/minute, about 390 m/minute, about 400 m/minute, or anywhere in between) or other suitable speed to cure a coating present on the metal strip.

One or more of the above parameters may be adjusted to heat at least a surface of the metal strip 4010 to a temperature sufficient to cure a coating on the metal strip 4010. In some cases, the parameters above are predetermined to heat a surface of the metal strip 4010 to a temperature sufficient to cure a coating on the metal strip 4010 within a desired distance (such as the length of the curing chamber 4000) and/or within a desired time.

The upper magnetic rotors 4040 and/or the lower magnetic rotors 4045 can be vertically adjustable to control the distance 4075 between each magnetic rotor (or subset of magnetic rotors) 4040, 4045 and the coated metal strip 4010. As mentioned above, positioning the magnetic rotors 4040, 4045 closer to the coated metal strip 4010 can increase a strength of magnetic fields within the coated metal strip 4010 and in turn increase a magnitude of the eddy currents within the coated metal strip, and thus generate more heat with the coated metal strip. Likewise, in some cases, positioning the magnetic rotors 4040, 4045 farther away from the coated metal strip 4010 can decrease the strength of the magnetic fields within the coated metal strip 4010 and in turn decrease the magnitude of the eddy currents within the coated metal strip, and thus generate less heat within the coated metal strip. In some cases, the distance 4075 from the magnetic rotor 4040, 4045 to the coated metal strip 4010 can be from about 15 mm to about 300 mm (e.g., about 15 mm, about 16 mm, about 17 mm, about 18 mm, about 19 mm, about 20 mm, about 25 mm, about 30 mm, about 35 mm, about 40 mm, about 45 mm, about 50 mm, about 55 mm, about 60 mm, about 65 mm, about 70 mm, about 75 mm, about 80 mm, about 85 mm, about 90 mm, about 95 mm, about 100 mm, about 105 mm, about 110 mm, about 115 mm, about 120 mm, about 125 mm, about 130 mm, about 135 mm, about 140 mm, about 145 mm, about 150 mm, about 155 mm, about 160 mm, about 165 mm, about 170 mm, about 175 mm, about 180 mm, about 185 mm, about 190 mm, about 195 mm, about 200 mm, about 205 mm, about 210 mm, about 215 mm, about 220 mm, about 225 mm, about 230 mm, about 235 mm, about 240 mm, about 245 mm, about 250 mm, about 255 mm, about 260 mm, about 265 mm, about 270 mm, about 275 mm, about 280 mm, about 285 mm, about 290 mm, about 295 mm, about 300 mm, or anywhere in between). In some cases, the distance 4075 is smaller than 15 mm; in other cases, it is greater than 300 mm. In this way, the curing chamber 4000 can be configured as a floatation chamber where the coated metal strip 4010 passes through the curing chamber 4000 without contacting the magnetic rotors 4040, 4045. After curing, the coated metal strip 4010 exits the exemplary curing chamber 4000 through an exit port 4080.

In some cases, using rotating magnets to heat metal strips (e.g., aluminum sheet, aluminum can body stock, or aluminum can end stock (CES)), and coatings applied to surfaces of the metal strips, can provide simple and fast temperature control of the metal strip, the coating applied to the metal strip and an environment within the curing chamber.

For example, at least one or more surfaces of the metal strips and coatings applied to the one or more surfaces of the metal strips can be heated to any suitable temperature. In a non-limiting example, at least one or more surfaces of the metal strips and coatings applied to the one or more surfaces of the metal strips can be heated to from about 100° C. to about 600° C. (e.g., to about 100° C., about 125° C., about 150° C., about 175° C., about 200° C., about 225° C., about 250° C., about 275° C., about 300° C., about 325° C., about 350° C., about 355° C., about 375° C., about 400° C., about 425° C., about 450° C., about 475° C., about 500° C., about 525° C., about 550° C., about 575° C., about 600° C., or anywhere in between), or other temperature sufficient to cure the coating of the metal strip 4010 (for example, less than 100° C. or greater than 600° C.). The curing chamber 4000 can be configured so that the metal strips and coatings applied to the metal strips can be heated to the target temperature in about 1 second to about 10 seconds (e.g., in about 1 second, about 2 seconds, about 3 seconds, about 4 seconds, about 5 seconds, about 6 seconds, about 7 seconds, about 8 seconds, about 9 seconds, about 10 seconds, or anywhere in between), or any other desired time. In some cases, the metal strips and coatings applied to the metal strips can be heated to the target temperature at a rate of about 1° C./second to about 150° C./second or higher (e.g., about 1° C./second or higher, about 2° C./second or higher, about 3° C./second or higher, about 4° C./second or higher, about 5° C./second or higher, about 10° C./second or higher, about 15° C./second or higher, about 20° C./second or higher, about 25° C./second or higher, about 30° C./second or higher, about 35° C./second or higher, about 40° C./second or higher, about 45° C./second or higher, about 50° C./second or higher, about 55° C./second or higher, about 60° C./second or higher, about 65° C./second or higher, about 70° C./second or higher, about 75° C./second or higher, about 80° C./second or higher, about 85° C./second or higher, about 90° C./second or higher, about 95° C./second or higher, about 100° C./second or higher, about 105° C./second or higher, about 110° C./second or higher, about 115° C./second or higher, about 120° C./second or higher, about 125° C./second or higher, about 130° C./second or higher, about 135° C./second or higher, about 140° C./second or higher, about 145° C./second or higher, about 150° C./second or higher, or anywhere in between). In some cases, the metal strips and coatings applied to the metal strips can be heated to the target temperature at a rate of greater than 150° C./second.

In some aspects, the temperatures, times and rates described above can be controlled by controlling the rotational speed of the magnetic rotors 4040, 4045. For example, increasing the rotational speed of the magnetic rotor 4040, 4045 can increase an oscillation of magnetic fields within the metal strips and coatings applied to the metal strips, thereby increasing eddy current magnitude within the metal strips and coatings applied to the metal strips, thereby generating more heat within the metal strips and coatings applied to the metal strips. Likewise, decreasing the rotational speed of the magnetic rotor 4040, 4045 can decrease the oscillation of magnetic fields within the metal strips and coatings applied to the metal strips, thereby decreasing the eddy current magnitude within the metal strips and coatings applied to the metal strips, thereby generating less heat within the metal strips and coatings applied to the metal strips. The magnetic rotor can rotate at any suitable speed. In some cases, each magnetic rotor can rotate at a speed of from about 200 RPM to about 3,500 RPM (e.g., about 200 RPM, about 250 RPM, about 300 RPM, about 350 RPM, about 400 RPM, about 450 RPM, about 500 RPM, about 550 RPM, about 600 RPM, about 650 RPM, about 700 RPM, about 750 RPM, about 800 RPM, about 850 RPM, about 900 RPM, about 950 RPM, about 1,000 RPM, about 1,100 RPM, about 1,200 RPM, about 1,300 RPM, about 1,400 RPM, about 1,500 RPM, about 1,600 RPM, about 1,700 RPM, about 1,800 RPM, about 1,900 RPM, about 2,000 RPM, about 2,100 RPM, about 2,200 RPM, about 2,300 RPM, about 2,400 RPM, about 2,500 RPM, about 2,600 RPM, about 2,700 RPM, about 2,800 RPM, about 2,900 RPM, about 3,000 RPM, about 3,100 RPM, about 3,200 RPM, about 3,300 RPM, about 3,400 RPM, about 3,500 RPM, or anywhere in between). In some cases, the magnetic rotors rotate at a speed less than 200 RPM, or a speed greater than 3,500 RPM.

Each of the upper magnetic rotors 4040 and/or each of the lower magnetic rotors 4045 can rotate at the same speed or at different speeds relative to other magnetic rotors in the system.

Figure 41:
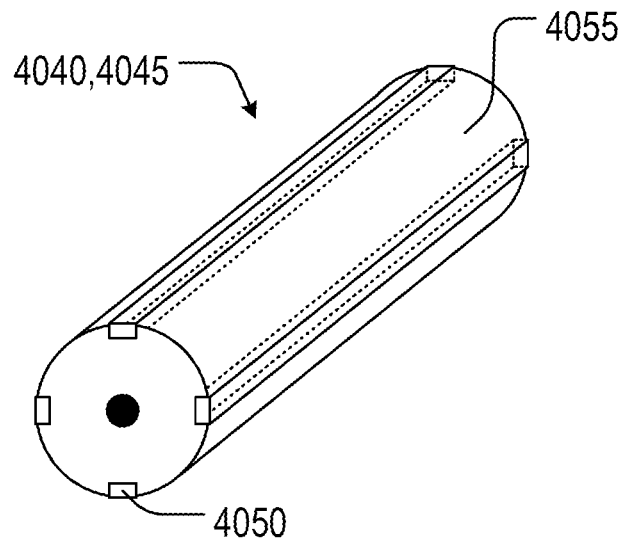
FIG. 41 is a perspective view depicting an example of a magnetic rotor according to certain aspects of the present disclosure.

FIG. 41 is a perspective view depicting an example of a magnetic rotor 4040, 4045 according to certain aspects of the present disclosure. In some configurations, one or more magnets 4050 are embedded at least partially within the magnetic rotor 4040, 4045.

Figure 42:
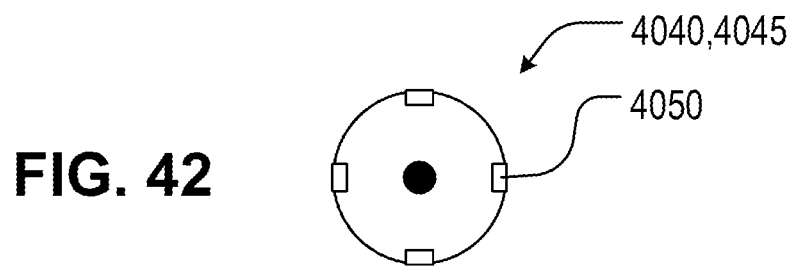
FIG. 42 is a cross-sectional view depicting an example of a magnetic rotor according to certain aspects of the present disclosure.

FIG. 42 is a cross-sectional view depicting an example of a magnetic rotor 4040, 4045 according to certain aspects of the present disclosure. The magnetic rotor 4040, 4045 can include one or more magnets 4050 embedded at least partially within the magnetic rotor 4040, 4045.

Figure 43:
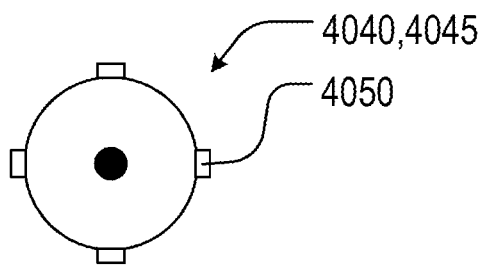
FIG. 43 is a cross-sectional view depicting an example of a magnetic rotor according to certain aspects of the present disclosure.

FIG. 43 is a cross-sectional view depicting an example of a magnetic rotor 4040, 4045 according to certain aspects of the present disclosure. In some cases, one or more magnets 4050 can be attached to or otherwise coupled with the magnetic rotor 4040, 4045 such that they project from the surface 4055 of the magnetic rotor 4040, 4045.

Figure 44:
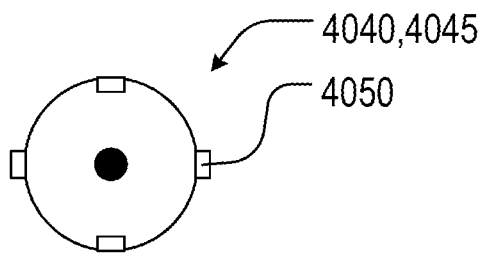
FIG. 44 is a cross-sectional view depicting an example of a magnetic rotor according to certain aspects of the present disclosure.

FIG. 44 is a cross-sectional view depicting an example of a magnetic rotor 4040, 4045 according to certain aspects of the present disclosure. In some cases, a subset of magnets 4050 can be embedded within the magnetic rotor 4040, 4045 while another subset of magnets can project from the surface 4055 of the magnetic rotor 4040, 4045. Any other suitable arrangement or configuration of magnets relative to the rotors can be used other than those depicted in FIGS. 42-44.

Figure 45:
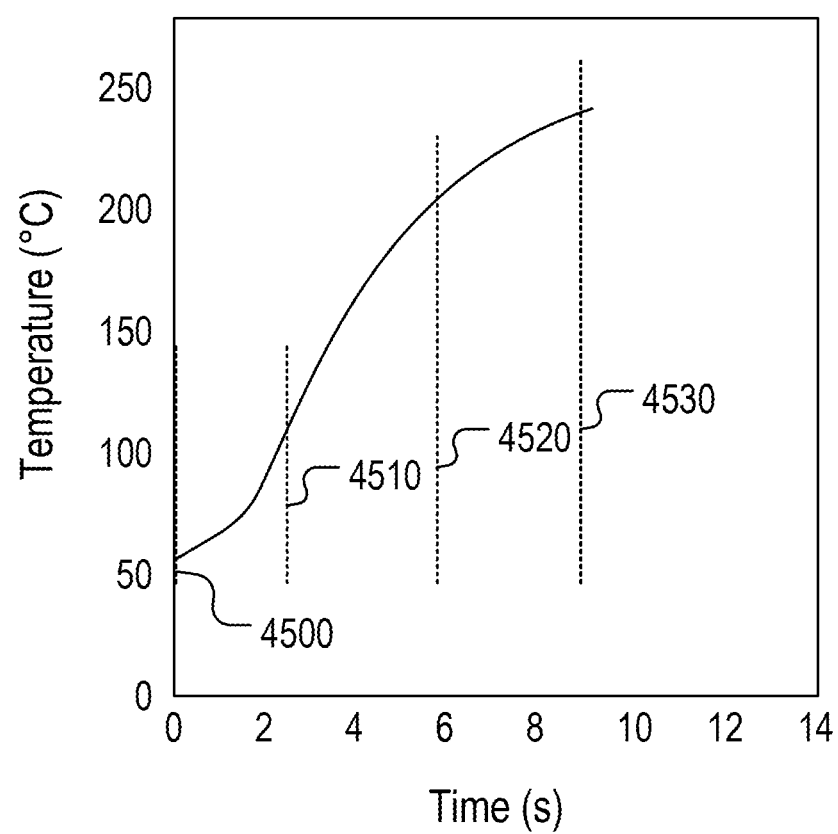
FIG. 45 is a graph of a curing chamber temperature profile of a gas burning curing chamber.

FIG. 45 is a graph of an example curing chamber temperature profile of a comparative gas burning curing chamber. The y-axis indicates temperature (° C.) and the x-axis indicates dwell time (seconds) in the comparative curing chamber. Temperature of a metal strip and its coating can increase with time spent in the comparative curing chamber. In some cases, the exemplary system for curing a coating described herein can emulate the comparative gas burning curing chamber temperature profile. Dashed lines indicate how positioning of the magnetic rotors/curing stacks 4070 in the exemplary curing chamber 4000 can provide a temperature profile similar to the comparative gas burning curing chamber. The coated metal strip 4010 can enter the exemplary curing chamber 4000 and be exposed to a first temperature 4500 and begin heating. The coated metal strip 4010 can subsequently be heated to a second temperature 4510 after passing a first magnetic rotor/curing stack. The coated metal strip 4010 can be further heated to a third temperature 4520 after passing a second magnetic rotor/curing stack. The coated metal strip 4010 can be still further heated to a fourth temperature 4530 after passing a third magnetic rotor/curing stack.

Figure 46:
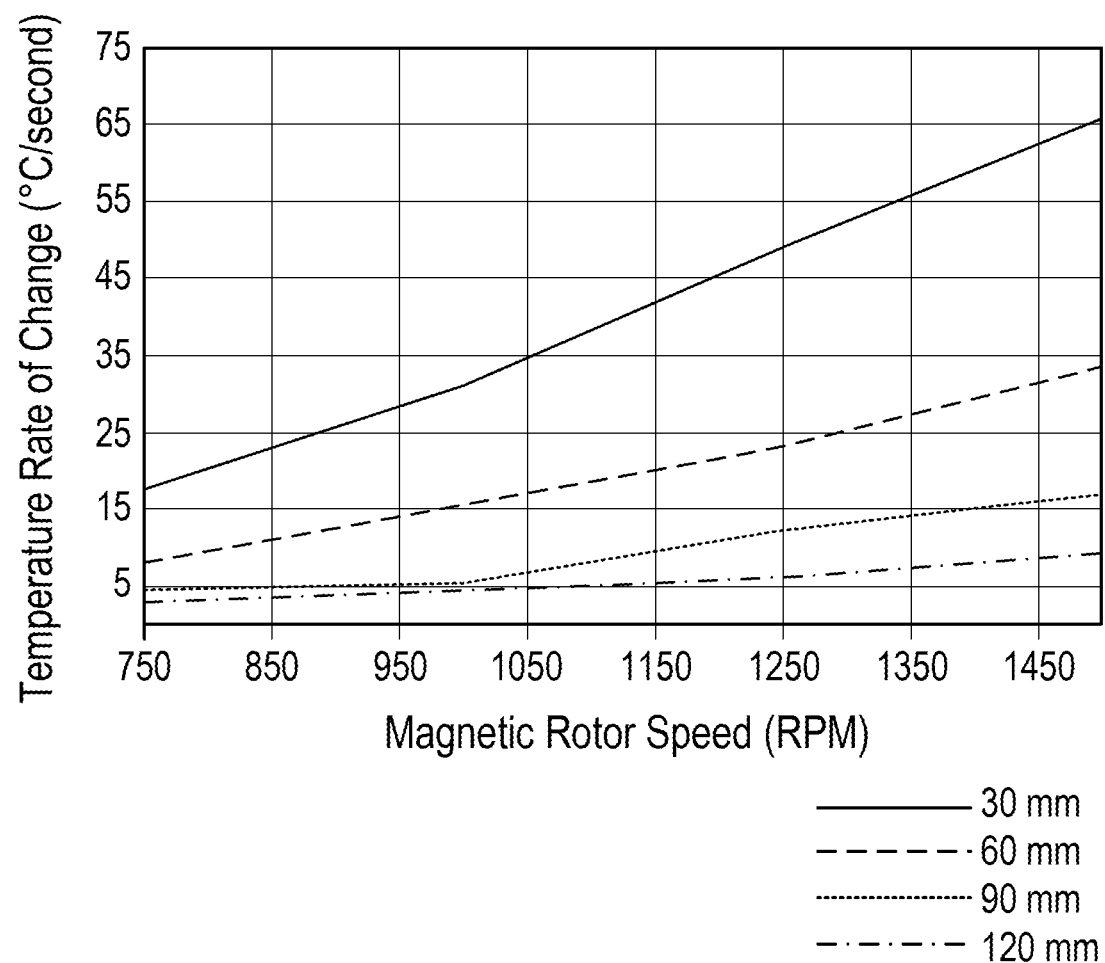
FIG. 46 is a graph of rate of temperature increase compared to magnetic rotor speed according to certain aspects of the present disclosure.

FIG. 46 is a graph of rate of temperature increase compared to magnetic rotor speed according to certain aspects of the present disclosure. The graph shows rates of temperature change (e.g., temperature increase) of a surface of a coated metal strip (e.g., coated metal strip 4010 of FIG. 40) as it depends on magnetic rotor (e.g., rotors 4040, 4045) speed and gap (e.g., gap 4076) between the first magnetic rotor (e.g., magnetic rotor 4040) and the second magnetic rotor (e.g., magnetic rotor 4045). The coated metal strip 4010 was centered in the gap 4076. Temperature of the coated metal strip 4010 was recorded. Evident in the graph of FIG. 46, the rate of temperature increase increases with increased magnetic rotor 4040, 4045 speed, as described above. In some non-limiting examples, maintaining the gap 4076 at 30 mm (solid line) provided a greatest rate of temperature increase. In some non-limiting examples, maintaining the gap 4076 at 60 mm (dashed line) provided a lower rate of temperature increase than maintaining the gap 4076 at 30 mm. In some non-limiting examples, maintaining the gap 4076 at 90 mm (dotted line) provided a lower rate of temperature increase than maintaining the gap 4076 at 60 mm. In some non-limiting examples, maintaining the gap 4076 at 120 mm (dashed-single dot line) provided a lower rate of temperature increase than maintaining the gap 4076 at 90 mm. Further evident in the graph, decreasing the gap 4076 between the magnetic rotors 4040 and 4045 (and, accordingly, the distance 4075 between the magnetic rotor 4040, 4045 and the coated metal strip 4010) also increases the rate of temperature increase in the coated metal strip 4010 and the coating applied to the coated metal strip. In some non-limiting examples, maintaining a gap 4076 between the magnetic rotors 4040 and 4045 of about 30 mm and rotating each magnetic rotor 4040, 4045 at a speed of about 1,300 RPM can provide a heating rate of about 55° C./s.

Figure 47:
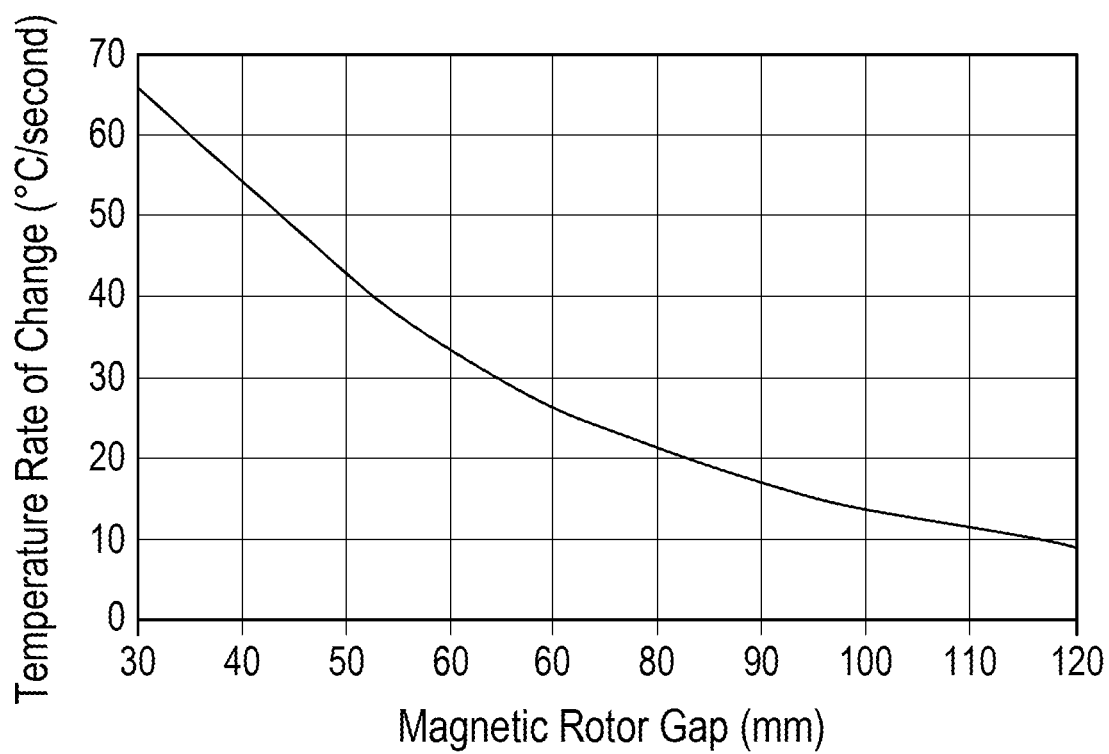
FIG. 47 is a graph of rate of temperature increase compared to a gap between magnetic rotors according to certain aspects of the present disclosure.

FIG. 47 is a graph of rate of temperature increase compared to a gap between magnetic rotors according to certain aspects of the present disclosure. The graph shows rates of temperature change (e.g., temperature increase) of a surface of a coated metal strip (e.g., coated metal strip 4010 of FIG. 40) as it depends on the gap (e.g., gap 4076) between the magnetic rotors (e.g., rotors 4040 and 4045). Rotor speed was maintained at about 1,500 RPM. Evident in the graph of FIG. 47, increasing the gap 4076 between the magnetic rotors 4040 and 4045 (and, accordingly, the distance 4075 between the magnetic rotor 4040, 4045 and the coated metal strip 4010) decreases the rate of temperature increase in the coated metal strip 4010 and the coating applied to the coated metal strip. In some non-limiting examples, maintaining a gap 4076 between the magnetic rotors 4040 and 4045 of about 30 mm and rotating each magnetic rotor 4040, 4045 at a speed of about 1,500 RPM can provide a heating rate of about 65° C./s. In another example, maintaining a gap 4076 of about 100 mm and a magnetic rotor 4040, 4045 speed of 1,500 RPM can provide a heating rate of about 15° C./s.

In some non-limiting examples, a temperature profile of a curing chamber as described herein can be precisely tailored for a coated metal or other material strip and its coating characteristics by adjusting parameters including strip speed of the coated metal strip, rotation speed of the magnetic rotors, strength and/or direction of the magnetic flux generated from the magnetic rotors, distance between the magnetic rotors and the coated metal or other material strip, and/or distance between adjacent magnetic rotors. In some cases, the system described herein can provide reduced start-up and shut-down times for curing systems, provide curing chambers having a smaller footprint compared to comparative gas burning curing chambers, provide reduced curing times for coatings applied to metal and other material strips, and provide reduced fossil fuel emissions. For example, a coated metal strip with a strip speed of about 200 m/minute would require an exemplary curing chamber with a length of about 15 m, wherein a comparative gas burning curing chamber requires a 50 m length for equal curing. The curing chamber described herein can be about 70% shorter than a comparative gas burning curing chamber in some cases.

Figure 48:
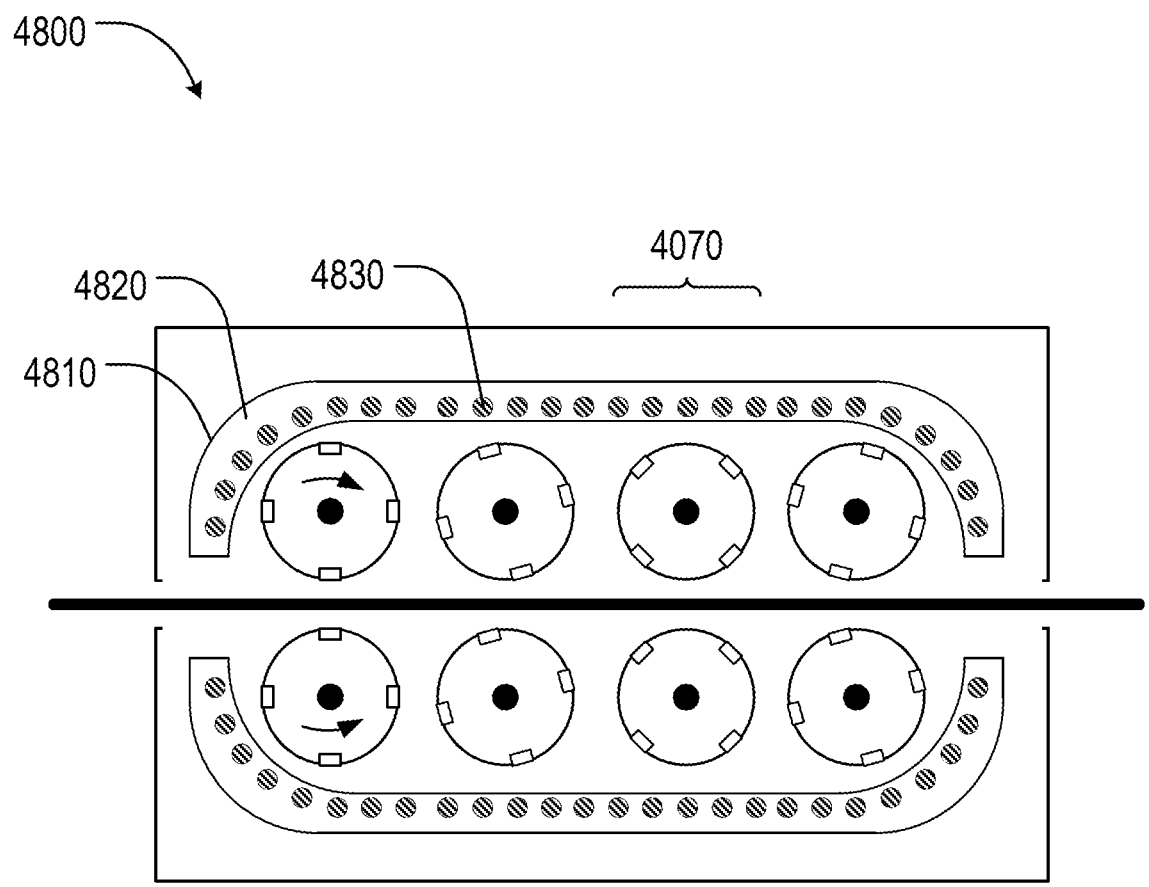
FIG. 48 is a schematic illustration of a curing chamber and heat transfer media heating oven according to certain aspects of the present disclosure.

FIG. 48 is a schematic illustration of a curing chamber and heat transfer media heating oven according to certain aspects of the present disclosure. In some non-limiting examples, the systems described herein can be used to provide heat outside of the curing chamber 4000 or otherwise away from a magnetic rotor (e.g., rotors 108, 110 of FIG. 1). For example, a blower can be employed to transfer any heated gas (e.g., air, nitrogen, argon, or any suitable process gas) or liquid contained in the curing chamber 4000 to an adjacent process or process chamber. In some cases, volatile organic compounds (VOCs) extracted from coatings during curing can be routed to an optional regenerative thermal oxidizer (RTO) to capture heat energy from the VOCs. In some examples, gases extracted from coatings during curing can be routed to optional scrubbers to provide environmentally safe emissions from the curing chamber 4000.

As depicted in FIG. 48, an example system described herein can be used to heat water or any other suitable heat exchanging matter (e.g., air, gas, liquid) for use in systems and processes outside of the curing chamber 4000. A conduit 4810 disposed adjacent one or more of the individual rotors 4040, 4045 or curing stacks 4070 can convey a heat exchanging fluid 4820 to efficiently transfer heat within the conduit 4810. In some examples, the conduit 4810 is a closed system and/or connected to a reservoir for storing and filtering the heat exchanging fluid 4820. One or more tubes 4830 can transport the heat exchanging fluid 4820 through the curing chamber 4000 to heat the heat exchanging fluid 4820 using the magnets of the individual rotors 4040, 4045 or curing stacks 4070 and then transport the heated heat exchanging fluid 4820 to a system or process adjacent the curing chamber 4000. In some cases, the one or more tubes 4830 can contact the conduit 4810 or be positioned in close proximity to the conduit 4810 to increase heat transfer rate and efficiency. For example, the plurality of tubes 4830 can transport water to an adjacent rinsing station that requires hot and/or warm water to remove (e.g., rinse), for example, a cleaning solution from a metal strip after a cleaning process.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

As used below, any reference to a series of examples is to be understood as a reference to each of those examples disjunctively (e.g., "Examples 1-4" is to be understood as "Examples 1, 2, 3, or 4").

Example 1 is a rotating magnet heating system comprising: a magnetic rotor containing at least one magnetic source and rotatable about an axis of rotation to generate a changing magnetic field adjacent the magnetic rotor, wherein the magnetic rotor is positionable adjacent a metal article moving in a downstream direction such that the changing magnetic field passes through the metal article, and wherein the axis of rotation is perpendicular the downstream direction and within 10° of parallel a lateral width of the metal article; and at least one motor coupled to the magnetic rotor to rotate the magnetic rotor. In some cases, the axis of rotation is parallel the lateral width of the metal article.

Example 2 is the rotating magnet heating system of example 1, wherein the at least one magnetic source is at least one permanent magnet.

Example 3 is the rotating magnet heating system of examples 1 or 2, further comprising: a second magnetic rotor spaced apart from the magnetic rotor to form a gap for accepting the metal article, wherein the second magnetic rotor contains at least one magnetic source and is rotatable about a second axis of rotation that is parallel to the axis of rotation.

Example 4 is the rotating magnet heating system of examples 1-3, further comprising a support arm coupled to the magnetic rotor for adjusting a distance between the magnetic rotor and the metal article.

Example 5 is the rotating magnet heating system of examples 1-4, further comprising an auxiliary heating element positioned adjacent the metal article and between an edge of the metal article and a lateral centerline of the metal article, Example 6 is the rotating magnet heating system of example 5, wherein the auxiliary heating element includes an auxiliary magnetic rotor having a length that is shorter than a length of the magnetic rotor.

Example 7 is the rotating magnet heating system of examples 1-6, further comprising one or more flux guides positioned adjacent the magnetic rotor to redirect at least some magnetic flux from the magnetic rotor.

Example 8 is the rotating magnet heating system of example 7, wherein the one or more flux guides are coupled to the magnetic rotor.

Example 9 is the rotating magnet heating system of examples 1-8, further comprising one or more deflectors positioned to move the metal article to adjust a distance between the metal article and the magnetic rotor.

Example 10 is the rotating magnet heating system of examples 1-9, further comprising: a sensor positioned to measure temperature or tension of the metal article; and a controller coupled to the sensor to receive a sensor signal, wherein the controller is coupled to an actuator associated with the magnetic rotor to provide feedback control in response to the sensor signal, wherein the actuator is configured to control an amount of magnetic flux passing through the metal article.

Example 11 is a method of magnetically heating a metal article, the method comprising: rotating a magnetic rotor about an axis of rotation to induce a changing magnetic field adjacent the magnetic rotor; passing a metal article adjacent the magnetic rotor and through the changing magnetic field to induce an eddy current in the metal article, wherein passing the metal article includes moving the metal article in a downstream direction that is perpendicular the axis of rotation of the magnetic rotor, and wherein the metal article is oriented such that a lateral width of the metal article is within 10° of parallel the axis of rotation of the magnetic rotor. In some cases, the metal article is parallel the axis of rotation of the magnetic rotor.

Example 12 is the method of example 11, wherein rotating the magnetic rotor about an axis of rotation includes moving at least one permanent magnet around the axis of rotation.

Example 13 is the method of examples 11 or 12, further comprising: rotating a second magnetic rotor about a second axis of rotation that is parallel the axis of rotation of the magnetic rotor, wherein the second magnetic rotor is spaced apart from the magnetic rotor to form a gap, and wherein passing the metal article adjacent the metal rotor includes passing the metal article through the gap.

Example 14 is the method of examples 11-13, further comprising dynamically changing a distance between the magnetic rotor and the metal article.

Example 15 is the method of examples 11-14, further comprising: passing the metal article adjacent an auxiliary heating element; and heating a region of the metal strip using the auxiliary heating element, wherein the region is located between an edge of the metal article and a lateral centerline of the metal article.

Example 16 is the method of example 15, wherein heating the region of the metal strip using the auxiliary heating element includes rotating an auxiliary magnetic rotor, wherein the auxiliary magnetic rotor has a length that is shorter than a length of the magnetic rotor.

Example 17 is the method of examples 11-16, further comprising providing one or more flux guides adjacent the magnetic rotor, wherein providing the one or more flux guides comprises redirecting at least a portion of the magnetic field.

Example 18 is the method of example 17, wherein providing the one or more flux guides includes providing the metal rotor having the one or more flux guides coupled thereto.

Example 19 is the method of examples 11-18, further comprising deflecting the metal article to adjust a distance between the metal article and the magnetic rotor.

Example 20 is the method of examples 11-19, further comprising: measuring a temperature or tension of the metal article; and dynamically providing feedback control based on the measured temperature or measured tension, wherein dynamically providing the feedback control results in manipulation of the changing magnetic field or a position of the metal article with respect to the changing magnetic field.

Example 21 is a rotating magnet heater comprising: a top magnetic rotor vertically offset from a bottom magnetic rotor defining a gap therebetween for accepting a moving metal strip; at least one motor coupled to at least one of the top magnetic rotor and the bottom magnetic rotor for rotating the at least one of the top magnetic rotor and the bottom magnetic rotor to induce a changing magnetic field through the gap for heating the moving metal strip; and a pair of support arms each coupled to one of the top magnetic rotor and the bottom magnetic rotor for adjusting the gap.

Example 22 is the rotating magnet heater of example 21, further comprising: an additional top magnetic rotor vertically offset from an additional bottom magnetic rotor defining an additional gap therebetween for accepting the moving metal strip; and an additional pair of support arms each coupled to one of the additional top magnetic rotor and the additional bottom magnetic rotor for adjusting the additional gap.

Example 23 is the rotating magnet heater of example 22, further comprising: at least one actuator coupled to at least one of the pair of support arms and the additional pair of support arms for adjusting the gap in response to a signal; and a controller coupled to the at least one actuator for providing the signal.

Example 24 is the rotating magnet heater of example 23, further comprising a sensor coupled to the controller for providing a measurement to the controller, wherein the controller is configured to provide the signal based on the measurement.

Example 25 is the rotating magnet heater of examples 22-24, wherein the additional top magnetic rotor is laterally offset from the additional bottom magnetic rotor such that an overlap between the top magnetic rotor and the bottom magnetic rotor is less than a width of the moving metal strip.

Example 26 is the rotating magnet heater of examples 21-25, further comprising an idler roller coupled to an extendable support arm movable between an extended position and a retracted position, wherein at least one of the top magnetic rotor and the bottom magnetic rotor is coupled to the extendable support arm, and wherein the moving metal strip passes adjacent the top magnetic rotor and the bottom magnetic rotor when the extendable support arm is in the extended position and wherein the moving metal strip passes distant from the top magnetic rotor and the bottom magnetic rotor when the extendable support arm is in the retracted position.

Example 27 is a metal processing system comprising: a piece of metal processing equipment for processing a moving metal strip; and a rotating magnet heater including a first magnetic rotor set comprising: a top magnetic rotor vertically offset from a bottom magnetic rotor defining a gap therebetween for accepting the moving metal strip; at least one motor coupled to at least one of the top magnetic rotor and the bottom magnetic rotor for rotating the at least one of the top magnetic rotor and the bottom magnetic rotor to induce a changing magnetic field through the gap for heating the moving metal strip; and a pair of support arms each coupled to one of the top magnetic rotor and the bottom magnetic rotor for adjusting the gap.

Example 28 is the system of example 27, wherein the piece of metal processing equipment is a continuous casting machine for casting the moving metal strip.

Example 29 is the system of examples 27 or 28, wherein the rotating magnet heater is positioned upstream of the piece of metal processing equipment for increasing a temperature of the metal strip.

Example 30 is the system of example 29, wherein the rotating magnet heater further includes a second magnetic rotor set comprising: an additional top magnetic rotor vertically offset from an additional bottom magnetic rotor defining an additional gap therebetween for accepting the moving metal strip; and an additional pair of support arms each coupled to one of the additional top magnetic rotor and the additional bottom magnetic rotor for adjusting the additional gap.

Example 31 is the system of examples 27-30, wherein the rotating magnet heater further comprises: at least one actuator coupled to at least one of the pair of support arms and the additional pair of support arms for adjusting the gap in response to a signal; and a controller coupled to the at least one actuator for providing the signal.

Example 32 is the system of example 31, further comprising a sensor coupled to the controller for providing a measurement to the controller, wherein the controller is configured to provide the signal based on the measurement.

Example 33 is the system of examples 27-32, wherein the additional top magnetic rotor is laterally offset from the additional bottom magnetic rotor such that an overlap between the top magnetic rotor and the bottom magnetic rotor is less than a width of the moving metal strip.

Example 34 is the system of examples 27-33, further comprising an idler roller coupled to an extendable support arm movable between an extended position and a retracted position, wherein at least one of the top magnetic rotor and the bottom magnetic rotor is coupled to the extendable support arm, and wherein the moving metal strip passes adjacent the top magnetic rotor and the bottom magnetic rotor when the extendable support arm is in the extended position and wherein the moving metal strip passes distant from the top magnetic rotor and the bottom magnetic rotor when the extendable support arm is in the retracted position.

Example 35 is a method comprising: passing a metal strip through a first gap defined between a top magnetic rotor and a bottom magnetic rotor of a first set of magnetic rotors; passing the metal strip through a second gap defined between an additional top magnetic rotor and an additional bottom magnetic rotor of a second set of magnetic rotors; rotating the first set of magnetic rotors at a first speed to induce a first changing magnetic field in the first gap to heat the metal strip; rotating the second set of magnetic rotors at a second speed to induce a second changing magnetic field in the second gap to heat the metal strip; and controlling tension in the metal strip, wherein controlling tension comprises adjusting at least one of the first gap, the second gap, the first speed, and the second speed.

Example 36 is the method of example 35, further comprising taking a measurement of the metal strip, wherein controlling tension comprises making an adjustment based on the measurement.

Example 37 is the method of examples 35 or 36, further comprising adjusting a longitudinal position of at least one of the first set of magnetic rotors and the second set of magnetic rotors.

Example 38 is the method of examples 35-37, further comprising adjusting a lateral position of at least one magnetic rotor of at least one of the first set of magnetic rotors and the second set of magnetic rotors.

Example 39 is the method of examples 35-38, wherein controlling tension in the metal strip includes offsetting tension changes induced by the first set of magnetic rotors using the second set of magnetic rotors.

Example 40 is the method of examples 35-39, wherein controlling tension in the metal strip comprises adjusting at least one of the first gap and the second gap.

Example 41 is a magnetic rotor having tailored magnetic flux, comprising: a central axis of rotation; one or more magnetic sources rotatable about the axis of rotation; and a magnetic flux profile based on the one or more magnetic sources, wherein the magnetic flux profile is non-uniform along a length of the rotor.

Example 42 is the magnetic rotor of example 41, further comprising one or more flux guides, wherein the one or more magnetic sources present an initial magnetic flux profile, and wherein the one or more flux guides are positioned to divert at least some of the initial magnetic flux profile to present the non-uniform magnetic flux profile.

Example 43 is the magnetic rotor of example 41, wherein the one or more magnetic sources vary across the length of the rotor to present the non-uniform magnetic flux profile. In some cases, example 43 can also include one or more flux guides positioned to divert at least some of the non-uniform magnetic flux profile.

Example 44 is the magnetic rotor of examples 41 or 42, further comprises one or more sleeves positioned around at least a portion of the one or more magnetic sources, wherein the one or more magnetic sources present an initial magnetic flux profile, and wherein the one or more sleeves are positioned to divert at least some of the initial magnetic flux profile to present the non-uniform magnetic flux profile.

Example 45 is the magnetic rotor of examples 41-44, wherein the non-uniform magnetic flux profile reaches a maximum amount of flux between a center of the length of the rotor and an end of the rotor.

Example 46 is the magnetic rotor of examples 41-44, wherein the non-uniform magnetic flux profile reaches maximum amounts of flux at locations between a center of the length of the rotor and each end of the rotor.

Example 47 is a system for curing a coating, comprising: a curing chamber comprising an entrance and an exit for passing a coated metal strip through the curing chamber; and at least one rotor comprising at least one magnet.

Example 48 is the system of example 47, wherein the at least one magnet comprises a plurality of magnets.

Example 49 is the system of examples 47 or 48, wherein the at least one rotor comprises a plurality of rotors.

Example 50 is the system of example 49, wherein a first subset of the plurality of rotors is positioned adjacent a first side of the coated metal strip and a second subset of the plurality of rotors is positioned adjacent a second side of the coated metal strip.

Example 51 is the system of example 50, wherein at least one rotor of the first subset of the plurality of rotors is vertically aligned with at least one of the rotors of the second subset of the plurality of rotors.

Example 52 is the system of examples 50 or 51, wherein at least one rotor of the first subset of the plurality of rotors is vertically offset from the rotors of the second subset of the rotors.

Example 53 is the system of examples 50-52, wherein at least one rotor of the first subset of the plurality of rotors and at least one rotor of the second subset of the plurality of rotors form a curing stack.

Example 54 is the system of example 53, wherein the system comprises a plurality of curing stacks and each curing stack has a heating zone.

Example 55 is the system of example 54, wherein at least some of the heating zones are individually controllable.

Example 56 is the system of examples 54 or 55, wherein at least some of the heating zones are precisely controllable.

Example 57 is the system of examples 54-56, wherein at least some of the heating zones are instantaneously adjustable.

Example 58 is the system of examples 54-57, wherein the curing stack comprises counter-rotating rotors.

Example 59 is the system of examples 50-58, wherein at least some of the rotors of the first subset of the plurality of rotors rotate in a first direction and at least some of the rotors of the second subset of the plurality of rotors rotate in a second direction that is opposite the first direction.

Example 60 is the system of examples 47-59, wherein the at least one magnet comprises a permanent magnet.

Example 61 is the system of examples 47-60, wherein the at least one magnet is at least partially embedded within a surface of the at least one rotor.

Example 62 is the system of examples 47-61, wherein the at least one magnet projects from a surface of the at least one rotor.

Example 63 is the system of examples 47-62, wherein the at least one rotor is positioned within the curing chamber such that the at least one rotor is adjacent to the coated metal strip passing through the curing chamber.

Example 64 is the system of examples 47-63, wherein the at least one rotor is configured to heat the coated metal strip by induction heating.

Example 65 is the system of examples 47-64, wherein the at least one magnet comprises a first magnet at least partially embedded in the at least one rotor and a second magnet that projects from a surface of the at least one rotor.

Example 66 is a method comprising: rotating at least one rotor of a curing system at a rotational speed, wherein the at least one rotor comprises at least one magnet; and passing a coated metal strip through the curing system at a strip speed so the coated metal strip is adjacent the at least one rotor to generate moving magnetic fields within the coated metal strip that create currents within the coated metal strip to heat the coated metal strip, wherein a distance between the coated metal strip and the at least one rotor, the rotational speed a strength of the at least one magnet, and the strip speed are selected to cure a coating of the coated metal strip within a predetermined time.

Example 67 is the method of example 66, wherein the distance between the metal strip and the at least one rotor is from about 15 millimeters to about 300 millimeters.

Example 68 is the method of examples 66 or 67, wherein the rotational speed is at least 200 revolutions per minute (RPM).

Example 69 is the method of examples 66-68, wherein the strip speed is from about 20 meters per minute to about 400 meters per minute.

Example 70 is the method of examples 66-69, wherein a heating rate of the coated metal strip is from about 1° C. per second to about 150° C. per second.

Example 71 is the method of examples 66-70, wherein the coated metal strip is heated to a temperature of up to 600° C. within the predetermined time.

Example 72 is the method of examples 66-71, wherein rotating the at least one rotor comprises rotating a plurality of rotors and passing the coated metal strip through the curing system comprises passing the coated metal strip adjacent each of the plurality of rotors.

Example 73 is the method of example 72, wherein rotating the rotors comprises rotating a first subset of the plurality of rotors in a first direction and rotating a second subset of the plurality of rotors in a second direction opposite the first direction, wherein the first subset of the plurality of rotors is positioned adjacent a first surface of the coated metal strip passing through the curing system and the second subset of the plurality of rotors is positioned adjacent a second surface of the coated metal strip passing through the curing system.

Example 74 is the method of example 73, further comprising individually controlling heating zones associated with one or more subsets of the plurality of rotors.

Example 75 is the method of example 74, wherein individually controlling heating zones associated with one or more subsets of the plurality of rotors comprises: controlling the distance between the one or more subsets of the plurality of rotors and the first surface of the coated metal strip passing through the curing system and between the second subset of the plurality of rotors and the second surface of the coated metal strip passing through the curing system; and controlling the rotational speed of the one or more subsets of the plurality of rotors and the second subset of the plurality of rotors.

Example 76 is the method of examples 66-75, further comprising directing magnetic flux generated from the rotating rotor toward a surface of the metal strip to concentrate heat generation at the surface of the metal strip.

Example 77 is a method of heating a heat transfer medium, comprising: rotating a rotor of a curing chamber, wherein the rotor comprises at least one magnet; generating heat from the rotating rotor, wherein generating heat from the rotating rotor is performed by generating moving magnetic fields within the heat transfer medium that create currents within the heat transfer medium to heat the heat transfer medium; passing the heat transfer medium adjacent to the rotating rotor of the curing chamber to heat the heat transfer medium; and conveying the heated heat transfer medium from the curing chamber to an area remote from the curing chamber.

Example 78 is the method of example 77, wherein rotating the rotating rotor comprises rotating the rotating rotor at a speed of at least 1,300 revolutions per minute (RPM).

Example 79 is the method of examples 77 or 78, wherein the heat transfer medium comprises water, liquid silicon, air, gas, oil, or other phase changing material.

Example 80 is a heating system, comprising: a magnetic heating apparatus for heating a metal strip moving in a downstream direction, wherein the magnetic heating apparatus includes one or more heaters for inducing a tailored temperature profile in the metal strip, wherein the one or more heaters comprises at least one magnetic rotor, and wherein each of the at least one magnet rotor contains at least one magnetic source and is rotatable about an axis of rotation to generate a changing magnetic field through the metal strip.

Example 81 is the heating system of example 80, wherein the tailored temperature profile is a laterally uniform temperature profile.

Example 82 is the heating system of examples 80 or 81, wherein one or more of the at least one magnetic rotors has a tailored magnetic flux profile to facilitate inducing the tailored temperature profile in the metal strip.

Example 83 is the heating system of examples 80-82, wherein the at least one magnetic rotor comprises a first magnetic rotor positionable with respect to a second magnetic rotor to facilitate inducing the tailored temperature profile in the metal strip.

Example 84 is the heating system of example 83, wherein an axis of rotation of the first magnetic rotor is parallel an axis of rotation of the second magnetic rotor, and wherein at least one of the first magnetic rotor and the second magnetic rotor is laterally offset from a centerline of the metal strip by an offset distance.

Example 85 is the heating system of example 84, further comprising a controller operably coupled to an actuator controlling the offset distance.

Example 86 is the heating system of examples 80-85, wherein the at least one magnetic rotor comprises a first magnetic rotor and a second magnetic rotor, wherein the second magnetic rotor is positioned downstream of the first magnetic rotor.

Example 87 is the heating system of examples 80-86, wherein the one or more heaters further comprises an auxiliary heating element positioned adjacent the metal article and between an edge of the metal article and a lateral centerline of the metal article to facilitate inducing the tailored temperature profile in the metal strip.

Example 88 is the heating system of examples 80-87, wherein the magnetic heating apparatus further comprises a deflector positionable to adjust a distance between at least a portion of the metal strip and the one or more heaters to facilitate inducing the tailored temperature profile.

Example 89 is the heating system of examples 80-88, wherein the axis of rotation of one or more of the at least one magnetic rotor is perpendicular the downstream direction and parallel a lateral width of the metal strip.

Example 90 is the heating system of examples 80-89, wherein the magnetic source for one or more of the at least one magnetic rotor comprises a permanent magnet rotatable about the axis of rotation.

Example 91 is the heating system of examples 80-90, wherein the magnetic heating apparatus additionally comprises one or more flux guides positioned adjacent the at least one magnetic rotor to redirect at least some of magnetic flux from the at least one magnetic rotor to facilitate inducing the tailored temperature profile.

Example 92 is the heating system of examples 80-91, further comprising: a sensor positioned to measure a temperature or tension of the metal article; and a controller coupled to the sensor to receive a sensor signal, wherein the controller is coupled to an actuator associated with the magnetic heating apparatus to provide feedback control in response to the sensor signal, wherein the actuator is configured to control magnetic flux passing through the metal article.

Example 93 is a method of heating metal, comprising: moving a metal article in a downstream direction; inducing a tailored temperature profile in the metal article by one or more heaters of a magnetic heating apparatus, wherein the one or more heaters comprises at least one magnetic rotor, and where inducing the tailored temperature profile comprises rotating a magnetic source of the at least one magnetic rotor about an axis of rotation of the at least one magnetic rotor to generate changing magnetic fields through the metal article.

Example 94 is the method of example 93, wherein inducing the tailored temperature profile comprises inducing a laterally uniform temperature profile.

Example 95 is the method of examples 93 or 94, wherein the at least one magnetic rotor comprises a magnetic rotor having a tailored magnetic flux profile, and wherein inducing the tailored temperature profile comprises rotating the magnetic rotor having the tailored magnetic flux profile to generate tailored changing magnetic fields.

Example 96 is the method of examples 93-95, wherein inducing the tailored temperature profile comprises rotating a first magnetic rotor and a second magnetic rotor, wherein the first magnetic rotor and the second magnetic rotor are positioned with respect to one to facilitate inducing the tailored temperature profile in the metal article.

Example 97 is the method of example 96, wherein inducing the tailored temperature profile comprises rotating a first magnetic rotor about a first axis of rotation and rotating a second magnetic rotor about a second axis of rotation that is parallel the first axis of rotation, and wherein at least one of the first magnetic rotor and the second magnetic rotor is laterally offset from a centerline of the metal article by an offset distance.

Example 98 is the method of example 97, wherein inducing the tailored temperature profile further comprises controlling the offset distance.

Example 99 is the method of examples 93-98, wherein inducing the tailored temperature profile comprises rotating a first magnetic rotor and a second magnetic rotor, wherein the second magnetic rotor is located downstream of the first magnetic rotor.

Example 100 is the method of examples 93-99, wherein the one or more heaters further comprises an auxiliary heating element positioned adjacent the metal article and between an edge of the metal article and a lateral centerline of the metal article, and wherein inducing the tailored temperature profile further comprises applying heat to the metal article from the auxiliary heating element.

Example 101 is the method of examples 93-100, wherein inducing the tailored temperature profile further comprises actuating a deflector to adjust a distance between at least a portion of the metal article and the one or more heaters.

Example 102 is the method of examples 93-101, wherein the axis of rotation of the at least one magnetic rotor is perpendicular the downstream direction and parallel a lateral width of the metal article.

Example 103 is the method of examples 93-102, wherein the magnetic source of the at least one magnetic rotor comprises a permanent magnet.

Example 104 is the method of examples 93-103, wherein inducing the tailored temperature profile further comprises redirecting at least some of magnetic flux from the at least one magnetic rotor to facilitate generating the changing magnetic fields through the metal article.

Example 105 is the method of examples 93-104, further comprising measuring a temperature or tension of the metal article by a sensor to generate a sensor signal, wherein inducing the tailored temperature profile further comprises dynamically providing feedback control of the magnetic heating apparatus based on the sensor signal, wherein dynamically providing feedback control comprises at least one of manipulating the changing magnetic fields and manipulating a position of the metal article with respect to the changing magnetic fields.

Example 106 is a metal processing system comprising: a piece of metal processing equipment for processing a moving metal strip; and a magnetic heating apparatus for heating the moving metal strip, wherein the magnetic heating apparatus includes one or more heaters for inducing a tailored temperature profile in the metal strip, wherein the one or more heaters comprises at least one magnetic rotor, wherein each of the at least one magnet rotor contains at least one magnetic source and is rotatable about an axis of rotation to generate changing magnetic fields through the metal strip, and wherein the magnetic heating apparatus is positioned upstream, downstream, or within the piece of metal processing equipment.

Example 107 is the metal processing system of example 106, wherein the piece of metal processing equipment is a continuous casting machine for casting the moving metal strip.

Example 108 is the metal processing system of examples 106 or 107, wherein the magnetic heating apparatus is positioned upstream of the piece of metal processing equipment for increasing a temperature of the moving metal strip.

Example 109 is the metal processing system of example 106-108, wherein the tailored temperature profile is a laterally uniform temperature profile.

Example 110 is the metal processing system of examples 106-109, wherein the magnetic heating apparatus includes, to facilitate inducing the tailored temperature profile in the metal article, at least one from the group consisting of: a magnetic rotor having a tailored magnetic flux profile; a first magnetic rotor and a second magnetic rotor, wherein at least one of the first magnetic rotor and the second magnetic rotor is laterally offset from a centerline of the metal strip; a second magnetic rotor positioned downstream of a first magnetic rotor; an auxiliary heating element positioned adjacent the metal strip and between an edge of the metal strip and a lateral centerline of the metal strip; and a deflector positionable to adjust a distance between at least a portion of the metal article and the one or more heaters.

Example 111 is the metal processing system of examples 106-110, further comprising an idler roller coupled to a support movable between a first position and a second position, wherein the moving metal strip passes adjacent the one or more heaters of the magnetic heating apparatus when the support is in the first position and wherein the moving metal strip passes distant from the one or more heaters of the magnetic heating apparatus when the support is in the second position.

What is claimed is:

1. A heating system comprising:
a magnetic heating apparatus configured to heat a metal article moving in a downstream direction along a passline through the heating system, wherein the magnetic heating apparatus comprises one or more heaters configured to induce a tailored temperature profile in the metal article, wherein each of the one or more heaters comprises:
a magnetic rotor comprising at least one magnetic source, wherein the magnetic rotor is rotatable about an axis of rotation that is perpendicular to the downstream direction and parallel to a lateral width of the metal article to generate changing magnetic fields through the metal article; and
an auxiliary magnetic heating apparatus configured to heat the metal article moving in the downstream direction, wherein the auxiliary magnetic heating apparatus comprises one or more auxiliary heaters, wherein each of the one or more auxiliary heaters comprises:
an auxiliary magnetic rotor comprising at least one magnetic source and rotatable about an axis of rotation, wherein the auxiliary magnetic rotor is configured to provide localized heating of a sub-area of the metal article less than an entire area across the lateral width of the metal article.

2. The heating system of claim 1, wherein the auxiliary magnetic heating apparatus is upstream from the magnetic heating apparatus.

3. The heating system of claim 1, wherein the auxiliary magnetic heating apparatus is downstream from the magnetic heating apparatus.

4. The heating system of claim 1, wherein the axis of rotation of the auxiliary magnetic rotor of at least one of the one or more auxiliary heaters is perpendicular to the downstream direction and parallel to the lateral width of the metal article.

5. The heating system of claim 1, wherein the axis of rotation of the auxiliary magnetic rotor of at least one of the one or more auxiliary heaters is perpendicular to the downstream direction and perpendicular to the lateral width of the metal article.

6. The heating system of claim 1, wherein a length of the auxiliary magnetic rotor of at least one of the one or more auxiliary heaters is less than a length of the magnetic rotor of the one or more heaters.

7. The heating system of claim 1, wherein the auxiliary magnetic rotor of at least one of the one or more auxiliary heaters is positioned between an edge of the metal article and a centerline of the metal article extending in the downstream direction.

8. The heating system of claim 1, wherein the one or more auxiliary heaters comprises two auxiliary heaters, and wherein the two auxiliary heaters are symmetrically positioned about a centerline of the metal article extending in the downstream direction.

9. The heating system of claim 1, wherein a position of the one or more auxiliary heaters relative to the metal article is adjustable.

10. The heating system of claim 9, wherein the position is a lateral position and a longitudinal position.

* * * * *